US011767757B2

(12) United States Patent
Tessien

(10) Patent No.: US 11,767,757 B2
(45) Date of Patent: Sep. 26, 2023

(54) ROADWAY CONDUIT SYSTEMS AND METHODS

(71) Applicant: Electricwaze LLC, Wilmington, DE (US)

(72) Inventor: Ross Tessien, Grass Valley, CA (US)

(73) Assignee: Electricwaze LLC, Wilmington, DE (US)

( * ) Notice: Subject to any disclaimer, the term of this patent is extended or adjusted under 35 U.S.C. 154(b) by 0 days.

(21) Appl. No.: 17/169,646

(22) Filed: Feb. 8, 2021

(65) Prior Publication Data

US 2021/0237309 A1    Aug. 5, 2021

Related U.S. Application Data

(63) Continuation of application No. 16/208,185, filed on Dec. 3, 2018, now Pat. No. 10,913,178, which is a
(Continued)

(51) Int. Cl.
  *E21D 9/14* (2006.01)
  *E21D 11/00* (2006.01)
  *E21F 1/00* (2006.01)

(52) U.S. Cl.
  CPC .............. *E21D 9/14* (2013.01); *E21D 11/003* (2013.01); *E21F 1/003* (2013.01)

(58) Field of Classification Search
  CPC ........... E21F 1/003; E21D 9/14; E21D 11/003
  See application file for complete search history.

(56) References Cited

U.S. PATENT DOCUMENTS

| 2,153,741 A | 4/1939 | Cobi |
| 2,799,911 A | 7/1957 | Hutchins et al. |

(Continued)

FOREIGN PATENT DOCUMENTS

| AT | 522577 B1 * | 12/2020 | ........... E04H 15/008 |
| AT | 522702 A1 * | 1/2021 | ......... A63B 24/0021 |

(Continued)

OTHER PUBLICATIONS

"2015 Traffic Volumes on the California State Highway System," State of California, The Transportation Agency, Department of Transportation, Division of Traffic Operations, available on or before Dec. 21, 2016, 237 pages.
(Continued)

*Primary Examiner* — Michael Safavi
(74) *Attorney, Agent, or Firm* — Fish & Richardson P.C.

(57) ABSTRACT

A conduit segment casting mold system includes at least one inner mold; at least one outer mold configured as at least two outer mold sections of opposed shapes that define a cavity between the at least two outer mold sections that is sized to at least partially enclose the at least one inner mold, each of the at least two outer mold sections including a respective mating surface, each of the at least two outer mold sections including at least one hole sized to receive a cable, and the at least one hole of a particular one of the at least two outer mold sections is aligned with the at least one hole of another particular one of the at least two outer mold sections when the mating surfaces of the particular one and the another particular one of the at least two outer mold sections are mated; and a mold base.

36 Claims, 35 Drawing Sheets

Related U.S. Application Data continuation-in-part of application No. 16/043,896, filed on Jul. 24, 2018, now Pat. No. 10,458,236, which is a continuation of application No. 15/970,700, filed on May 3, 2018, now Pat. No. 10,145,241.

(60) Provisional application No. 62/631,253, filed on Feb. 15, 2018.

(56) References Cited

U.S. PATENT DOCUMENTS

| | | | |
|---|---|---|---|
| 3,260,494 A | 7/1966 | Deigaard | |
| 3,583,047 A | 6/1971 | Uchiyama | |
| 3,614,054 A | 10/1971 | Beasly | |
| 3,652,756 A | 3/1972 | Buren | |
| RE27,732 E | 8/1973 | Buren | |
| 3,953,787 A | 4/1976 | Helbling | |
| 3,963,056 A | 6/1976 | Shibuya et al. | |
| 4,023,500 A | 5/1977 | Diggs | |
| 4,073,148 A | 2/1978 | Zaretti | |
| 4,075,948 A | 2/1978 | Minovitch | |
| 4,123,034 A | 10/1978 | Crunk et al. | |
| 4,178,338 A | 12/1979 | Bondpers et al. | |
| 4,202,275 A | 5/1980 | Bitterberg | |
| 4,378,203 A | 3/1983 | Nayagam | |
| 4,477,764 A | 10/1984 | Pollard | |
| 4,519,568 A | 5/1985 | Day et al. | |
| 4,606,878 A | 8/1986 | Day et al. | |
| 4,881,469 A | 11/1989 | Hirtz | |
| 4,907,910 A * | 3/1990 | Teron | E21F 1/003 405/149 |
| 4,953,280 A | 9/1990 | Kitzmiller | |
| 5,377,308 A | 12/1994 | Inoue et al. | |
| 5,558,023 A | 9/1996 | Senior, III | |
| 5,899,635 A * | 5/1999 | Kuja | E02D 29/067 405/134 |
| 5,908,217 A | 6/1999 | Englar | |
| 5,950,543 A | 9/1999 | Oster | |
| 6,186,888 B1 | 2/2001 | Ohashi | |
| 6,724,917 B1 | 4/2004 | Ohashi et al. | |
| 6,752,563 B2 | 6/2004 | Ide | |
| 6,773,650 B1 | 8/2004 | Longo | |
| 6,997,638 B2 | 2/2006 | Hensley et al. | |
| 7,318,619 B2 | 1/2008 | Munro et al. | |
| 7,549,616 B1 | 6/2009 | Koren | |
| 7,857,543 B2 | 12/2010 | Troster | |
| 8,146,508 B2 | 4/2012 | Flynn | |
| 8,616,615 B2 | 12/2013 | Seifert et al. | |
| 8,678,701 B1 | 3/2014 | Aldasem | |
| 8,827,867 B1 | 9/2014 | Simonini | |
| 9,193,398 B2 | 11/2015 | Seifert et al. | |
| 9,194,096 B2 | 11/2015 | Fergeson | |
| 9,546,549 B2 | 1/2017 | Theodorus et al. | |
| 9,547,986 B1 * | 1/2017 | Curlander | G01C 21/3492 |
| 9,718,630 B2 * | 8/2017 | Bambrogan | B60L 13/10 |
| 9,739,296 B2 | 8/2017 | Schlosser | |
| 9,752,436 B2 | 9/2017 | Pavetic et al. | |
| 9,786,182 B2 | 10/2017 | Calmettes et al. | |
| 10,145,241 B1 | 12/2018 | Tessien | |
| 10,458,236 B2 | 10/2019 | Tessien | |
| 10,563,507 B2 | 2/2020 | Tessien | |
| 10,597,895 B1 * | 3/2020 | Daniels | A01K 1/00 |
| 10,913,178 B2 | 2/2021 | Tessien | |
| 2003/0091394 A1 | 5/2003 | Ide | |
| 2004/0079861 A1 | 4/2004 | Giri | |
| 2010/0124461 A1 | 5/2010 | Danskine | |
| 2011/0275302 A1 | 11/2011 | Tarada | |
| 2013/0127088 A1 | 5/2013 | Dillion | |
| 2015/0006018 A1 | 1/2015 | Tesanovic et al. | |
| 2015/0283889 A1 | 10/2015 | Agnew | |
| 2016/0116112 A1 | 4/2016 | Bradfield et al. | |
| 2017/0213458 A1 | 7/2017 | Gordon et al. | |
| 2019/0249551 A1 | 8/2019 | Tessien | |
| 2019/0249552 A1 | 8/2019 | Tessien | |
| 2019/0360335 A1 | 11/2019 | Tessien | |
| 2020/0256190 A1 | 8/2020 | Tessien | |
| 2022/0154577 A1 | 5/2022 | Tessien | |

FOREIGN PATENT DOCUMENTS

| | | | |
|---|---|---|---|
| CA | 2747469 A1 | 11/2012 | |
| CN | 106192646 | 12/2006 | |
| CN | 101649622 | 2/2010 | |
| CN | 102779357 | 11/2012 | |
| CN | 102482943 | 3/2014 | |
| CN | 103835746 | 6/2014 | |
| CN | 105268317 | 1/2016 | |
| CN | 205291219 | 6/2016 | |
| CN | 205989416 | 3/2017 | |
| CN | 110738865 A * | 1/2020 | |
| CN | 111691249 A * | 9/2020 | |
| DE | 12010034241 | 2/2012 | |
| ES | 2264945 T3 * | 2/2007 | G06Q 30/02 |
| FR | 971707 A | 1/1951 | |
| FR | 2253877 | 7/1975 | |
| FR | 2545863 A1 | 11/1984 | |
| GB | 572522 A | 10/1945 | |
| JP | 2002-337124 | 11/2002 | |
| JP | 2013-155599 | 8/2013 | |
| JP | 2015-074886 | 4/2015 | |
| JP | 2019093702 A | 6/2019 | |
| KR | 200268365 | 3/2002 | |
| KR | 20040026763 | 4/2004 | |
| KR | 20060062915 | 6/2006 | |
| KR | 20060062915 A | 6/2006 | |
| KR | 101443308 | 9/2014 | |
| NL | 1035434 | 11/2009 | |
| SE | 501987 C2 * | 7/1995 | G09F 19/22 |
| WO | WO 8604540 A1 | 8/1986 | |

OTHER PUBLICATIONS

"youtube.com" [online], "Simard Suspensions Steerable axles truck", Jul. 30, 2015 [retrieved from Internet on Dec. 19, 2018], retrieved from URL: <https://www.youtube.com/watch?v=PFbyzT4iKyQ>.

'PandoDaily' [online], "PandoMonthly: Fireside Chat with Elon Musk," At Timestamp 41 minutes and 47 seconds, published on Jul. 27, 2012, [retrieved on Jun. 5, 2018], video available at URL: <https://www.youtube.com/watch?v=uegOUmgKB4E&t=3060s >, 1 page.

'PandoDaily' [online], "PandoMonthly: Fireside Chat with Elon Musk," At Timestamp 49 minutes and 50 seconds, published on Jul. 27, 2012, [retrieved on Jun. 5, 2018], video available at URL: <https://www.youtube.com/watch?v=uegOUmgKB4E&t=3060s >, 1 page.

cleantechnica.com [online], "Elon Musk Says All Tesla Supercharger Locations Will Use Solar Power Soon (#ElonTweets), by Steve Hanley," Jun. 10, 2017, [retrieved on May 4, 2018], retrieved from URL: <https://cleantechnica.com/2017/06/10/elon-musk-says-tesla-supercharger-locations-will-use-solar-power-soon-elontweets/>, 7 pages.

ComAcad Drake High, "The Physics of the Secret Subway," published on Apr. 1, 2014, [retrieved on May 4, 2018], video available at URL: <https://www.youtube.com/watch?v=qfo5LVD3BYI>, 2 pages.

Curry et al., "Reducing Aerodynamic Drag & Rolling Resistance from Heavy-Duty Trucks: Summary of Available Technologies and Applicability to Chinese Trucks," Oct. 2012, 33 pages.

EP Extended Search Report in European Appln. No. 19754280.6, dated Mar. 26, 2021, 8 pages.

International Energy Agency, "Global EV Outlook 2017: Two million and counting," Clean Energy Ministerial, Jun. 6, 2017, 71 pages.

International Search Report and Written Opinion in International Application No. PCT/US2019-017638, dated Jul. 1, 2019, 23 pages.

Kinghorn, "Aerodynamic Drag on Intermodal Rail Cars," Thesis for degree of Master of Science, Brigham Young University, Jun. 1, 2017, 75 pages.

(56) References Cited

OTHER PUBLICATIONS

Lammert et al., "Class 8 Tractor Trailer Platooning: Effects, Impacts, and Improvements," National Renewable Energy Laboratory (NREL), Jul. 19-21, 2016, 1 page.
National Petroleum Council, "FTF-Report 080112, Chapter 3: Heavy Duty Vehicles," National Petroleum Council, available on or before Sep. 19, 2015, [retrieved on May 4, 2018], retrieved from URL: <http://www.npc.org/reports/FTF-report-080112/Chapter_3-Heavy_Duty_Vehicles.pdf>, 45 pages.
National Research Council, "Review of the 21st Century Truck Partnerhip, Second Report; Chapter 5: Vehicle Power Demands, p. 82" The National Academies Press, 2012, available on or before Sep. 3, 2016, [retrieved on May 4, 2018], retrieved from URL: <https://www.nap.edu/read/13288/chapter/7#82>, 4 pages.
Patten et al., "NRC-CNRC Technical Report: Review of Aerodynamic Drag Reduction Devices for Heavy Trucks and Buses," National Research Council of Canada, Centre for Surface Transportation Technology, May 11, 2012, 120 pages.
PCT International Preliminary Report on Patentability in International Appln. No. PCT/US2019/017638, dated Aug. 18, 2020, 18 pages.
Roads and Maritime Services, "TP04: Road Tunnel Ventilation Systems," Advisory Committee on Tunnel Air Quality, NSW Government, Jul. 2014, 12 pages.
seekingalpha.com [online], "Tesla's Growing Moat", Oct. 12, 2017, [retrieved on May 4, 2018], retrieved from URL: <https://seekingalpha.com/article/4113229-teslas-growing-moat>, 2 pages.
seekingalpha.com [online], "Will Tesla Disrupt Long Haul Trucking?", Jul. 4, 2017, [retrieved on May 4, 2018], retrieved from URL: <https://seekingalpha.com/article/4085696-will-tesla-disrupt-long-haul-trucking>, 2 pages.
Shabat.am [online], "Norway to constmct floating tunnels for cars,"Aug. 6, 2013, [retrieved on May 4, 2018], retrieved from URL: <https://shabat.am/am/article/71437/Norvegiayum-avtomeqenaneri-hamar-loghacogh-tunelner>, 10 pages.
TheDreamCar "Prototype Pyramid Car on TV WTTW Channel 11," published Oct. 13, 2008, [retrieved on May 4, 2018], video available at URL: <https://www.youtube.com/watch?v=83CSkZJ0-ww>, 2 pages.
TheDreamCar, "300+ mph High Speed Prototype Car Tunnel," published on Oct. 10, 2008, [retrieved on May 4, 2018], video available at URL: <https://www.youtube.com/watch?v=96hNZutWR0o>, 2 pages.
youtube.com/user/TheDreamCar [online], Aug. 13, 2007, [retrieved May 4, 2017], retrieved from URL: <https://www.youtube.com/user/TheDreamCar/videos?flow=grid&view=0&sort=da>, 17 pages.

* cited by examiner

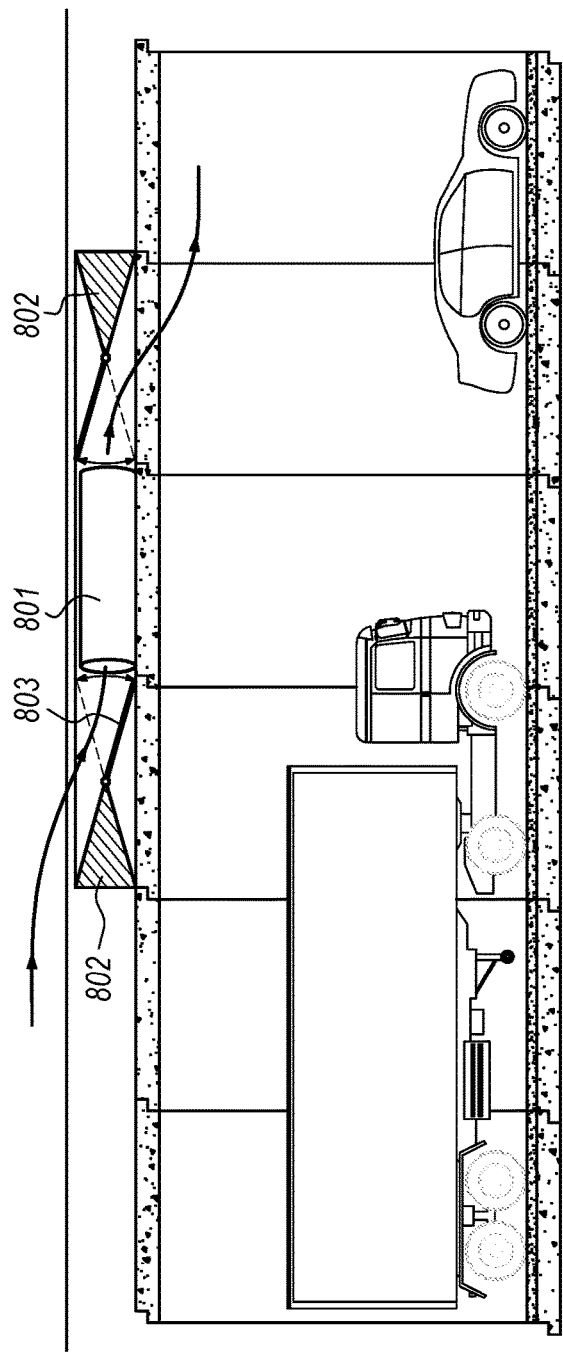
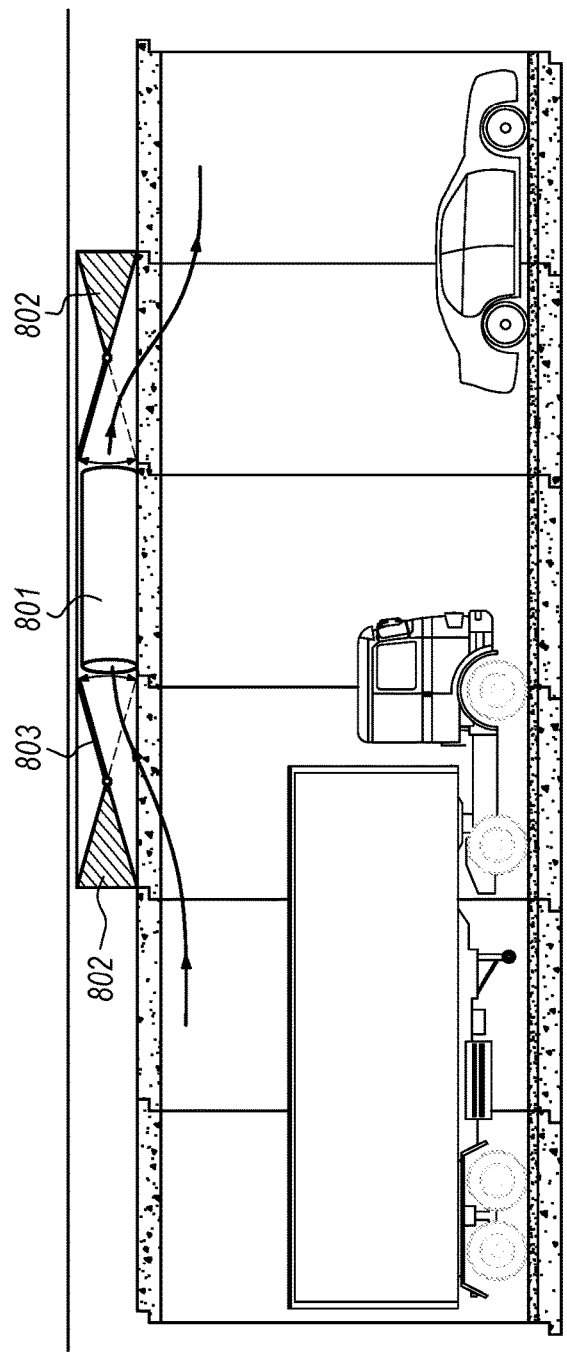
FIG. 8A
FIG. 8B

15

31A ns and Methods

ROADWAY CONDUIT SYSTEMS AND METHODS

CROSS-REFERENCE TO RELATED APPLICATION

This application is a continuation of U.S. patent application Ser. No. 16/208,185, filed on Dec. 3, 2018, and entitled "Conduit Segment Casting Mold and Method of Forming a Conduit Segment," which in turn is a continuation-in-part of U.S. patent application Ser. No. 16/043,896, filed on Jul. 24, 2018, and entitled "Roadway Conduit Systems and Methods," now U.S. Pat. No. 10,458,236, which in turn is a continuation of, and claims priority under 35 U.S.C. § 120 to, U.S. patent application Ser. No. 15/970,700, filed on May 3, 2018, and entitled "Roadway Conduit Systems and Methods," now U.S. Pat. No. 10,145,241, which in turn claims priority under 35 U.S.C. § 119 to U.S. Provisional Patent Application Ser. No. 62/631,253, filed on Feb. 15, 2018, and entitled "Roadway Conduit Systems and Methods." The entire contents of all previous applications are incorporated by reference herein.

TECHNICAL FIELD

This disclosure relates to roadway conduit systems.

BACKGROUND

Freeways and road transportation across land is a ubiquitous method of travel around the world today. Cars, trucks, busses, semi-truck trailers and other vehicle types travel roadways from one location to another, carrying passengers, goods and freight. Likewise, rail way vehicles perform a similar function using steel wheels and steel rails to roll along thereby reducing the rolling drag energy losses. All of these vehicle transportation methods face the same aerodynamic drag energy losses that scale non-linearly with velocity.

SUMMARY

In an example implementation, a conduit segment casting mold system includes at least one inner mold; at least one outer mold configured as at least two outer mold sections of opposed shapes that define a cavity between the at least two outer mold sections that is sized to at least partially enclose the at least one inner mold, each of the at least two outer mold sections including a respective mating surface, each of the at least two outer mold sections including at least one hole sized to receive a cable, and the at least one hole of a particular one of the at least two outer mold sections is aligned with the at least one hole of another particular one of the at least two outer mold sections when the mating surfaces of the particular one and the another particular one of the at least two outer mold sections are mated; and a mold base.

An aspect combinable with the example implementation further includes a cable positioned through the aligned holes and through a volume defined between the at least one inner mold and the at least one outer mold when assembled to the mold base.

In an aspect combinable with any of the previous aspects, the volume is sized to receive a volume of a hardenable material that forms at least a portion of a conduit segment.

In an aspect combinable with any of the previous aspects, the hardenable material, when cast, completely surrounds at least a portion of the cable positioned in the volume.

In an aspect combinable with any of the previous aspects, each of the outer mold sections includes a long wall and two short walls orthogonally connected to the long wall and in parallel, and the at least one hole is formed in the long wall.

In an aspect combinable with any of the previous aspects, the portion of the cable positioned through the aligned holes and through the volume defined between the at least one inner mold and the at least one outer mold when assembled to the mold base is oriented parallel to the two partial walls.

In an aspect combinable with any of the previous aspects, the hardenable material includes concrete, and the cable includes a steel cable.

In an aspect combinable with any of the previous aspects, the cable positioned in the volume is pre-stressed prior to pouring the hardenable material.

In an aspect combinable with any of the previous aspects, the cavity is oriented vertically such that a first opening of the cavity defined by the at least one inner mold and the at least one outer mold faces upward.

In an aspect combinable with any of the previous aspects, each of the two outer mold sections includes at least one clamp configured to secure the two outer mold sections together to contactingly engage the respective mating edges together In an aspect combinable with any of the previous aspects, the at least one inner mold includes a first piston hole formed therethrough, and the at least one outer mold includes a second piston hole formed therethrough.

In an aspect combinable with any of the previous aspects, the at least one inner mold includes at least one hingeable break formed or positioned on a face of the at least one inner mold at a portion of the face that is more flexible to bending than another portion of the face at which the break is not formed or positioned.

In an aspect combinable with any of the previous aspects, the at least one inner mold includes at least four faces, and each of the four faces includes one of the at least one hingeable breaks formed or positioned on the face and where at least one of the hingeable breaks is oriented vertically when the inner mold is attached to the mold base.

In an aspect combinable with any of the previous aspects, the at least one inner mold with the at least four faces includes a collapsible inner mold.

An aspect combinable with any of the previous aspects further includes at least one tube positioned in the cavity between the inner and outer molds, the tube extending from a pre-determined location in the base mold to a pre-determined location of the top opening of the casting system, where the location in the base mold and the location in the top opening are two points along a line that is parallel a vertical corner of the at least one outer mold.

In an aspect combinable with any of the previous aspects, the cavity is shaped in the form of at least one of a roadway conduit segment or a railway conduit segment.

In another example implementation, a method of forming a casting mold of a conduit segment includes positioning at least one inner mold onto a mold base; positioning at least one outer mold on the mold base surrounding the at least one inner mold, the at least one outer mold configured as at least two outer mold sections that define a cavity between the at least two outer mold sections and the at least one inner mold when the outer mold surrounds the inner mold; positioning at least one cable in the cavity and through at least one hole formed in each of the at least two outer mold sections;

tensioning the at least one cable to a pre-determined tension; subsequent to the tensioning, pouring a hardenable material into the cavity; curing the hardenable material poured into the cavity to form a conduit segment; removing the at least one inner mold and the at least one outer mold from the formed conduit segment; and removing the formed conduit segment from the mold base.

In an aspect combinable with the example implementation, each of the at least two outer mold sections including a respective mating surface, and positioning the at least one outer mold includes positioning the at least two outer mold sections such that the respective mating surfaces are in contacting engagement.

An aspect combinable with any of the previous aspects further includes fixedly attaching the at least two outer mold sections to the mold bases and to each other.

An aspect combinable with any of the previous aspects further includes setting a rebar grid within the cavity prior to pouring the hardenable material into the cavity.

In an aspect combinable with any of the previous aspects, each of the at least two outer mold sections includes a long wall and two short walls orthogonally connected to the long wall and in parallel.

In an aspect combinable with any of the previous aspects, the at least one rebar grid is positioned in the cavity parallel to the long wall.

In an aspect combinable with any of the previous aspects, the step of setting the rebar grid is performed prior to positioning the at least one inner mold onto the mold base.

In an aspect combinable with any of the previous aspects, the step of positioning the at least one cable is performed prior to positioning the at least one inner mold onto the mold base.

An aspect combinable with any of the previous aspects further includes maintaining the exerted tensile force to the at least one cable during the curing of the hardenable material poured into the cavity to form the roadway conduit segment.

An aspect combinable with any of the previous aspects further includes removing a portion of the at least one cable that extends through the hole and past an outer surface of the outer mold section.

An aspect combinable with any of the previous aspects further includes attaching braces between inner surfaces of the at least one inner mold.

An aspect combinable with any of the previous aspects further includes consolidating the poured hardenable material that is poured into the cavity.

In an aspect combinable with any of the previous aspects, removing the at least one outer mold includes operating one or more pistons positioned in the at least two outer mold sections to separate the at least two outer mold sections from the formed conduit segment; and detaching the respective mating surfaces of the at least two outer mold sections from contacting engagement.

In an aspect combinable with any of the previous aspects, removing the at least one inner mold includes operating at least one piston positioned in at least one wall of the at least one inner mold to actuate the at least one flexible hinge positioned on the at least one wall such that the at least one wall with the at least one hinge collapses inwardly away from the cast segment; and lifting the at least one inner mold up above the formed conduit segment.

In an aspect combinable with any of the previous aspects, the formed conduit segment is a four sided roadway conduit segment or a four sided railway conduit segment.

An aspect combinable with any of the previous aspects further includes forming at least one groove in an end surface of the formed conduit segment; and affixing a compressible water barrier into the at least one groove prior to use of the conduit segment.

An aspect combinable with any of the previous aspects further includes forming a pair of grooved channels on the formed conduit segment sized to receive rails.

An aspect combinable with any of the previous aspects further includes inserting a compressible water barrier into a groove in the base mold, the groove shaped to receive the compressible water barrier, the water barrier protruding into the space into which the hardenable material will be cast such that the hardenable material, after hardening, will capture at least a portion of the compressible water barrier and where at least another portion of the water barrier protrudes out of the hardened material after being cast.

In another example implementation, an autonomous and driverless electric freight vehicle includes a flatbed that includes a freight-hauling surface and a plurality of electric batteries; at least two independently steerable wheels coupled to the flatbed, each wheel including a tire, the vehicle further including at least one electric traction motor coupled to at least one of the wheels that, in combination with the plurality of batteries, is configured to exclusively provide electric motive power to at least one wheel; and a steering and velocity control system communicably coupled to the at least two independently steerable wheels and the at least one traction motor and including at least one camera, the steering and velocity control system configured to control the at least two independently steerable wheels to maneuver the flatbed within the roadway conduit.

In an aspect combinable with the example implementation, each tire includes a speed rating between 90 mph and 240 mph.

In an aspect combinable with any of the previous aspects, the flatbed includes one or more shipping container twist locks.

In an aspect combinable with any of the previous aspects, the flatbed includes a towing trailer hitch configured to connect to a trailer.

In an aspect combinable with any of the previous aspects, the steering and velocity control system is configured to communicate with a roadway conduit control system.

In an aspect combinable with any of the previous aspects, the at least two independently steerable wheels include ten independently steerable wheels.

In an aspect combinable with any of the previous aspects, the ten independently steerable wheels are positioned in a first group of five on a first side of the flatbed and a second group of five on a second side of the flatbed opposite the first side.

In an aspect combinable with any of the previous aspects, each independently steerable wheel in the first group is paired with an independently steerable wheel in the second group.

In an aspect combinable with any of the previous aspects, at least some of the ten independently steerable wheels are grouped into a first truck that includes four or eight of the independently steerable wheels; a ring gear; and a motor gear configured to rotate the first truck in response to the steering and velocity control system.

In an aspect combinable with any of the previous aspects, the vehicle has a coefficient of drag greater than 0.80.

In another example implementation, a method for moving freight through a roadway conduit system with an autonomous and driverless electric vehicle that includes a flatbed that includes a freight-hauling surface and a plurality of electric batteries, at least two independently steerable wheels coupled to the flatbed, each wheel including a tire and at least one traction motor, and a steering and velocity control system communicably coupled to the at least two independently steerable wheels and including at least one camera. The method includes controlling, with the steering and velocity control system, the plurality of electric batteries and the at least one electric traction motor to exclusively electrically power the at least two independently steerable wheels of the vehicle to move the vehicle through the roadway conduit system; controlling, with the steering and velocity control system, the at least one camera to determine a driving path for the vehicle through the roadway conduit system; and controlling, with the steering and velocity control system, the at least two independently steerable wheels and the at least one traction motor to direct the vehicle on the determined driving path.

An aspect combinable with the example implementation further includes directing, with the steering and velocity control system, the vehicle toward a roadway conduit system internal combustion engine (ICE) entry barrier; requesting, with the steering and velocity control system, entry of the vehicle through the ICE entry barrier and into the roadway conduit system; receiving, at the steering and velocity control system, approval for entry of the vehicle through the ICE entry barrier and into the roadway conduit system; and controlling, with the steering and velocity control system, the at least two independently steerable wheels and the at least one traction motor to direct the vehicle through the ICE entry barrier and into the roadway conduit system.

In an aspect combinable with any of the previous aspects, the request for entry of the vehicle through the ICE entry barrier and into the roadway conduit system includes vehicle data, and the approval for entry is based at least in part on the vehicle data.

In an aspect combinable with any of the previous aspects, the vehicle data includes at least one of vehicle identification, a desired destination, a charge status of the plurality of batteries, a condition of the vehicle.

In an aspect combinable with any of the previous aspects, the approval for entry includes data including at least one of an entry permission, an entry time, or an acceleration profile for the vehicle.

An aspect combinable with any of the previous aspects further includes during movement of the vehicle through the roadway conduit system, receiving, at the steering and velocity control system, information including an emergency situation in the roadway conduit system; and controlling, with the steering and velocity control system, the at least two independently steerable wheels and the at least one traction motor to direct the vehicle to exit the roadway conduit system.

An aspect combinable with any of the previous aspects further includes during movement of the vehicle through the roadway conduit system, receiving, at the steering and velocity control system, information directing the vehicle to change speed in the roadway conduit system; and controlling, with the steering and velocity control system, the at least one traction motor to change speed of the vehicle in the roadway conduit system.

An aspect combinable with any of the previous aspects further includes during movement of the vehicle through the roadway conduit system, sending, from the steering and velocity control system, information to the roadway conduit system, the information communicating that the vehicle is experiencing a problem and is declaring an emergency condition.

In an aspect combinable with any of the previous aspects, the emergency condition is a runaway vehicle where braking has failed on a steep downhill incline and where the information communicated is a request for the roadway conduit control system to reverse the air flow in the downhill portion of the roadway conduit so as to provide aerodynamic braking of the vehicle experiencing an emergency condition.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF DRAWINGS

FIGS. 8A-8B show an example method for constructing an eight-way air mover including air flow paths.

DETAILED DESCRIPTION

Figure 1A:
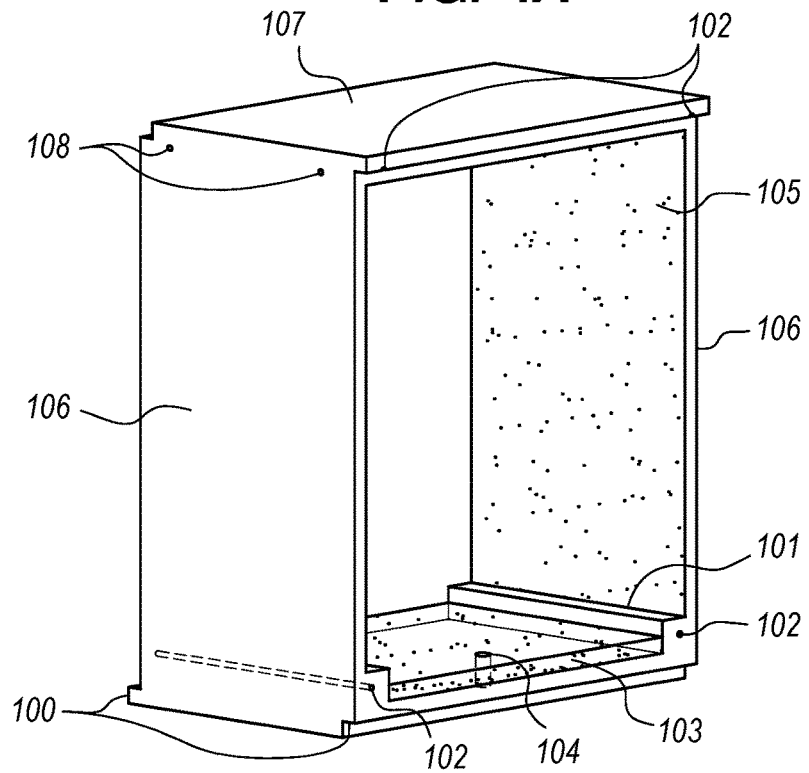
FIGS. 1A-1B show a view of a single individual section of a precast concrete conduit segment.

The present disclosure relates generally to structures and methods to reduce the energy per mile to transport goods and people. The reduction in energy cost can alternately be used to increase the speed of transportation. The advantage of the present disclosure stems from the fact that as a vehicle on a surface roadway increases velocity, the aerodynamic drag increases in a nonlinear fashion. For a class 8 semi-truck at typical freeway speeds, approximately two thirds of the energy to propel the truck is spent to overcome aerodynamic drag and one third is spent to overcome rolling friction and other drag losses. Conduit ways can entirely eliminate the two thirds, aerodynamic, energy cost.

The present disclosure further relates, generally, to conduit ways for transportation that conserve kinetic energy imparted to air within the way for the benefit of vehicles travelling through the conduit way(s). While in certain locations the conduit way may be constructed below ground and then be considered a tunnel, such construction choice is more expensive and therefore typically the exception and not the norm. Typically, conduit ways are constructed at ground level using the earth as support and with the top of the conduit way structure close to and preferably in connection with the planetary atmosphere for easy communication of atmospheric air into and out of the conduit way.

The present disclosure discloses a new and low cost method for constructing conduit ways, the lower cost enabling the technology to be commercially deployed along routes heretofore economically impossible. Conduit ways in their various forms have in common that the air within the conduit and within energetically significant fluid dynamic communication with vehicles within the conduit, when vehicles are using the conduit, is moving in the same sense as do vehicles within the conduit. This reduces the headwind experienced by the vehicles and with that, the energy demand placed upon the vehicles. This air flow condition is the norm, though as will be disclosed there are emergency and other conditions when this typical rule is not desirable (runaway trucks), so that this condition is not a requisite of a conduit way.

In some embodiments, vehicles within the conduit impart kinetic energy to the air in the conduit, the conduit conserving that kinetic energy longer than would a surface roadway, for the benefit of other vehicles within the conduit way, and in other embodiments optional air movers are added to the conduit ways to impart additional kinetic energy to air within the conduit. In both cases the air velocity of the headwind experienced by a vehicle within the conduit way is reduced and with air movers if desired, can then be caused to be 0 mph, or even negative. This eliminates the aerodynamic drag and therefore the energy demand placed upon the vehicle. The vehicle range is thereby significantly increased, a benefit particularly useful for Electric Vehicles (EVs) and other zero emission vehicles.

The vehicles using the conduit ways can be road vehicles such as cars, trucks, semi-trucks with trailers and the like, or they can be rail vehicles with steel wheels riding along steel tracks. Preferentially, the vehicles used to propel freight, goods and people are zero emission vehicles such as EVs, so that the conduit way does not need to expel air and with it, imparted kinetic energy, in order to maintain non-toxic breathable air within the conduit.

Counter to modern Tunnels, where vehicular energy is parasitically used to reduce the energy required of blowers to maintain breathable air within the tunnel, conduit ways provide the opposite benefit to vehicles therein. Within conduit ways, when provided with Air Movers, the purpose of the air movers is to increase the interior air velocity and thereby decrease the vehicular headwind and in turn, vehicular energy consumption per mile. This increases vehicular range per on board energy store, which for an EV is the kWh capacity of the battery, or onboard compressed gas store, or other onboard zero emission energy store. This vehicular benefit typically comes at an increased operational cost to the conduit way system.

Counter to modern underground tunnel construction which typically costs $1B per mile, or proposed tunnel designs hoped to cost as low or lower than $100 M per mile, figures too large for reasonable experimentation, the present disclosure solves the problem of construction cost by teaching how to build a conduit way for under $10 M per mile and in some cases as low as $2 M per mile. The dramatic construction cost reduction enables the present conduits to be deployed along travel corridors heretofore not possible.

The structural innovations disclosed here make possible for the first time, construction of Useful long distance tunnels that can reasonably be constructed to unlimited length including 3,000 mile long cross country roadway conduit ways and railway conduit ways for the transportation of goods and people from a first to a second location. This Usefulness results from the reduced amortized cost of construction combined with the reduced operational cost for energy to power the systems. These combined costs are lower than the cost of fuel and driver labor to transport freight and people along typical surface roadways such as the US Interstate Freeway system.

Because the combined cost of (amortized) construction plus the conduit way operational costs can be lower than the cost of operating a vehicle on a surface roadway, the present disclosure teaches a method capable of lowering the total cost of transportation by shifting vehicles from rolling along surface road ways and rail ways, to rolling through conduit ways (road and/or rail). This reduction in total vehicular operating costs can be partially charged as a toll for using the conduit ways and thereby enable for the first time, both the conduit way operator and the vehicle operator to benefit via revenue from tolls and from transit cost savings, respectively, as a result of the creation of a new conduit way system.

Implementations according to the present disclosure may include a system of one or more road way conduits disposed to provide lower energy consumption corridors to convey people and/or goods from a first to a second location. The road way conduit(s) conserve kinetic energy communicated to the air within the conduits. Two communication methods are the so called piston effect where moving vehicles within a conduit communicate kinetic energy to the air within the conduit and a second method is where an air mover coupled to air within and optionally also to air outside of the conduit, such that the action of the system acts to increase the velocity and/or modify the pressure of the air within the conduit in such manner as to reduce the power required to propel a vehicle through the conduit at a fixed velocity, and/or also to increase the comfort of passengers via a reduction of internal pressure excursions.

By reducing the power required of a vehicle to travel at a fixed velocity, the road way conduit affords the vehicle the benefit of reduced energy consumption per mile travelled.

A vehicle within the conduit way can travel at the same velocity as a surface roadway and enjoy a reduced energy demand per mile travelled. As well, a vehicle can travel at a significantly increased velocity relative to the ground, and yet by arranging for the air to be moving with the vehicle, the energy demand on the vehicle can be caused to be much lower than it would have been on a surface roadway at a slower velocity. A vehicle could for example, travel within the roadway conduit at 120 mph with a 0 mph headwind and would expend less energy per mile than the same vehicle travelling at about 40 mph on a surface roadway with a 40 mph headwind.

As energy costs money, changing the energy required to transport goods and/or people from a first to a second location provides an economic advantage to the vehicles using the conduit system. A portion of that economic advantage could be paid as toll so that both the vehicle operator and the roadway conduit operator profit. This creates a mutual benefit and a reason for creation of the roadway conduit systems.

Further, the road way conduit system proposed here additionally enables safe deployment of autonomous vehicle control. This feature eliminates the cost and/or burden of providing every vehicle with a human driver. Eliminating the task of piloting a vehicle provides an additional economic and/or functional value to the vehicle operator.

Combined, the savings in energy cost plus the savings in vehicle piloting cost (and/or effort) create an incentive for vehicle operators to utilize the road way conduit system and to pay a toll so long as the toll cost can be made smaller than the combined savings value.

The benefit to trucking companies, for example, is a combination of reducing transportation energy costs to below those incurred by shipping freight by rail, and as well, the cost of piloting trucks can be eliminated. These two savings are significant and a portion of these savings can be directed to a toll that covers the amortized cost of an appropriately designed and operated road way conduit system.

The benefit to private vehicle travel is a combination of the energy savings as before, and the ability to activate autonomous vehicle piloting so that rather than focusing on driving a vehicle, sometimes for hours on a long journey, the "driver" can engage autopilot functionality and then perform other tasks such as reading, working, or watching a movie on a long journey. The "driver" becomes a passenger in a similar way that a passenger on an airplane or in the rear seat of a car today, is able to direct their attention to activities other than piloting the vehicle. While expected to be realized in the future on surface roadways, conduit ways enable safe use of autonomous piloting today.

These benefits have value and so long as the conduit system can be built at a low enough cost so that the toll necessary to cover all costs is below the value of these advantages, then the private vehicle will perceive value in using the system in spite of the toll charges to cover roadway conduit system operational and amortized construction costs.

The benefit to companies in the Fulfillment industry (such as Amazon) is that goods can, with the conduit system, be moved from a warehouse to another location at a lower cost than is possible today. This can be used to either increase profit margins or reduce consumer charges.

In addition to road vehicles the same conduit systems can be applied to rail transportation. Today, battery powered train cars are rare. There are, however, electric trains. Electric trains can have distributed motors on all of the cars and in this sense, a train is very similar to a large number of individual semi-trucks all connected (physically and aerodynamically) together. The two advantages trains have is that they use steel wheels, and therefore they benefit from having a much lower rolling friction drag force to overcome, and, their cars are closely spaced and often aerodynamically coupled to significantly reduce aerodynamic drag energy losses. They still, however, must overcome aerodynamic drag, and as the velocity of the train increases, the aerodynamic losses increase non linearly.

By combining the electric train concept with the roadway conduit concept and the semi-truck battery powered concept, a new class of transportation can be realized. Within the conduit way the aerodynamic drag can intentionally be partially or entirely zeroed out (albeit at the cost of powering air through the conduit way, which typically requires much less energy than powering a vehicle through stationary air on a surface roadway).

Doing this with a rail vehicle, however, also eliminates the wheel friction losses. The electric semi-truck proposed by Tesla supposedly can transport freight at a lower cost than a typical Diesel train. A simple blunt container with wheels and a motor and zero aerodynamic features, converted to a rail vehicle with steel wheels a battery and motors, and then inserted into a proposed railway conduit system as opposed to a roadway conduit system, would have a cost per mile per ton of freight that would be even lower than the Tesla Semi-truck due to both reduced wheel drag force and also reduced aerodynamic drag. The Tesla Semi-truck for example cuts aerodynamic drag in half. In comparison a blunt vehicle without aerodynamic features, within a conduit way can cut aerodynamic drag to zero. This per mile per ton of freight cost reduction will then result in reduced freight transportation cost and in the end, reduced cost of goods sold to customers.

Energetically, the cost of moving freight, per ton per mile, using a battery powered and/or electric train car within a conduit way is lower than the cost of moving freight per ton per mile using ocean going containerized freight systems. Today, ocean going freight transportation is the lowest cost method for moving freight. This new system is estimated to have an even lower cost per ton per mile making it the lowest cost method for moving freight bar none.

Rather than shipping from New York to the West Coast by ocean freighters being the lowest cost freight transport method, the new railway conduit system would become the lowest cost method and in this way, delivery of freight throughout the middle regions of the US and other countries can cost less than shipping across oceans using highly polluting bunker fuel.

This reduces the pollution emitted by typical freight transportation methods and at the same time reduces the cost for moving freight. Rail conduit ways can provide the lowest cost method for moving freight and passengers from a first to a second location, beating all other transportation forms.

In some aspects, a roadway conduit system (or railway conduit system) may be distinct from a tunnel in that, conventionally, a tunnel is provided for a vehicle to traverse through or under a barrier such as a mountain, a river or other water way, a crowded city and so on. In some aspects, roadway conduit system includes a vehicle way that is built in a location where a normal surface roadway would normally be constructed as there are no obstacles to get past, under, or through. Instead, the purpose of the conduit way may be completely different with the goal of reducing vehicular energy cost and increasing vehicular range, as compared to getting past some obstacle. Also, in some aspects, such a conduit system may achieve the goal of reducing the cost of construction of vehicle ways (compared to vehicle tunnels) and may reduce the operating cost of same so that, for the first time, it becomes economically feasible/profitable to build such a conduit system.

Within a conduit way, it can be arranged that the air within the conduit is moving in the same sense and the same velocity as the vehicles within the way. Exactly what the relative velocity chosen will be is determined based on a variety of parameters including costs for moving the vehicles and costs for moving the air. But it can easily be arranged that the air in a conduit way is moving at the same velocity as a semi-truck, e.g., at 70 mph.

In this case, the truck and air are moving at the same speed. Therefore the headwind experienced by the truck is 0 mph and there is no aerodynamic drag imposed upon the truck. This saves the truck about 67 percent of the energy cost it would have been expending if it were on an open roadway. At the same time, the roadway conduit will experience a cost associated with moving the air at that velocity.

The difference is that from an energy to move air perspective, the interior bore of the tunnel is dramatically smoother, or "cleaner" to the air flow than is the truck moving through stationary air on a surface roadway. The tunnel is also, however, very long compared to the truck. If a single truck were within a 400 mile tunnel and the air down the entire length of the tunnel were all moving so that the truck (at its location along the 400 mile conduit) could enjoy zero headwind, the cost would be very much larger than the cost to just move the truck down a surface freeway.

But, if there are a large enough number of vehicles within the conduit way, then the cost of moving the air incurred by the conduit way can be shared by all of the vehicles in the conduit way. There is therefore a break even density of vehicles within a conduit way where the cost of operating the conduit way is equal to the cost of moving the vehicles along a surface roadway.

By analyzing real traffic data from Departments of Transportation, one can determine candidate routes where installation of a conduit way would be cost effective based on vehicle count. However, the DOT data is essentially all ICE (Internal Combustion Engine) vehicles and for reasons to be described (toxic exhaust emissions), ICE vehicles cannot be allowed to operate within the tunnels. Vehicles may be restricted to EVs and/or ICE vehicles may be required to board an EV sled to carry the ICE vehicle through the conduit way.

Then, by further analyzing the EV adoption curve, the select few of those candidates where EV adoption is potentially large enough to support the necessary density of vehicles to reach a usage level greater than break even can be selected. As the EV adoption proceeds over the coming decade, additional routes will reach a user level where profitable installation of conduit ways will be possible.

There are two basic costs that need to be satisfied to yield a profitable corridor. The first is that the cost of the construction must be paid via an amortized method over a number of years, for example 30. Second, the cost of powering the conduit systems such as air movers, lights and so on must be added to the amortized construction cost. The sum must be exceeded by toll revenue in order that the conduit way be in fact, useful.

Keeping this in mind it is of paramount importance that a new method for constructing the ways be found. Typical vehicular tunnels can cost $1 billion per mile. The Boring Company has aspirations to reduce this for smaller tunnels, to $100 million per mile. Both of those tunnel systems must first bore a hole through earth and then install a tunnel lining. All the while construction must be carried out below ground. This is a prohibitively expensive process and results in extremely high amortized cost of construction incompatible with constructing long distance conduit ways.

The present method is based on the fact that to enable the conservation of energy for the air motion within the conduit way, the conduit way need not in fact be constructed below ground. Rather, it is far less expensive to simply set cast in place and/or precast concrete conduit segments on top of the earth, join them together so that they create effectively a "tunnel" which for this application will be called a "conduit way" to distinguish it from real tunnels which are below ground and typically have a different purpose of penetrating through an obstacle.

By using a precast method of construction, all of the components to build a long conduit way can be entirely constructed off site. Then, all of the components can be brought to the location of the way and installed in very rapid time. A single crew can build as much as a mile per day with a cost factor as low as $2 million per mile being reasonable. This, in the end, results in a far lower amortized cost basis and enables routes that would not be possible using existing tunnel construction methods.

Normally, aerodynamics of road vehicles is used to reduce the cost of moving vehicles down a roadway. To shift the vehicles into a conduit way may require that one analyze air flow in a conduit rather than air flow around a vehicle. This is a different field of study that uses different equations to consider design parameters.

However, if one makes a simplistic comparison of a tunnel interior to a train exterior using the concepts of topology, it can be understood that both surfaces are similar. They are long, they are smooth, and they provide little resistance to air moving along the surface. The tunnel, however, is far longer than any train and it can be much smoother as well. Therefore, per unit length, the tunnel has the lower air friction. And finally, the tunnel does not have a front and a rear to enable form pressure drag to manifest as is the case for the train. For a vehicle in air, pressure drag is greater than skin friction drag until the vehicle becomes very long. This is why trains have an advantage in lower air drag energy demand, but they still have a front and a rear, so still suffer from pressure drag in addition to skin friction drag.

The air within a tunnel doesn't care where the tunnel is located. It could be below ground or above ground or on the ground or through a mountain or under a river or under a sea. But from a construction perspective, there is a big difference in cost and building a conduit way on or at the surface of the planet enables use of surface excavators and other bulldozers and equipment that cost far less than tunnel boring machines or blasting to build an underground tunnel.

To make the conduit ways work, it is optionally desired to add a variety of components to the conduit ways. These include ingress and egress ways, electric vehicle charging locations connected to the conduit ways, air movers to increase the KE within the air inside the conduit ways to further reduce the energy demand upon the vehicles, solar and wind farms, preferably combined with battery power storage to enable 24/7 conduit way operation, and other systems such as an ICE vehicle barrier to prevent exhaust emitting vehicles from entering the conduit way.

It is also desirable to optionally include a centralized conduit way control system that monitors all activity within the conduit way. In case of emergency the system can communicate directives to vehicles that are perhaps still very far away from arriving at the location of the emergency, and still unaware that an emergency condition exists ahead. The control system can direct vehicles throughout the conduit way to take action to minimize the bother of the emergency situation as well as to help remediate the emergency by making way for emergency vehicles. Individual vehicles can be directed to take specific action(s) via bi directional communication between the central control system and the vehicles, preferentially using a conduit interior Wi-Fi communications system.

The system will also communicate with each vehicle as it enters the conduit way to determine its entry location and exit location, compute the traffic within the conduit to verify that traffic flow can be maintained with the additional vehicle, assign entry and exit times and so on. In the case where the conduit way control system is moving vehicles through the way in platoons, one choice of solution is where a vehicle wanting to enter will be directed to enter into the conduit ahead of a platoon of vehicles and to travel at a velocity slower than the platoon. Then, when the platoon catches up to the new vehicle, it will be directed to speed up to the platoon cruising velocity and assume a lead position. It will maintain that lead position until another new vehicle enters the conduit way system and takes over that lead position.

Alternately the vehicle could be instructed to enter the conduit way just after a platoon had passed and be directed to catch up to the rear of the platoon.

Platooning of vehicles down a long conduit enables the conduit system to only drive air movers when a platoon is approaching, passing, or recently passed an air mover position. There is no point in driving air through the air mover if no vehicles are nearby to energetically benefit from the KE imparted to the air flow within the conduit way.

Another important aspect of the present disclosure is to couple a renewable energy form to the vehicle transportation energy cost. This shifts the energy cost requirement from petroleum transportation fuels (gasoline/Diesel) to renewable energy (solar, wind, hydro, wave, geothermal, etc.). While a conduit way could be operated using utility power as its energy source, today it typically costs less to generate the energy from solar or wind power than it would cost to purchase energy from a utility. The conduit ways, in order to be profitable, have a large enough energy load to justify construction of a large number of solar power and wind power renewable energy farms. This enables direct real time communication of energy from a renewable energy source, to moving vehicles, thereby entirely eliminating fossil fuel combustion to effect the vehicular translation.

To realize this connection it is advantageous to construct ingress and egress locations that connect to the renewable energy farms, preferably fitted with battery or other electrical energy storage equipment. This enables use of the ingress and egress conduits to bring high power cables from the renewable energy farm into the long conduit way.

These entrance exits to the renewable energy farm(s) also enable vehicles to exit and enter at the same locations. As renewable energy farms typically occupy a large land area, it is easy to additionally install EV chargers.

In this way these chargers combined with the conduit ways themselves, can provide 100% of the energy needed to transport people and goods across the country for unlimited distances.

As charging can take a while with current EV technologies, it will also be advantageous to include restrooms, restaurants, hotels and other amenities at the stop locations. Rather than using existing on ramps and off ramps of typically adjacent freeways, the conduit ways at an entrance/exit location can be below ground so that the ingress and egress conduits can cross beneath the surface roadway to access a large enough property upon which to build the renewable energy farm alongside the existing surface roadway. This method enables the farm to be constructed far away from existing exits where commerce has already built up and the land is prohibitively expensive for the construction of a renewable energy farm that requires many (potentially 100 or more) acres of land.

One important system of the present disclosure is the air mover. Vehicles within a conduit way will naturally cause the air within to move. This enables all vehicles to benefit one another as the conduit way will conserve this imparted KE for the benefit of all vehicles there within. However, it is often the case that additional KE imparted to the air within the conduit way would be beneficial. Air movers can be used to provide this advantage.

Because the conduit way is constructed, typically, with the top of the conduit exposed to the planetary atmosphere, it is therefore easy to install an 8 way air mover. this optional and preferable air mover design employs air movers that are able to move air in 2 opposite directions. It is combined with air directors that are able to shift the air flow from the tunnel to the atmosphere on one side, and the air mover on the other side.

This provides two different inlet configurations, two different air mover directions, and two different outlet configurations for a total of 2×2×2 combinations or 8 different configurations for the total system air flow paths. This is useful for modifying the air motion within the conduit way and also for modifying the air pressure within the conduit way.

Figure 6:
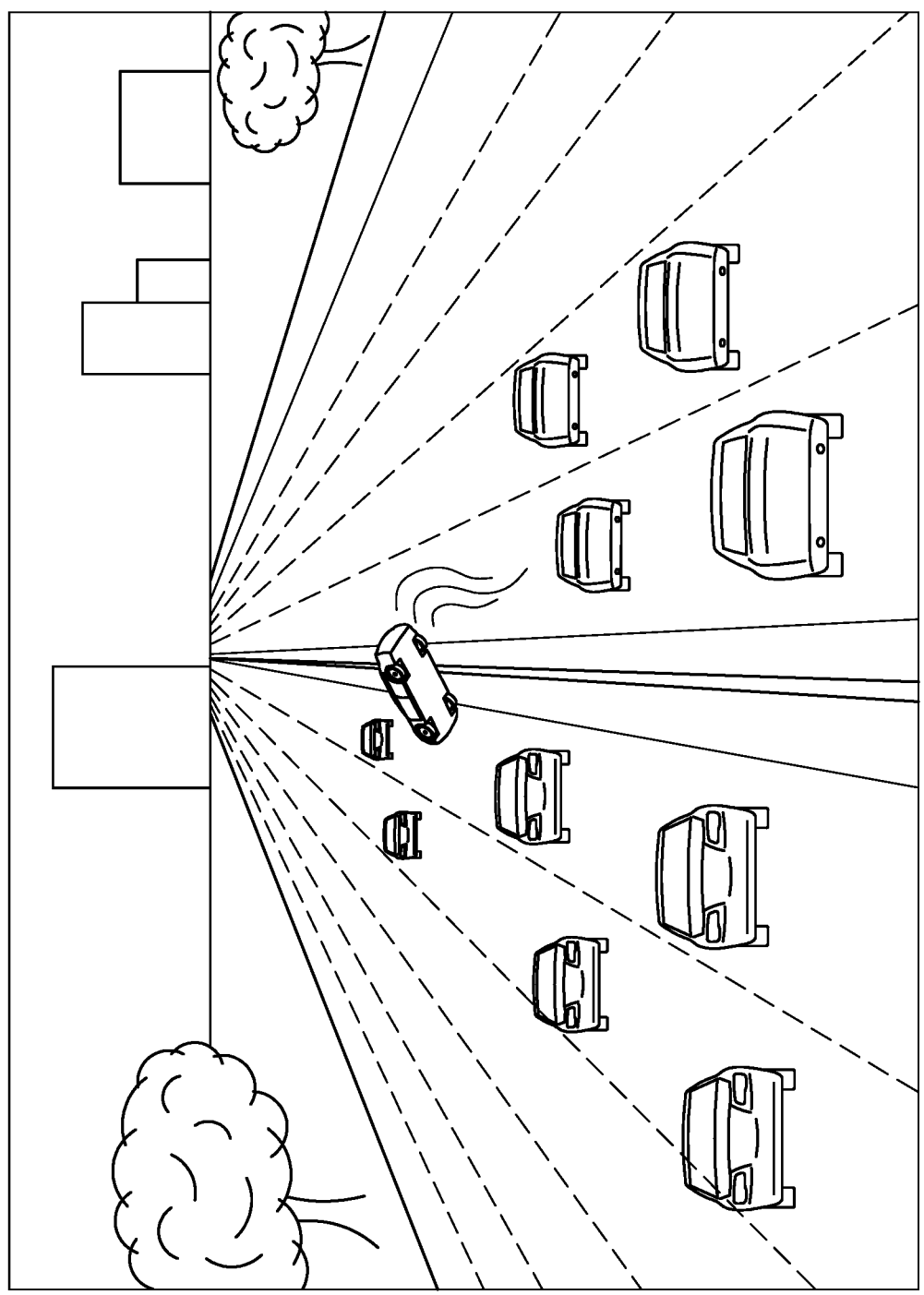
FIG. 6 shows the danger of one vehicle going airborne and crashing over a barrier into oppositely moving traffic, effectively doubling the collision velocity and quadrupling the collision energy.

Another aspect of the present disclosure is that it enables safe autonomous operation of vehicles including cars and class 8 trucks. Within the conduit ways it is impossible for a vehicle to go airborne as it is never running into a high velocity headwind. There are also no obstacles to run into. The only way a vehicle might crash inside the conduit system would be if perhaps a tire burst and the vehicle went out of control. The worst it could do is to slam into the sidewalls and scrape to a gradual stop. It cannot crash into vehicles in adjacent lanes and certainly cannot crash into oncoming traffic to cause a head on collision as is depicted in FIG. 6.

Vehicles ahead of a crashing vehicle will simply continue on their way. Vehicles behind the crashing vehicle will autonomously detect the velocity change and immediately react by slowing their vehicles. At the same time they will communicate the emergency to the conduit way control system and that system will communicate, immediately, to all vehicles close enough to be affected by the emergency that they need to take specific actions such as slowing down, stopping, and/or exiting the conduit way temporarily so that emergency vehicles can access the accident, take care of any injuries, and clean up the problem. Once the problem is removed normal travel can resume.

It is also important to provide emergency exits in the event all of the safety plans fail. If the tunnel were to fill with smoke and anyone were trapped inside, it is important that a path for them to exit be provided. Because the entire roadway conduit system is close to the atmosphere, emergency exit doors can be installed frequently along the length of the conduit system. Preferably, emergency exit doors and pathways to outside atmospheric air are provided at intervals less than 1,000 feet. Still more preferably, emergency exits are provided at intervals less than 300 feet. In the latter case the maximum distance anyone would need to walk or run to exit a conduit way would be 50 yards.

Throughout the modern world, there is a need to move people and goods from one location to another. Transportation today is realized by air, sea, and land. For land transportation there exist railways and roadways. Each of these enable people and goods to move from a first to a second location across the land.

There exist a great number of locations where an obstacle blocking construction of a roadway or railway exists. To get to the other side of the obstacle, one must either travel around the obstacle, over the obstacle, or in some manner, penetrate through or beneath the obstacle. A few examples of obstacles include mountains, rivers, seas, bays, and as well, densely populated cities with a high density of existing structures. When it becomes impractical to remove structures in a city, the structures can become an obstacle to installing a new roadway or railway.

In each case, it is not feasible to remove the obstacle, and, the distance to travel around the obstacle is greater than a distance one could travel if one were to build a tunnel through or under the obstacle. Often, a tunnel is built to enable vehicles to move through a mountain or beneath a river or sea. A 15 minute ride through a tunnel that gets to the other side of a mountain or river can often save 2 hours of travel on alternate ways.

Today, the longest road tunnel in the world is the Laerdal tunnel in Norway. This tunnel penetrates through a mountain and is 15 miles long. It has bi directional lanes for road vehicles to use. The purpose of the Laerdal tunnel is to reduce the travel distance and time, to get from one side of the mountain range to the other.

Today, the longest train tunnel in the world is the Gotthard Base Tunnel in Switzerland which is 35.5 miles long, and the Guangzhou Metro tunnel in China at 37.5 miles long. The longest tunnel of any kind today is the Delaware aqueduct for conveying water, at 85 miles length.

However, obstacles are the exception and not the rule. The vast majority of all road transit around the world takes place on open roadways. These consist of a roadway, typically composed of concrete and/or asphalt materials, disposed upon a flattened and compacted field dirt base. For trains, the norm is for rails to be mounted onto appropriately compacted earth and steel rails, but these too are simple routes on open to the atmosphere ways. The descriptions below will focus on roadways for vehicles such as cars and trucks, but this focus is not intended to limit the scope of this application as railways and other vehicular ways can also benefit from the present disclosure.

This choice of roadway comes with a set of physical criteria that define travel in one location as being substantially similar to travel along a similar roadway in a completely different location around the earth. That these functional similarities exist is so obvious that they are taken for granted.

A few similarities for surface roadways around the world are that they have a flat material for rubber tires to roll upon. The material is often concrete or asphalt concrete or other material to provide a flat surface upon which road vehicles, cars and trucks, can roll. They are open to the atmosphere. Being open to the atmosphere, vehicles travelling upon these roadways are exposed to aerodynamic drag that is a function of the velocity of travel of the vehicles.

The smooth surface enables high speed travel that was previously impossible due to the speed limitations of horses. By providing smooth roadways over a century ago it became possible for vehicles to safely travel at around 65 mph and faster in some locations.

A common issue to deal with is that as the velocity of travel increases, the outcome of accidents becomes worse, meaning, the death rate increases and intensity of collisions increases as does damage to vehicles involved and the severity of injuries that result.

Above about 65 mph, vehicles (including airplanes) can under certain circumstances become airborne. This is a serious problem for road vehicles as if one car is crashing and becomes airborne, it can fly up into the air, across lanes and into adjacent traffic. If the adjacent traffic happens to be travelling in the opposite direction, the head on collision is particularly dangerous and often yields fatalities.

Another ubiquitous aspect of roadway travel is aerodynamic energy loss. It is well known that by changing the shape of a vehicle it is possible to reduce the aerodynamic losses. Recently, for example, Tesla introduced a new Semi-Truck with a remarkable aerodynamic coefficient of drag of just $C_d$=0.36. This value is better than most sports cars and significantly lower than a typical semi-truck with a 0.65 or so coefficient of drag. Tesla went to extreme effort to create wings that open and collapse against the side of the trailer to eliminate the drag associated with air moving around the tractor and hitting the blunt front end of the trailer.

Their success shows two important things. It is very valuable to find ways to eliminate aerodynamic drag upon road vehicles, and, the experts in the field work to improve the shape of the vehicle moving through, the ambient air. As will be described later, the present disclosure instead provides a means to eliminate the aerodynamic drag entirely, rendering these extreme efforts to reduce the Ca of the Tesla Semi useless within the new conduit system proposed. The designs are, however, valuable for use of those semi-trucks on open roadways, which of course comprise the vast majority of all existing roadways today.

A few ideas have been realized that could in principle provide a different path to reducing the drag imposed upon a vehicle. The phenomena known as the piston effect is in essence the recognition that a vehicle moving through air within a tunnel, imposes a transfer of KE from the vehicle to the air within the tunnel and if the air in the tunnel is moving in the same sense as the vehicle, then the "headwind" experienced by the vehicle can be reduced. In this case, the aerodynamic drag is reduced. But this reduction for one vehicle came from an increase in energy demand placed upon another vehicle that got the air moving in the first place. Overall, vehicles today deliver energy to tunnel systems and tunnel systems use that energy to reduce their demand for electrical energy to power blowers for the ventilation of ICE vehicle exhaust fumes.

For land speed record tests, it is always required that the vehicle make the run in two opposite directions within a short period of time so as to eliminate the case where a strong tail wind enabled an artificially high top speed for the vehicle. By averaging the top speed in two opposite directions, a good approximation for the zero wind top speed can be obtained.

In some aspects, a tail wind enables travel at a fixed velocity at a lower power level for a given vehicle. In some aspects, if air within the tunnel is caused to move in the same sense and speed as the vehicles in the tunnel, the vehicular power requirement will be reduced. In fact, the portion of the vehicular power required to overcome aerodynamic drag will be precisely 0 HP in the case where the vehicle speed and tunnel air speed are the same. The vehicle, in this case, will experience a 0 velocity headwind and the only power draw will be to overcome wheel rolling resistance, bearing resistance and the like.

While true, the fact that creating a tail wind within a tunnel can reduce the aerodynamic power requirement for vehicles, does not teach, without undue experimentation, how to do so in a way that is energetically profitable and therefore commercially viable. The reason is that while creating the tail wind for vehicles in a tunnel is something a few have realized could in principle provide a benefit to vehicles, this is insufficient for creating a viable new transit means.

A deeper analysis for the cost of providing that tail wind shows that for a one mile section of a tunnel with reasonable size for road vehicles, it would require about 2 MW of air mover power to eliminate about 30 kW of vehicle power. In other words, while it may be that certain people have realized that it would be possible to reduce the aerodynamic power requirement imposed upon a vehicle if a tail wind was created, a closer analysis shows that doing so would typically be extremely cost prohibitive.

From this it is clear why we do not have hundred mile or thousand mile long tunnels for the purpose of reducing the energy demand of vehicles. A 450 mile tunnel from Sacramento, Calif. to Los Angeles, Calif. would require of order 1 GW of power to enable a wind to remove just 30 kW of power demand if the tunnel had within it a single vehicle. Creating this structure would be economically absurd.

The cost to build a tunnel to experiment with this notion is also non trivial. A typical tunnel may cost $1 Billion per mile to build. If the tunnel size is reduced as proposed by the Boring Company, this cost may be reduced to $100 Million per mile. Assuming this case, a tunnel from Sacramento to Los Angeles would cost about: 2 (tunnels)*450 miles each*$100 M/mile=$90 Billion Then, one of ordinary skill in the art would need to construct around 2 GW of power plants to supply a similar power of air movers just to experiment with whether the idea might work. Someone of ordinary skill in the art would typically realize the outcome would not be fruitful after learning of the cost to build the tunnels, or the cost and power to drive the air movers, or both.

Another feature of surface roadways is that of differential relative velocity. In other words, the danger associated with moving at high speed is of serious concern. If two adjacent lanes of traffic are moving in opposite directions, and at high speed, then the closing velocity for opposing vehicles is double their individual velocities, and the kinetic energy of their combined closing velocity is 4 fold increased (velocity squared). Also, in the case of HOV lanes where entrance is restricted to vehicles with larger occupancy loads, the velocity of vehicles in an HOV lane can often be the full allowed speed of the roadway (for example, 65 mph) while the adjacent lane that is not an HOV lane might be fully stopped.

The differential velocity for head on collisions between two adjacent lanes travelling in opposite directions is 2*65 mph=130 mph and for adjacent lanes such as HOV and normal, where one is stopped, is 1*65 mph=65 mph. If for example, someone in a stopped lane cuts into an HOV lane, a 65 mph collision velocity could be created. If instead, one vehicle went airborne and jumped a barrier and crashed into opposing traffic the impact velocity would be 130 mph.

A different roadway system that eliminated these kinds of accidents as being a possibility would be an advantage. Neither of these collision scenarios is possible within a roadway conduit system.

Another feature of current roadways is that all vehicles must be "driven." In other words, someone must control the motions of the vehicle and remain alert throughout the voyage. Of late, however, it has become possible for computers to control a vehicle and relieve the human driver of that burden. So far these computer controlled systems have not yet been approved to operate on open roadways except for certain experimental purposes. While they should be safer and are purported to be, safer, the fact is they have not been in operation for millions of miles to have "proven" they in fact are safer.

Therefore, it would be an advantage to create a roadway system where autonomous piloted vehicles could be safely enabled and tested. If a crashing vehicle were confined within collision proof walls, there would be less collateral damage caused if a single vehicle under autonomous control were to lose control and crash. The creation of a safe roadway where autonomous vehicles could operate during the testing phase is desirable.

On existing roadways where the roadway is within a tunnel penetrating, for example, a mountain, and where the roadway in a single tube is only in a single direction, there is an effect known as the piston effect. To the degree that the piston effect manifests, it also reduces the power draw of nearby vehicles.

However, with all tunnels today, a greater problem exists. Today, the term "vehicle" is essentially synonymous with "Internal Combustion Engine" (ICE) vehicles. The toxic gases emitted by ICE vehicles requires that the air within any tunnel be continuously eliminated and with it, any KE deposited by moving vehicles. The toxicity of the exhaust gases takes priority and all existing tunnel roadways have provision to ventilate the air within road tunnels.

The result of this is that as the number of vehicles within a tunnel increases, so too does the concentration of exhaust gases. With increased exhaust gas concentration it is necessary to increase the use of air movers or blowers to speed the exhaust of the polluted air within the tunnel. The piston effect is therefore used in modern tunnels to reduce the power required to maintain clean air within the tunnels. Because vehicles interaction with the air causes the air to move, the tunnel operator is able to turn down the power delivered to blowers if a tunnel is designed to take advantage of this phenomena.

When the traffic flow slows down or stops, the power delivered to blowers may be increased. When the traffic volume drops, the vehicular piston effect wanes but so too does the air pollution. Typically, the blower power can be turned off as the vehicle density tends toward zero.

It would be an advantage to eliminate the exhaust gas from the tunnel by eliminating the vehicles that emit it. In this way, it would not be necessary to operate blowers for the purpose of cleaning the air within the tunnel. If the air did not need to be exhausted due to pollution, KE supplied to the air within the tunnel could be conserved for the benefit of vehicles within the tunnel such that the energy consumed by those vehicles could be reduced as they journey from one end to the other of the tunnel.

For existing tunnels, the problem of maintaining breathable air within the tunnels requires large ventilation systems to cleanse the air. As a result, it is desirable to build a tunnel so that it gets past the obstacle in the path of a roadway in as short a distance as possible. Tunnels cost more to build and they require complicated ventilation systems, the complexity of which increases as the length of the tunnel increases. When 2 or more possible paths are considered, all other things equal, the shortest path will yield the lowest cost tunnel with the least complex ventilation system. It is customary and normal practice today, to select a path that will require the shortest possible tunnel.

Counter to the principles upon which modern tunnels are designed, it becomes advantageous, under certain circumstances, to increase the tunnel length if one can restrict usage of the tunnel to vehicles that do not emit noxious gases. The criteria necessary to enable such a tunnel are several, but once enabled a new expectation results. The longer the tunnel the more cost effective the vehicular transit becomes. Determining the necessary criteria to exceed break even becomes the new goal to determine whether or not to build a tunnel along a certain route.

Tunnel construction is expensive and dangerous. Typical road tunnels can cost $1B per mile to construct. Some companies propose that this can be reduced to $100 M per mile in various ways. But this is still very expensive so that only very select routes are chosen to install a tunnel to avoid some obstacle. In this sense, extreme traffic congestion along an existing surface roadway is, an obstacle. Building a tunnel where no obstacle exists makes no sense today. But if one were able to arrange for a tunnel to reduce the energy requirement for vehicles travelling within, then it would be technically desirable to increase the length of tunnels without bound. The key is to work out the cost of tunnel construction and operation compared to the cost of vehicular operation and to find those corridors where installing a tunnel would be cost effective.

Given that this new possibility exists, and upon careful evaluation, one can arrive at the traffic volume required to make a particular tunnel project profitable in the sense of shifting some of the vehicular piloting effort and energy burden from the vehicle to the tunnel system, so that the tunnel operator may charge a toll to recover a portion of the vehicular savings. In this case a further extrapolation can be studied where the cost for tunnel construction is studied so as to minimize the cost per mile to construct a tunnel.

Doing this one will eventually realize that the lowest cost tunnel one can build is a tunnel built on top of the ground. In other words, a tunnel will always come with a material to line the interior of the earth through which the tunnel is bored. But that material would stand as well, if it were constructed on the surface of the earth rather than following a hole cut through a mountain. Appropriate re design of the tunnel wall and roof materials of course being required if the earth is not present to provide support.

Therefore, it would be nice if the cost of boring a hole through the earth could be eliminated from the cost of building a tunnel where the purpose of the tunnel is not to get past some obstacle such as a mountain or waterway, and is instead, to reduce the energy cost imposed upon vehicles travelling through the tunnel. The lowest cost construction for this purpose would be to install the tunnel into a shallow trench or onto the surface of the earth, and to then provide the tunnel walls and roof so as to enable the piston effect and KE conservation of the internal air flow. In this way, the cost of boring a hole through the earth is eliminated.

Further, the cost to assemble the roadway walls and roof of such a tunnel will be lower since it costs less to assemble the tunnel structure components above ground than below ground within a tunnel. Within a tunnel one may construct the tunnel using segments to form, typically, circular rings that lock together. Above ground, one can use the open air to move the structural components around. This enables cast in place construction methods but also, precast and further, precast and post stressed methods. Completed tunnel segment rings, similar to box culverts, can be precast and then hoisted by crane and set, one after another, on top of a suitably compacted dirt base. Working outside, wherever possible, is far less expensive than working within an enclosed tunnel as has been proposed by others. From an aerodynamic perspective for vehicles within a tunnel, it doesn't matter if the tunnel is below ground, on the surface of the ground, or elevated above the ground or above water, or below water. What's important is how the air flow within the tunnel is handled and for that, it's important to eliminate toxic exhaust pollutants.

One key way to realize these features, therefore, is to provide a tunnel with a barrier that blocks entry to toxic exhaust emitting vehicles.

Typically, to build a long tunnel, it has been required to bring tunnel sections into the tunnel from one end while the tunnel is being dug. These sections then fit together and provide support to hold back the earth as the tunnel advances. Typically, long tunnels advance by installing rings of precast concrete segments that form into a circular ring behind a Tunnel Boring Machine as one example. The final segment of each ring is tapered so that the ring becomes stable. Then, grout can be flowed into the segments to lock them together and it can be flowed behind the segments to provide support for the earth behind the segmented ring.

It would be faster and less expensive to assemble a tunnel IF completed pre cast tunnel rings could be manufactured and then, one after another, just set into place by use of a crane and trucks to transport the rings. In this sense, a square or rectangular shape that is a continuous section of a conduit is considered a ring, and the term is not restricted only to circular rings as in an underground tunnel cut by a TBM. Doing this underground is not possible. But doing this above ground or in a shallow trench open to the atmosphere is possible. It would therefore be advantageous if a tunnel could be built where the tunnel, during construction, is open to the atmosphere and construction proceeded in a manner similar to construction of a culvert. Building a tunnel this way is less costly than building a tunnel far below ground where the earth must be excavated and removed down the length of the tunnel, and then a lining must be installed, piece by piece, before the roof of the tunnel collapses.

Given the desire to build a very long tunnel of tens of miles or preferably hundreds of miles long or even more preferably of thousands of miles long, it would be advantageous to build a tunnel where the collapse of overburden on workers is not a concern. This is the case if the tunnel is built above ground and/or in a shallow trench that is open above to the planetary atmosphere, at a minimum, during construction.

The introduction of Electric Vehicles (EVs) has enabled new technologies to be considered and/or realized. One problem with EVs has been the cost of batteries for energy storage. The typical EV range is less than desirable by most consumers and less than what one would expect for gasoline. Further, with gasoline one can just stop virtually anywhere and fill up within a few minutes and be ready to drive another several hundred miles. Gas stations within the modern world, are ubiquitous. The same is not so with EV charging stations and as well, EV range is typically far shorter than gasoline vehicle range.

It has therefore been an interest to find a new way to communicate energy to EVs while they are driving on the open road. To that end a number of solutions have been proposed to date. The only widely enabled infrastructure today are EV charging stations. While far fewer exist than gas stations, they are available now in a significant number of locations, and they do enable re charging of electric vehicles. However, they require the electric vehicle to pull off of the roadway, stop and then charge. They do not convey energy to the vehicle while it is on the roadway.

One proposed solution is to provide a roadway with energized tracks similar to an electrically "hot" 3rd rail used on subway and other trains. This model is also similar to a child's toy "slot car" race track. It would require EV owners to install electrical pick-ups beneath the car that absorb energy from the tracks so that the EV could travel an unlimited distance. It is not clear how the energy would be paid for on that concept and it would require construction of a large number of high power, power plants.

Another idea is to install RF coils in roadways that deliver electrical energy to vehicles while they are moving down the roadway. Some test tracks have been proposed but again this is to date just a concept.

It is further proposed that a solar power and/or wind farm will be built to provide the electricity to the chargers (charging stations such as Supercharger Network and proposed Megachargers). This is an advantage because a solar farm or wind farm can be built by a charge station operator at an amortized cost lower than the charge station operator can purchase electricity from a local utility. To date, the only method for delivering energy to an EV is to in one manner or another, deliver electrical energy to the EV. It would be advantageous therefore, if there existed another means to deliver sensible energy to an EV while driving along a roadway. It would also be an advantage if that original energy could come from a renewable energy source such as a solar and/or wind farm alongside the roadway so as to reduce the cost of the original energy to the roadway operator.

By harvesting solar and/or wind energy at a farm along a roadway, and then delivering that energy to an air mover within a roadway conduit system, the present roadway conduit system can then conserve the KE of the air for the real time benefit of the vehicles within the tunnel. If a solution can be found where the cost of operating the air movers, based on the cost of electricity to operate the air movers, is lower than the cost to operate the vehicles on a normal roadway, then, the roadway could be useful. To be energetically useful, the energy spent by the roadway operator must be less than the energy saved by the EVs using the novel roadway.

Current roadways are open to the atmosphere and do nothing to reduce the energy consumed by a vehicle. The interaction with the atmosphere dissipates energy and the faster the vehicle goes, the greater the rate of energy dissipation.

Within tunnels where blowers are operated there will manifest an increase in pressure following a position where blowers are accelerating the air within the tunnel. If the pressure rise is large enough it will trigger ear popping for drivers within the tunnel. It would be a nuisance if within a tunnel the air pressure were periodically increasing and decreasing by a degree larger than the ear popping pressure change, a very small value. A simple blower within a tunnel bore also takes up room within the tunnel, requiring that the entire tunnel inside dimension be larger. It would be advantageous in the present disclosure to provide the air movers on top of the tunnels. This can be done since the tunnels are in contact with the atmosphere and doing so means the roadway conduit interior can be smaller and just large enough to enable passage of the intended vehicles, thereby reducing overall construction costs.

It would be advantageous if the air movers utilized within a tunnel had provision to control both the interior air velocity and as well, the interior air pressure. If this were so then the tunnel control system could actively control both air velocity and air pressure so that the velocity could benefit vehicles by reducing aerodynamic energy draw and the pressure control would benefit occupants within vehicles by reducing ear popping discomfort.

Additionally, in the event of a fire within a tunnel, it would be advantageous to be able to reverse the air flow direction for specific tunnel sections so that smoke laden air could be exhausted appropriately regardless of the location of the accident/fire incident. Typical blowers within tunnels can sometimes be reversed directionally, but they cannot individually emit tunnel air to the outside, nor can they push outside clean air into the tunnel. For some tunnel designs, an additional tunnel shaft is dedicated to ventilation. It is therefore sometimes possible to provide some of the previous performance, but at the cost of digging a larger overall tunnel.

Ideally, the air movers that cause air within the tunnel to move will be in close proximity to both the tunnel air and the outside atmosphere. For tunnels through mountains, under rivers, or anywhere tunnels are typically built today, this is not possible. The purpose of the tunnel is to take traffic away from the atmosphere to follow a tube that bypasses some obstruction. Of necessity, the interior of the tunnel is not adjacent to the outside atmosphere.

Only by wrapping a conduit around an otherwise open roadway, will the conduit (tunnel of sorts) walls and/or roof be exposed to the outside atmosphere. In this way, an air mover mounted on top of the tunnel has direct access to the air within the tunnel and also, to the outside atmospheric air. The blower so situated is capable of providing ventilation air in case of emergency at any of the air mover positions by flowing outside air into the tunnel. It is also able to exhaust inside air out. But under normal operation, an air mover so situated is capable of drawing air out of the tunnel from "behind" and blowing that air back into the tunnel "ahead" of the air mover at a higher velocity.

It would be advantageous to be able to install a large, multi-directional air mover system into a physically small, tunnel. It would be even more advantageous for that air mover system to have access to fresh air without the added cost of building a larger tunnel so as to provide a separate tunnel conduit reserved for fresh air provision as is typical in tunnel construction. Therefore a tunnel that has a large number of air movers and where each air mover is provided with direct access to outside air but without the cost associated with boring a larger overall tunnel, would be advantageous.

The present disclosure accomplishes this by having the roadway and/or railway conduit roof in connection with or proximity to the planetary atmosphere. By locating the conduit roof above ground, the conduit bore can remain at a fixed cross sectional area and shape, then the bore can increase in height to provide a path for air to flow up into an air mover. Further forward along the conduit length the opposite can take place to provide a path for air to flow into the conduit.

Above the conduit, the same sort of air flow paths can be created for air moving in the forward direction from behind the air mover (relative to vehicular normal motion within the conduit) and also for air moving in the forward direction and in front of the air mover in the same sense of direction.

This provides two paths for air to flow into the air mover, and two paths for air to flow out of the air mover. Further, two of the paths connect to air within the conduit, and two of the paths connect to air from the atmosphere. If in case of building the conduit below a street so that the top surface is utilized by surface traffic, vehicular, pedestrian or otherwise, it may be necessary to create a short conduit for air to flow into and out of the air mover to the side of the actual conduit location.

Regarding the conduit interior remaining within 3 meters of the ground surface for at least one mile. This 3 meter distance is chosen because it is too shallow for a tunnel boring machine to operate, too shallow for dynamite tunnel excavation, and too shallow in general for the roof of a tunnel to be dug below ground without incurring frequent cave ins while attempting to create a genuine "tunnel." Such a shallow conduit will be dug from above making it distinct from a true "tunnel." Being this close to the surface means the construction creates a trench and not a tunnel, with the conduit being set down into the open trench in order to create the enclosed conduit.

In this way, a roadway conduit or Railway Conduit is distinct from a Roadway Tunnel or Railway Tunnel. The 3 meter to the surface distinction does not, however, apply to the air flow as under certain citing choices, it may be desirable to locate air inlets and outlets a slightly greater distance than 3 meters from where the air mover is if it happens to be covered and just below ground to enable installation along an existing city street where the street will later be put back into use.

The 1 mile distance is again to distinguish these conduits, installed in trenches, from true tunnels that are bored below ground and then lined. Tunnels, as they arrive back to atmospheric connection, will for a very short distance be within this 3 meter distance. However, they do not remain at that shallow a distance for very long and certainly not for an entire mile. To build a system within 3 meters for a length greater than 1 mile yields a completely new device.

In general, however, for conduits being built to cover large distances such as cross country conduits, the top of the conduit will be in contact with the planetary atmosphere. Therefore, the normal air mover installation will be where there is a direct connection for air flow into and out of the air mover both from within the conduit and also from the atmosphere. The system with louvers creating 4 air flow paths out of the 2×2 path combinations. By additionally installing a reversible air mover where the air flow direction can be reversed, the system becomes a 2×2×2=8 air flow paths. One path, atmosphere to atmosphere, may not normally be used except if an air mover with a long spool up time is chosen as the air mover, and, precision conduit internal air velocity and pressure control is desired. In that case, it can be useful to get the air mover to full speed and then just use the air path vanes to modify the air flow directions.

Another problem with existing tunnels is noise. At freeway speeds, the primary sources of noise are the vehicle engine and the tires interacting with the roadway surface. Vehicle engine noise can be eliminated if one provides an ICE barrier to the tunnel entrance so that engines are not operating within the conduit. Tire noise can be reduced by providing the interior roadway with a rubberized asphalt coating. Building a roadway conduit system that includes an ICE barrier and a rubberized roadway, will improve the travel experience of occupants of vehicles travelling the conduit system of the present disclosure.

Conduit interior noise is also a function of acoustic pressure reflections from hard concrete walls and ceiling within the tunnel bore. By coating the roadway conduit interior with a rubberized asphalt road base, the sound generation of tires is reduced. But so too is the sound absorption increased. Reflected sound that strikes the rubberized surface will be damped better than if it had encountered concrete.

The walls are also hard and acoustic reflective surfaces. It would be advantageous to provide a tunnel with material coverings that absorb and damp acoustic pressure vibrations while at the same time, conserving low frequency pressure waves associated with air flow within the tunnels and the piston effect of vehicles. An ideal surface coating will conserve low frequency pressure variations while also damping audible pressure variations. There are additionally some shapes that can be added to the walls and ceilings that help reflect acoustic energy more frequently so as to damp out internal noise better.

In some embodiments of the present disclosure the roadway surface is provided with a rubberized asphalt covering, the walls are provided with longitudinal grooves to multiply reflect acoustic energy while not significantly damping longitudinal air flow down the conduit bore, and the walls and ceilings are provided with acoustic damping material that again, damps audible acoustic energy but does not damp lower frequency vehicular pressure waves and/or air flow within the conduit bore. It is of course always the case that a tradeoff between desires is chosen so these are exemplary options to be included and not required for the present disclosure to function.

It can be mentioned that grooves in the walls and ceiling can reduce acoustic interior noise by increasing the number of reflections. For acoustics, it doesn't matter if the grooves are vertical or horizontal. But vertical grooves would increase conduit air flow resistance more than would longitudinal grooves. Therefore, longitudinal grooves are preferable. Yet more preferable is to cover the walls and ceiling and including within the grooves if so constructed, with a coating material that damps acoustic energy to reduce interior noise.

Within a tunnel where lighting is provided, it is advantageous to provide lights at a sufficiently high repetition rate that the light variation is faster than about 100 Hz so as to avoid triggering epileptic seizures in occupants of vehicles using the roadway conduit system. As in some embodiments of the present disclosure it is anticipated that the conduits will at times be used by vehicles travelling as fast as 240 mph, the distance travelled in one one-hundredth of a second, 0.01 seconds, is 10.56 inches. The spacings for regular lighting to avoid epileptic seizures for 240 mph should be more closely spaced than this. For 60 mph transit the spacing should be less than 4 times this figure, or, about 44 inches. For any velocity application anticipated here, LED lighting with 1 inch spacings between individual LEDs will suffice.

Tunnels require emergency exits and/or places of refuge. Preferably, in case of emergency, a tunnel will have an exit path to the outside atmosphere. The norm is that a long distance exists between exits and once in the exit they typically have a long tunnel or stairway to arrive outside the tunnel system to the outside atmosphere. However it is often the case that the exit only goes to a room where refuge can be taken as the distance to the outside atmosphere is too far for some of the anticipated physical condition of some refugees such as elderly or disabled people.

This is the case when a tunnel penetrates a mountain. And if a tunnel transits beneath a body of water, then one must walk all the way out of the tunnel or make some provision for an emergency vehicle to access people trapped beneath the body of water.

Typically, the longer a tunnel happens to be, the longer the pathway one must traverse to get to the outside atmosphere. It would, therefore, be advantageous if it were possible to walk through a door that separates the tunnel interior and the atmospheric exterior, without needing to walk down a long corridor to arrive at the outside atmosphere or alternately needing to take refuge in a closed and ventilated room deep under a mountain or beneath a body of water in case of smoke and/or fire. Roadway conduit systems provide this benefit as they are built for the most part, immediately adjacent to the outside planetary atmosphere. Once a refugee exits a conduit doorway, they are normally, immediately out of the conduit way and in the outside atmosphere, free from any smoke within the conduit way during an emergency such as a fire.

In case of smoke or fire, the ability to quickly exit the tunnel to outside air via a short distance path is extremely valuable. The present disclosure accomplishes this because the conduit bore is always close to the outside ambient atmosphere. Escape doors and walkways can be created within a roadway conduit bore at spacings closer than practical for typical tunnels because atmospheric proximity reduces the cost of providing exit paths.

It would be advantageous if there were a way for a tunnel to be provided with a door such that during an emergency event with lots of smoke, inside the door was the air within the tunnel, and outside the door, without needing to walk down a long corridor or up a long flight of stairs, was immediately wide open to the atmosphere and clean air. In this way, roadway conduits are far superior to tunnels.

Inevitably along a long cross country roadway, drivers will require rest stops. If a tunnel conduit is built along the central median of an existing surface roadway, for example I-5 between Sacramento and Los Angeles, it would be possible to provide exits from the tunnel out to the surface roadway. A vehicle could then merge with traffic, cross traffic and take a later exit from the surface roadway. This is one reasonable and optional solution to exiting a roadway conduit system. One problem with this approach is that typically the fastest vehicle lane is adjacent to the roadway conduit system when the conduit system is located in the median of an existing roadway.

It would be advantageous, however, if as an option, entrances and exits into and out of the tunnel way system could be realized without requiring vehicles to cross the existing surface roadway lanes.

If tunnel conduits could be built that drop below grade and then cross beneath existing road lanes, then entrances and exits could be provided close to existing surface roadway entrances and exits on the slow (in the US, right) side of the surface roadway. An entrance to the tunnel could be provided along a normal entrance to the surface freeway.

Likewise, an exit from the roadway conduit system could be provided that passes beneath the surface roadway and emerges to the side of the surface freeway prior to the surface freeways normal exit location. This optional method enables vehicles exiting the roadway conduit system to merge with vehicles exiting the surface roadway system along an exit path. Likewise, vehicles entering the roadway conduit system could do so from along a normal surface roadway entrance and vehicles entering each roadway system then diverge while still on the entrance ramp. This eliminates the need for ingress or egress vehicles to cross the surface roadway lanes and is a safer method for ingress and egress of the roadway conduit system.

In addition to utilizing existing surface freeway entrance and exit ramps for conduit system ingress and egress paths, it will also be useful to provide ingress egress locations that communicate vehicles to a property adjacent to the roadway conduit system where a renewable energy farm can be constructed. Vehicles can exit at these locations to re charge prior to continuing on the voyage. As well, the ingress and egress roadways can be used to communicate power cables to the roadway conduit systems including air movers, lights and other systems.

As EV charging will require a large amount of energy, it would be advantageous to build solar and wind farms along roadway conduit systems to provide the power needed to operate. Even with the roadway conduits ability to reduce the energy consumption of vehicles, eventually on longer trips, EVs will run low on energy (e.g. battery charge state).

It will therefore be advantageous to provide rest stations similar to existing gas stations for ICE vehicles and Supercharger stations for EVs.

However, unlike a gas station, an EV charging station coupled to a solar farm or wind farm requires a far larger property size. A solar farm to power both EV charging and roadway conduit systems may require 100 to 500 acres of land whereas a gas station or EV charging station requires perhaps one eighth of a single acre. The difference in land requirement for these two different uses is of order 1,000.

Providing an EV charging location connected to a renewable energy farm near a normal surface roadway or freeway entrance/exit interchanges can be prohibitively expensive due to increased cost of land close to interchanges. Just one or more miles from an interchange, along a roadway where there are no freeway entrances or exits, the cost of land is typically very much lower. The cost of large tracts of land can cost one percent of the cost near an existing surface freeway on and off ramp.

The present disclosure affords a roadway conduit builder a completely new option for accessing properties adjacent to a limited access roadway such as the US Interstate system freeways. By creating an entrance and exit interchange to the roadway conduit system that drops below grade, passes beneath the surface roadway, and then emerges back on the surface of the ground alongside the surface roadway or freeway on land previously not having a connection to the freeway it is possible to acquire land at perhaps 1% to 10% of the cost of land per acre close to an existing interchange.

In this way the present disclosure enables the low cost creation of rest stops and re charging stations that are next to but separate from, the existing surface freeway system and which additionally include a solar, wind or other renewable energy farm requiring a large plot of land, where the renewable energy system provides the energy to charge or otherwise deliver energy into the vehicles using the roadway conduit system.

Such a feature also provides a path through which electrical power cables can be run from the renewable energy farm into the roadway conduit system so as to power air movers and other equipment within the roadway conduit system. This would avoid the need to cut a trench from adjacent land, across various rights of way to arrive at the tunnel system where the power is required. In this way, the renewable energy farm described in the present disclosure will provide energy to power both vehicular charging infrastructure for all sorts of vehicular energy forms, and as well, energy to power the roadway or railway conduit system equipment.

Additionally, some EVs are now provided with Autonomous Control hardware and software. But these features are not yet approved for use on public roadways. Within roadway conduits, the danger associated with a loss of control of an EV is dramatically reduced. There is nothing to crash into except for the sidewalls which are typically concrete and able to withstand a collision.

It would be advantageous to enable autonomously controlled vehicles to operate within the roadway conduits. This proving ground could help speed deployment on surface roadways by enabling safe operation in a more controlled roadway system where experience can be gained.

By providing connected rest stops, an autonomous vehicle could travel down a roadway conduit, exit and be recharged, then re-enter and complete a journey to destination all without travelling on public roadways and also without a human driver to pilot the vehicle. Even piloted vehicles could exit the roadway conduit system to a rest stop where the vehicle could be charged and the people could find food and take a rest stop break.

On the open road today, there exist a great number of vehicles with as many different shapes. The high speed energy performance of these vehicles varies, generally, according to their aerodynamic coefficient of drag, Ca. Vehicle manufacturers go to great lengths to reduce this term so that the energy consumed per mile driven is reduced.

Within roadway conduits, however, if the air movers keep the air moving at close to the speed of the vehicle, then the aerodynamic drag is low or zero. In this case, it is no longer an advantage to spend extra money on creating aerodynamic shapes that reduce the drag. Instead, it becomes advantageous to build a vehicle that is the lowest cost to construct and which encloses the largest possible volume for occupants and cargo to use, a completely different set of criteria.

Examples of low cost of construction vehicle shape for high speed transport within a roadway conduit are airport push back tractors whereas examples of high cost vehicles are modern Tesla Model S, Roadster 2, and Tesla Semi just revealed. The latter having a Ca around 0.36. This value is less than a supercar Bugatti Chiron at 0.38 and much lower than similar semi-trucks which typically range from 0.6 to 0.7. This means that per unit frontal area, the Tesla Semi-truck has a very low cost of operation.

However, if the travel is within a roadway conduit, and the air in the roadway conduit is moving with the vehicles, then the aerodynamic drag imposed upon the vehicles is zero, regardless of vehicle shape (Ca). In this case, there is no reason to incur the extra expense of packaging vehicles into a low Ca package. instead, it makes better sense to build the lowest cost shape device possible, within aesthetic reason. Given that roadway conduits enable this option, it would be advantageous to develop a new vehicle that provides the function in a lower cost package where aerodynamic exterior shape is not a primary driving criteria for design.

Within tunnels today, individual vehicles are independent. They move in ways controlled by the driver, disconnected from information about road conditions ahead. Every driver takes independent actions. The present disclosure includes a roadway conduit control system that enables simultaneous communications between the control system and vehicles so that information is immediately communicated when, for example, an accident occurs or debris in the roadway is observed by one of the vehicles.

When a roadway conduit is built to enable autonomous control of vehicles within the roadway conduit, several new issues arise. First, the roadway conduit system could be able to identify individual vehicles within the roadway conduit. Upon entry, the roadway conduit system could assign an ID to each vehicle, and ultimately, the roadway conduit control system may approve entry of each vehicle, based on calculations of overall roadway conduit vehicle throughput assuming both that the new vehicle is allowed to enter, or not.

The roadway conduit control system may then track each vehicle so that the ID remains connected to the vehicle. This may be performed using sensors within the roadway conduit as well as direct communication(s) between the vehicle and the conduit control system. There may be provided a bi-directional communication system so that vehicles can send information to the roadway conduit control system and the roadway conduit control system can send information to the vehicles.

The roadway conduit control system is preferentially capable of receiving video imagery from vehicles showing where debris/obstacles exist within the roadway conduits so that cleanup crews can be, preferentially, autonomously dispatched to remove the debris.

It would be an advantage if a roadway conduit control system existed that was capable of interacting with vehicles travelling down the roadway conduit so that transit within the roadway conduit is safer than travel on surface roadways. For example, the roadway conduit control system could slow or stop traffic during the cleanup of debris discovered within the roadway conduit, if there existed a control system capable of controlling the motion of vehicles within the roadway conduit. Also, it would be an advantage if the roadway conduit control system existed that would command vehicles when to enter and calculated their individual traffic imposition on the entire roadway conduit traffic system so that stop and go traffic was never allowed.

Typically today in case of an accident toward the end of a tunnel, a vehicle at an entrance to the tunnel roadway would just enter as usual since there is no communication to that vehicle that a problem just took place at the far end of (in other words, within) the tunnel.

The present disclosure fixes this by instructing a vehicle desiring to enter the roadway conduit system, to not enter due to the emergency condition further up the conduit. In this way, the conduit is not plugged with vehicles that could have been kept out of the system after the accident had been detected.

The roadway conduit control system already knowing the position and velocity of every vehicle within the entire length of the roadway conduit system so that the roadway conduit system can calculate the impact of the new vehicle on the entire traffic flow and determine the best timing for a new vehicle to enter the roadway conduit. In the case of the accident, the roadway conduit control system would communicate to all vehicles within the roadway conduit to come to an emergency stop and potentially, to reverse and exit the roadway conduit if the emergency situation warranted.

Existing tunnels do not have such a control system and for that reason vehicles drive at full speed until they encroach upon the accident, at which point they enter an emergency stop condition which in the study of traffic patterns is in a sense, a fluid dynamic shock wave that originates at the accident and propagates backward into the oncoming traffic until all traffic is stopped. Only after this "shock wave" propagates back beyond the entrance would a vehicle know to not enter. If a traffic control system were added to a tunnel, then the decisions on how to resolve an emergency condition would be far more rapid and the condition would be resolved sooner, restoring normal traffic flow more quickly.

It is, therefore, an object of the disclosed embodiments to provide a conduit system with a conduit control system that monitors all vehicles and incidents within the conduit system and which is able to take action in case of emergency situations, directing vehicles to take actions including to wait until a problem is cleared, or, to back out of the conduit to make room for emergency workers, or other actions.

Another aspect of a conduit control system is that to communicate to vehicles under autonomous control, a much greater volume of information can be communicated visually using bar coding than can be communicated with words to human drivers. Therefore, it will be advantageous to install bar coding of various styles to communicate to vehicles more so, or instead of, or in addition to, written words to people. The vehicle can then communicate information to occupants of the vehicle by means of a display within the vehicle.

Another aspect of the present disclosure is for the roadway conduit control system to provide information to vehicle occupants to show the occupants what the outside view would be if they were not inside a conduit. This can be realized via recording the exterior view in a variety of ways including driving surround cameras down adjacent surface roads. Further, the conduit control system can optionally communicate the vehicle location on a map display that also shows other possible destinations along the route including for example, the locations of upcoming charging locations and rest stops. Such information can be communicated to a display within the vehicle so that occupants can actually "look" in different directions to see what the outside looks like where they are.

Another optional aspect of the present disclosure is to provide the roadway conduits with windows through which vehicle occupants can view the outside world.

For long autonomous controlled trips, the roadway conduit control system can provide a journey display showing origin, destination, transit path, current location, time to destination, distance to destination and other parameters of interest.

Creating these features becomes important when the vehicles are confined within a roadway conduit system. Distances and locations of rest stop locations along the route being followed are also of interest for such a system.

Existing tunnels do not have lengths measured in hundreds or thousands of miles, so the problem of occupant boredom is seldom if ever dealt with in existing tunnels. Trains and airplanes do deal with passengers confined within the vehicle for extended periods of time The longest road tunnel (Laerdal in Norway) is just 15 miles. For trains, the longest tunnel is the Gotthard Base Tunnel at 35.5 miles long. Traversing these tunnels takes a little while, but the experience is relatively short compared to a cross country journey of hundreds to thousands of miles.

Amenities provided by existing tunnels are few, as the same are short. If one builds a roadway conduit of a thousand miles length, completely new and different features become useful. Current tunnels do not typically provide information to enable one to know where they are relative to the outside. There may be markers that indicate distance within a tunnel, or distance to an emergency shelter. But for a moving vehicle within a roadway conduit, it would be nice if the roadway conduit system communicated information as to position relative to external features. In particular, it would be nice if the roadway conduit system provided information including imagery, showing what the outside world at a position within the roadway conduit, looks like.

Another curious problem with modern roadways within the US and the world is that vehicles are built that are capable of much faster travel than the maximum speed limit allowed on open Interstate Freeways. Typically, the maximum velocity is 65 mph with some areas at as high as 80 mph. Vehicles, on the other hand, are built with top speeds of up to 250 mph. Numerous vehicles have top speeds over 100 mph. Yet they are not allowed, legally, to travel on US freeways at those velocities.

It would be desirable for a roadway to be created where the top speed allowed on the roadway, is over 100 mph. Even if travel at that velocity was enabled during certain restricted hours, someone with a faster vehicle could utilize the roadway to make a journey at faster than normal speeds. Allowing mixed velocity limits would of course require a roadway conduit control system to clear slower vehicles out of the way of faster vehicles.

It would be nice if a roadway conduit was fitted with a method for slower vehicles to get out of the way of faster vehicles.

In one configuration of the present disclosure, one or more sections of roadway conduit could be provided with two lanes in place of the normal single lane. The two lane section may be one or two miles in length. Slower vehicles can pull off onto the extra lane while faster vehicles pass. This is analogous to a railway siding track.

In one embodiment, a series of two lane sections are disposed periodically down the length of a long roadway conduit system. A central controller communicates to all vehicles within the conduit system. Vehicles at say 240 mph are directed to group themselves into a platoon of vehicles while vehicles at say 120 mph are directed to group themselves into a second platoon of vehicles.

Within a single lane roadway conduit, the faster vehicles will catch up with the slower vehicles. the velocities can be different as desired, for example, 70 mph and 140 mph. The slower velocity would enable semi-trucks to become part of the slower platoons while faster cars make up the faster platoon.

It can be arranged that the faster vehicles catch up with the slower vehicles as the slower vehicles have finished entering the two lane sections of the roadway conduit sections. In this way, the faster vehicles can pass the slower vehicles on the two lane sections. Then, the two lane sections can narrow back into a single lane section. In this way, vehicles using the same single lane (for the majority of distance) roadway conduit can travel at two different velocities, for example, 70 mph and 140 mph. And, neither of the vehicle platoons need to adjust their velocities or stop to allow the faster vehicles to pass (as railroads do with sidings). All vehicles travel at their nominal speed all of the time to destination.

This is possible by arranging the locations of the double wide lanes to match the vehicular velocities one desires to enable within the roadway conduit system. In at least one embodiment, the entrances and exits to adjacent EV charging stations and rest stops can be positioned alongside the double wide lanes so that if a faster vehicle desires to exit, it can fall out of platoon formation with the faster vehicles and shift over to join the platoon of slower vehicles during the double wide lane sections, and then exit the conduit roadway system by following an egress roadway connected to the double wide section of the conduit.

Ideally, the roadway conduit control system will also direct vehicles ahead and behind of a fast vehicle desiring to exit the platoon and roadway conduit system, to yield space to enable a safer exit of the fast vehicle.

Pavement cracking and crumbling is a major problem incurred by roadway builders. Over time, the repeated heating and cooling of a roadway as it cycles from day to night, and from summer to winter, causes the pavement to expand and contract. This action can be significant. A 40 foot long piece of concrete can easily expand by a quarter of an inch due to thermal changes.

This action is responsible for breaking and cracking pavement and can dramatically shorten the pavement life. It is desirable therefore to reduce the thermal changes experienced by a pavement so as to increase the life span of that pavement.

The present disclosure improves the life span of a roadway pavement in 2 ways. First, the Roadway conduit ways are provided with a full enclosure of the roadway pavement so that the sun never hits the pavement to heat it. This eliminates the day to night thermal cycle. Further, because the base of the conduit, which is the roadway, is in contact with the earth, it is in contact with a thermal sink that further reduces thermal changes. And finally, the present disclosure can in some embodiments be installed partially buried so that the roadway is in contact with earth approximately 6 to 10 feet below the normal surface of the local ground. The earth at this depth undergoes a dramatically reduced temperature swing, compared to earth near the surface, over the course of a year.

Optimal construction is where the conduit way is mostly buried and the road base is approximately 16 feet below grade. In this condition, the temperature of the road base is nearly constant year round and thermal degradation of the pavement is virtually eliminated. This construction method is, however, more expensive so that the choice for depth of conduit way installation will be determined for individual projects depending upon a number of variables, thermal cycling being one. These vary from one location to another around the world.

Ideally to reduce the cost of operation of the roadway conduit system, the energy to power the air movers and other systems will be provided by renewable energy farms such as solar, wind, hydro and the like, connected directly to the roadway conduit system devices, avoiding a utility middleman cost. Further, to provide power day and night the roadway conduit system will preferably be provided with one or more energy storage devices, such as, in ground compressed air storage, battery electric storage, rail car gravity energy storage and the like.

To conform to the present disclosure, the roadway conduit system may be constructed such that the energy produced by any energy farm is provided first to the roadway conduit system itself. If first sold to a utility and then energy is purchased from the utility, the cost for the energy would be significantly greater, as is the case today for all large utility class renewable energy installations. Therefore, the test for whether a device meets the present disclosures designs is whether or not the device is capable of operating its roadway conduit systems, 24/7, as an islanded system under normal weather conditions.

An "islanded" electrical system is here defined as a system where, if there were no connection to a utility, the roadway conduit systems would be able to operate by using the electrical energy produced by the one or more renewable energy farms connected to the roadway conduit system. Again, while the term "Roadway" is used preferentially in this document, the term "Railway" should be understood to also be intended as an optional and/or additional component and/or construction of the Conduit System.

If the roadway conduit system could Usefully function without deriving energy from a utility which is to say, while being disconnected from any utility for a period of time during average local weather, and is therefore an islanded electrical system separate from the utility, then it is by definition an islanded electrical roadway conduit system.

Freeways and road transportation across land is a ubiquitous method of travel around the world today. Cars, trucks, semi-truck trailers and other vehicle types travel roadways from one location to another, carrying passengers, goods and freight. Likewise, rail way vehicles perform a similar function using steel wheels and steel rails to roll along thereby reducing the rolling drag energy losses. All of these vehicle transportation methods face the same aerodynamic drag energy losses that scale non linearly with velocity.

The drag force is proportional to the drag coefficient times the frontal area times the velocity squared. The power required to propel a vehicle is therefore proportional to the velocity cubed. The aerodynamic power required to double the velocity of a vehicle is 8 times greater. Because the frontal area of a vehicle results from vehicle amenities and other design choices, and the velocity is chosen by the driver and is therefore not a design parameter per se, design engineers seeking to reduce the energy cost for transportation with a particular vehicle focus exclusively on reducing the value of the coefficient of drag for that vehicle.

Vehicle engineers go to great lengths, expending large R&D funds to improve the vehicular drag coefficient by creating aerodynamic shapes that impose a smaller drag force. In a sense, road vehicle designers are following in the footsteps of aerodynamic designers of aircraft that have for decades dealt with moving vehicles at high velocity through air.

Recently, for example, Tesla engineers introduced a new class 8 semi-truck with a 0.36 coefficient of drag. This value is lower than most cars on the road and about half that of a typical class 8 semi-truck which have a drag coefficient around 0.7. This means that per mile travelled, the Tesla semi-truck and trailer combination will consume about half as much energy to overcome aerodynamic resistance to move the new Tesla semi-truck from one location to another compared to a typical Diesel class 8 semi-truck. Rolling resistance was also reduced and is a separate energy term for vehicular transit.

A tail wind may reduce the energy a vehicle expends driving along a roadway. Land speed record attempts must be conducted in two opposing directions within a short period of time to eliminate the potential for running a record attempt and using a tail wind to skew the top speed.

It has been proposed by a few people that within tunnels of a few designs and for different vehicles (bicycle, train, car), that by blowing air down the tunnel in the direction of vehicle travel, that the energy required for the vehicle to move along the tunnel per unit distance could be reduced.

In spite of this knowledge, vehicles still travel along surface roadways where the benefits cannot be realized. While true that one can reduce the energy cost for the vehicle by the known method of blowing air down a tunnel, it is also true that there is an energy cost for driving the air and that this energy cost is normally greater than the energy savings for a typical vehicle. while one could do this, no one has because of the cost being higher than the benefit.

Further, the cost of proposed solutions for energy reduction is far greater than the cost of a surface roadway. The situation is such that no such vehicle tunnels have been constructed for the purpose of reducing vehicular energy consumption.

To be commercially viable and therefore Useful, moving air to benefit vehicles within a tunnel is not sufficient. To date there does not exist a single long distance or cross continent tunnel that was constructed for the purpose of benefiting vehicles by reducing vehicular energy consumption. All tunnels today are built to circumvent some obstacle in the path of a desired vehicular route. The fact that some tunnels may also benefit vehicles via internal air motions is happenstance. More often than not, tunnel operators design tunnels such that they impose a parasitic drag to the vehicles, the opposite of a benefit provided to the vehicle.

One problem with existing tunnels is that they cost so much to construct, that by the time one builds a tunnel and then computes the amortized cost for doing so, the construction cost payments exceed vehicle energy benefit. for this and many other reasons, tunnels are not constructed to benefit vehicles other than by providing a path that circumvents some obstacle such as a mountain or waterway.

For example, if a tunnel were to be dug between San Francisco and New York City and air were blown down it, the energy required to translate a vehicle between those two locations could be reduced. However, building such a tunnel could cost trillions of dollars and in the end, the amortized cost for building the tunnel would for all known designs, be greater than the savings enjoyed by the vehicles. Further, the cost of blowing air down the length of that tunnel would be vastly greater than the energy cost of driving the vehicle along a surface roadway. This means that operating the tunnel would cost far more than the energy cost to operate a vehicle on an open roadway. If the benefit is to be realized, a new tunnel design must be found.

The enormous cost of building tunnels, as heretofore imagined, has blocked roadway builders from applying the knowledge of potential vehicular energy benefit to real world roadways.

In fact, the longest road tunnel in the world is the Laerdal tunnel in Norway and it is just 15 miles long. And that tunnel has bi directional traffic within. Meaning, they didn't even bother to use the vehicle piston effect (described below) to benefit their ventilation systems let alone to provide any potential benefit to the vehicles travelling within. The reason is simply that a single bore tunnel costs less than a twin bore tunnel and vehicle energy savings was likely not considered. The tunnel saved a couple hours drive around a mountain range, and that time savings is the reason it was constructed. The energy used to move a vehicle 15 miles is so small that it is ignored in tunnel design.

The opposite of reducing vehicular energy consumption, the norm for tunnel designs is to design the tunnels in such a way that they parasitically consume energy from vehicles. The consumption is small enough that vehicle drivers don't notice it because the tunnels are so short.

Modern tunnels consume energy from vehicles, parasitically, by taking advantage of the fact that when vehicles drive through a tunnel at high speed, they cause the air in the tunnel to flow in the direction of vehicular travel. This effect is well known to engineers in the field of tunnel design as the "piston" effect where a vehicle imparts kinetic energy to the air it is moving through.

Typically, this effect is used to benefit tunnel operators by reducing the cost to perform the necessary tunnel function of ventilation to expel toxic vehicle exhaust fumes from within the tunnel. The vehicular piston effect is used to reduce the energy a tunnel operator must supply to ventilation fans. Rather than using fans to move air through the tunnel to expel exhaust fumes, tunnels consume a small portion of energy from the vehicles instead, reducing the operation cost of running the tunnel ventilation systems.

In essence, the common practice of tunnel operators is to parasitically take energy from vehicles using their tunnel so that their electricity bills required to drive blowers for ventilation of the tunnel, are reduced. Each vehicle operator pays a small cost in fuel consumption (in addition to any toll charged) when they move through a single bore longitudinal ventilation tunnel system. However, given that the longest single bore tunnels are 12 miles long or less, this cost is very small (a few pennies per vehicle) and not noticed. Hence, the common practice to use the piston effect rather than spend money on electricity for blowers in bi directional tunnels such as Laerdal. (Laerdal is a bi directional tunnel that doesn't take advantage of the piston effect). Of course, building a twin tunnel costs more than a single bore tunnel so the amortized construction costs must be compared to savings in operational costs for electricity to run blowers.

Building tunnels is extremely expensive. Tunnel construction can cost $1 billion per mile for modern freeway tunnels. The Boring Company proposes to build smaller tunnels with the goal of circumventing stop and go traffic on freeways and projects a cost reduction to $100 million per mile or possibly less. Given these costs, experimentation with whether or not it may be possible to build a cross country tunnel from San Francisco to New York City, is not practical. At 3,000 miles a tunnel would cost around $300 Billion. At $100 M per mile a Sacramento to Los Angeles tunnel would cost about $45 billion dollars just to experiment with whether or not such a tunnel venture might be useful from a commercial perspective.

For whatever reasons, in spite of a few references to the potential energy savings of vehicles, there has been no long distance tunnel system developed that solves both the reduction of vehicular energy demand and, the proposal of a way to viably and therefore usefully do it. Once one considers the cost of such a real tunnel, it has to date been clear that the energy savings of vehicles does not justify the construction of a such transit tunnel.

Today, therefore, the focus on saving energy during vehicle transit is focused on improving vehicular aerodynamics, as is evidenced by the recent Tesla semi-truck with significantly reduced aerodynamic coefficient of drag.

Electric Vehicles (EVs) are a new entrant in the road vehicle category and they afford designers with some new capabilities yet to be realized, and new problems yet to be solved.

One problem with EVs is that they have a limited range. This is due primarily to the battery size and cost. If there were a way to reduce the energy consumption of a vehicle, per mile of roadway, or, if there were a way to deliver energy to a vehicle on a long distance roadway, then the range of vehicles in general and EVs in particular, would be increased.

With the latest EVs having over 200 mile range, local driving is solved. But charge times on long distance trips is still a problem. If there existed a way to increase the long distance range of an EV it would help EVs compete with ICE (Internal Combustion Engine) vehicles and increase their market share in the vehicle sales market space.

In yet another technology area today, it is common for solar and/or wind farms to sell electrical energy to utilities at below 4 cents (US) per kWh. Solar and wind farms generate so much electrical power that only a utility is able to use all of it by delivering it to a large number of commercial, industrial, and residential customers. No single business uses an amount of energy as is produced by large renewable energy farms of utility class scale.

Elsewhere in the technology arena, the oil industry sells gasoline to vehicle owners where the end cost after converting chemical energy into mechanical motion energy can run from a low of around 14 cents per kWh for high efficiency Diesel engines to around 40 cents per kWh for more typical gasoline engines. Fuel thermal content is customarily referenced in BTUs, but both BTU and kWh are energy terms and so one can convert between the two. That said, it is not normal to compare the units of miles per gallon of Diesel to the units of kilowatt hours per mile in spite of the fact that both are an energy consumption per mile travelled. One deals with fuel while the other deals with electricity. Still, it can be quickly noticed that both 14 cents and 40 cents fuel costs are greater than 4 cents electricity production cost.

A quick look at the above facts demonstrate why Tesla has asserted its intention to connect its Supercharger stations to solar farms it builds and operates. By doing so, Tesla will be able to earn more from its solar installations than it could by selling the energy to an electrical utility. For example, along 1-5 in California at the Harris Ranch Supercharger station, one motorist paid 20 cents per kWh for electricity to charge his Tesla EV. This is 5 times what a solar farm to produce that energy would have earned, and, it is likely just a little bit higher than what is paid to the utility for providing that electrical energy.

It should be no surprise, then, that it makes good sense to develop and build renewable energy farms to power chargers for vehicles. If there existed another way to communicate energy from a renewable energy farm to vehicles, it would provide another way for renewable energy farms to earn more income than they can earn selling their energy to utilities.

Land transportation today for freight and passengers include road vehicles and rail vehicles. Rail vehicles, or trains, typically run along steel tracks. This is superior to road vehicles which run on rubber wheels and incur a larger energy loss per mile travelled. Trains are typically composed of one or several engines pulling a larger number of "cars" where within the cars are typically passengers and/or freight. Freight can be anything from coal to goods to large machines or structures. Most train engines are powered by Diesel Engines while some, typically faster passenger routes like Shinkansen in Japan and TGV in France are powered by electric motors.

Typically, the electrical energy fed to electric trains is communicated to the trains by overhead power transmission lines. The trains have electric pickups that slide along the power wires above and communicate electrical energy into the train and to the trains electric motors.

Essentially all vehicles on the roads and railways today are gasoline or Diesel, Internal Combustion Engine (ICE), vehicles. Roadways and railways are therefore designed to meet the requirements of such vehicles. When designing tunnels, one major cost is to install ventilation systems to handle the enormous volume of pollutants emitted by these vehicles. Tunnels are built to enable a traveler to bypass some obstacle such as a mountain or waterway. As such they are built along the shortest possible route that is able to enable vehicles to bypass an obstacle.

A higher speed transit system called Hyperloop is in development by multiple entities. This is a system where a tube or conduit is constructed and then the air is removed so that pods can travel within the tube at velocities comparable to jet aircraft. Air travel and train and bus travel are also available to people desiring to travel between places. Except for road travel, all other travel means typically require leaving one's car behind and finding transportation at the destination. In contrast, driving along roadways requires the driver to be attentive for long periods of time, the trip takes longer than planes or Hyperloop, but when one arrives at a destination he/she has their vehicle to drive around the destination, saving the cost of parking the car at the origin and rental or taxis at the destination.

Electric Vehicles (EVs) are today just starting to become a significant vehicle choice. Currently they comprise perhaps two thousandths of the installed base of road vehicles. Roadways, for this reason, are still built to serve ICE vehicles and not EVs. However, it is anticipated that EVs will become increasingly important as a vehicle option, with growing sales and fleet percentages in the future. EVs enable new roadway technologies to be contemplated, created, and deployed. EVs, however, suffer from among other things, limited range.

Today, as a vehicle moves faster on an open roadway, the aerodynamic drag imposed upon that vehicle is increased non linearly. For EVs with limited range, this is a serious problem. Numerous reports detail where an EV driver had to slow down to ridiculous velocities so that they didn't run out of battery energy prior to reaching a charger. An EV can, for example, double its range by slowing from freeway speeds down to around 25 mph where aerodynamic energy loss is greatly reduced. If a new roadway could be constructed that improved the long distance range of EVs then their adoption would accelerate. The same goes for EV cars, semi-trucks, and also for electric rail vehicles, aka: electric trains.

Figure 1B:
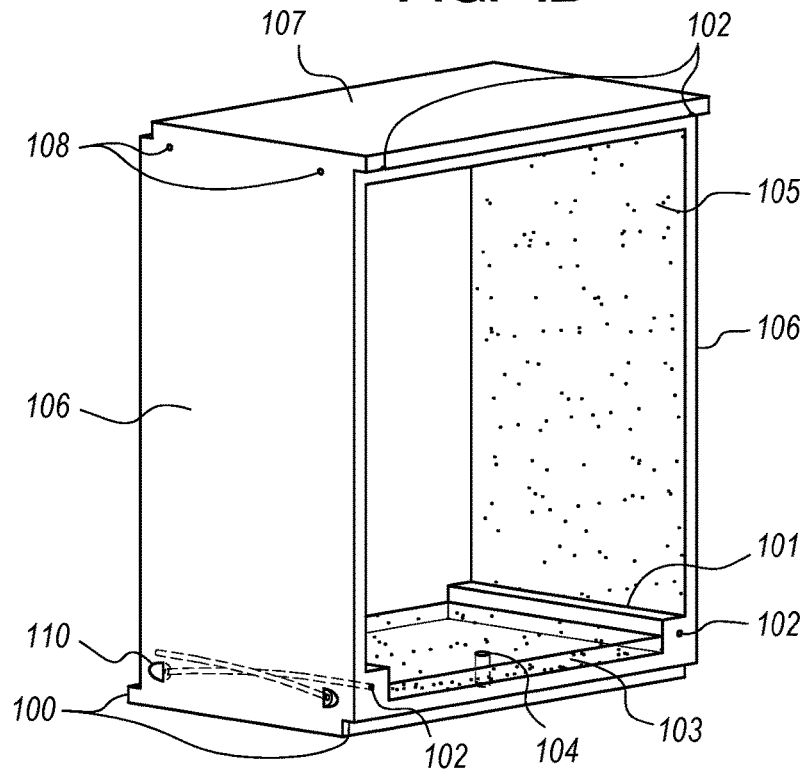

Referring to FIGS. 1A-1B, ship lap segment joints 100 are designed to enable rapid setting of adjacent roadway conduit sections 10. Curbs 101 on each side provide a side barrier for vehicles to remain between and also a support structure upon which steel rails can be optionally installed for rail transportation. In this case the curb can be raised upward (not shown) so that any rail vehicle is elevated above any roadway vehicle so as to separate the two modes of vehicle at entrances and exits to the conduit system so that each mode of vehicle can enter or exit the conduit system.

Holes 102, enable passing steel cables so that long sections of several roadway segments can be optionally post tensioned together after positioning them. After post tensioning a section of roadway conduit together, one can optionally and preferably force concrete into one or more holes 104 in the base of the roadway conduit segment so as to flow concrete grout or other suitable hardening material beneath the roadway segment to fill any gaps in the sub grade base material that may have formed during positioning of the segments during construction.

In some embodiments, a layer of rubberized asphalt 103 will be installed on the road base segment to reduce tire noise and smooth the vertical accelerations experienced by occupants of high speed vehicles. Whether the additional layer 103 is added over the precast concrete or other material base layer, the top surface of the bottom interior of the conduit provides a road base upon which road vehicles can roll. The interior size of the conduit can be larger or smaller depending on whether the conduit will be used by cars, pickup trucks and SUVs, semi-trucks with trailers, and/or self-powered, steel wheeled, train cars riding on rails (not shown), the rails preferentially being located on top of curbs 101, or alternately along the road base bottom (not shown).

Ideally the roadway conduit segment 10 in FIGS. 1A-1B will be constructed using precast concrete methods similar to box culvert construction except that preferably the rebar within the segment will be bent in a continuous coil from long continuous coiled rebar so that the jacket within the concrete is formed with few joints and the speed of building and casting sections is increased. Thicknesses of top, base, and walls can be varied depending upon the loads they will carry for specific applications. Optional lift bracket attachment 106 is positioned so that the segments can be quickly lifted from trucks and positioned along the roadway conduit. Alternately a cradle for the crane can be used without fixedly attaching a segment to the crane lift cable components during placement.

Figure 12:
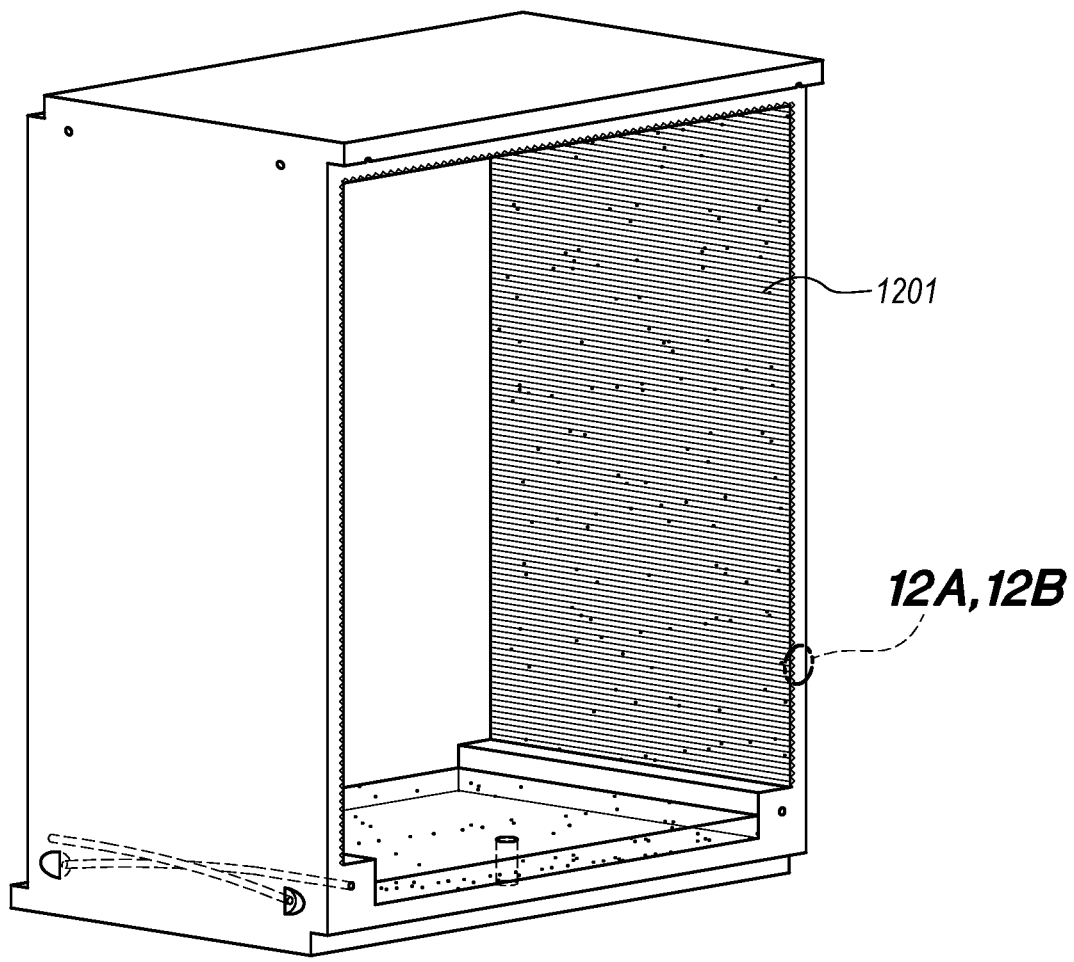
FIGS. 12 and 12A-12B show example techniques to reduce acoustic noise within the conduit system including acoustic reflective surfaces and acoustic damping materials.
Figure 12A:
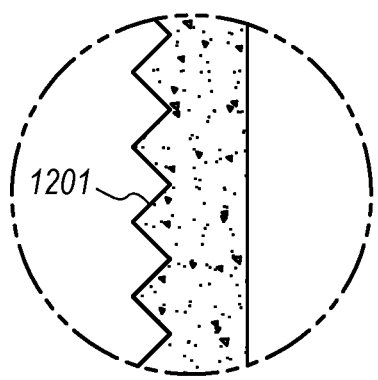
Figure 12B:
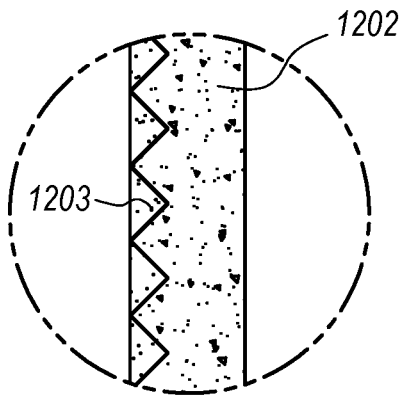

Sound deadening material can also optionally and preferably be coated on the other interior surfaces 105 which can also be fitted with longitudinal "V" notches as in FIG. 12A to provide multiple reflections of acoustic energy to increase sound absorption within the conduit system. Also seen are sidewalls 106, roof or ceiling 107. Walls and/or ceiling can optionally be covered with a sound deadening material such as shown in FIG. 12B.

Post tension holes 102 (four shown) on cable termination segments FIG. 1B are shown with additional penetrations 109 (inside optional location) and 110 (exterior optional location). These will typically only be on those segments located at the ends of the cable runs to enable post tensioning. Cable hole 102B (bottom left hole on FIG. 1B) connects through the concrete to a typical cable termination position located at 110. Cable hole 102A on the opposite end of the segment, (not shown but close to cable termination 110) connects through the concrete to cable termination 109 shown. In this way, cables running in opposite directions overlap, essentially for the length of the segment. However one could as easily install a steel cable termination near the center of the segment to which cables coming from opposite directions both terminate in which case the cables technically overlap but practically terminate at the identical location. The point of specifying that the cables overlap is so that all of the concrete in all conduit sections, including the termination segments, are put into compression by the cable stress. It would be sub optimal, for example, to have the cable entering hole 102A terminate at location 110, and the opposite, a cable entering 102B and terminating at position 109, as that would place the concrete in this termination conduit segment into tension, a condition for which concrete is not a suitable material to use.

Figure 2:
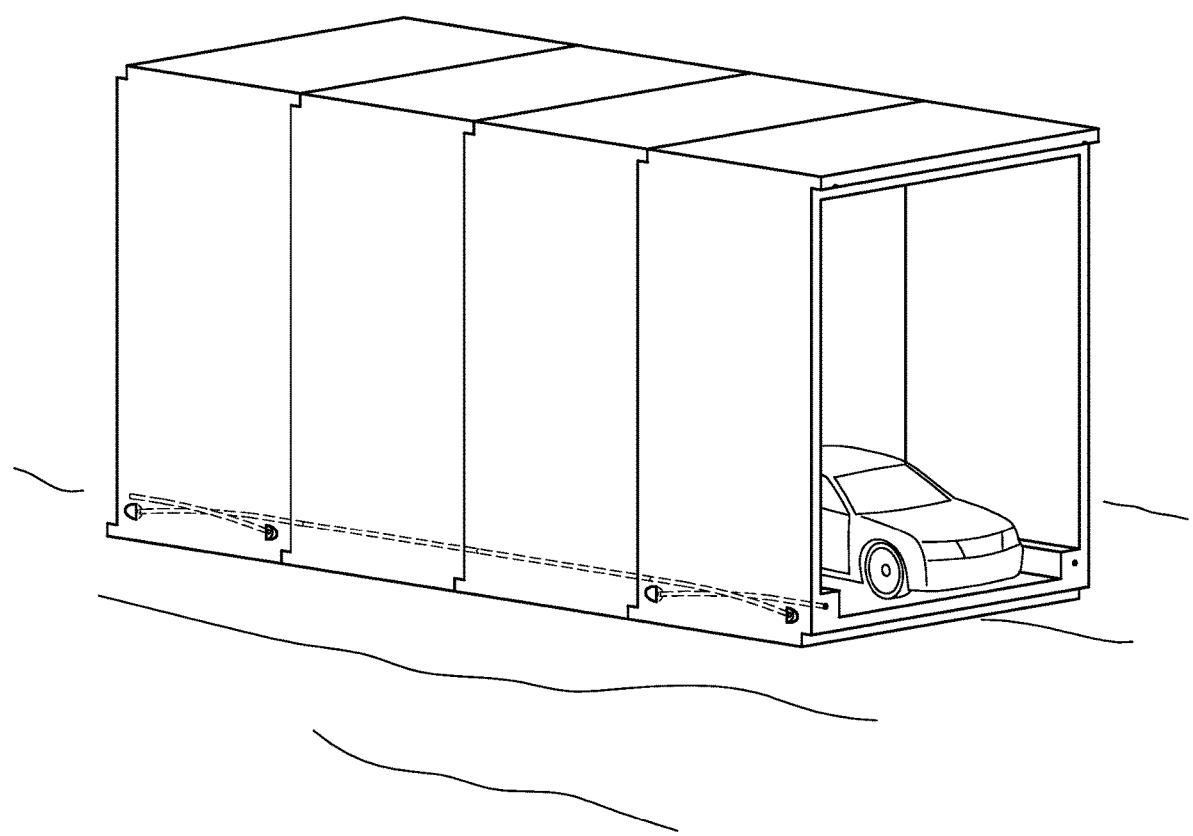
FIG. 2 shows a short roadway conduit including 4 individual precast concrete conduit segmental sections and a vehicle therein.

FIG. 2 shows a group of four individual segments of a roadway conduit 20 assembled together and also a vehicle, a car, within the conduit 20. The car is shown moving to the right and the air within the conduit will be moving in the same sense, naturally, due to vehicular drag (piston effect) and optionally also due to air mover energy deposition into the air within the conduit roadway system. FIG. 2 shows the roadway conduit 20 installed on the surface of the ground, where the ground could be dirt or it could be a previously existing surface roadway. It also shows how post tensioned cables overlap including a cable in hole 203 running through adjacent segments from hole 201 to hole 202. The segments are shown aligned, but using this method the segments can additional be adjusted to different orientations allowing the interior roadway conduit bore to curve around a horizontal turn and/or to rotate about a horizontal axis to allow the conduit to be directed upward or downward to follow the contour of the sub grade. Like a "Chinese" segmented toy snake, this construction method enables the conduit segments to be rapidly placed along any course, and then locked together into a segmented but otherwise single continuous structure capable of small movement without failure of structural integrity.

Figure 3:
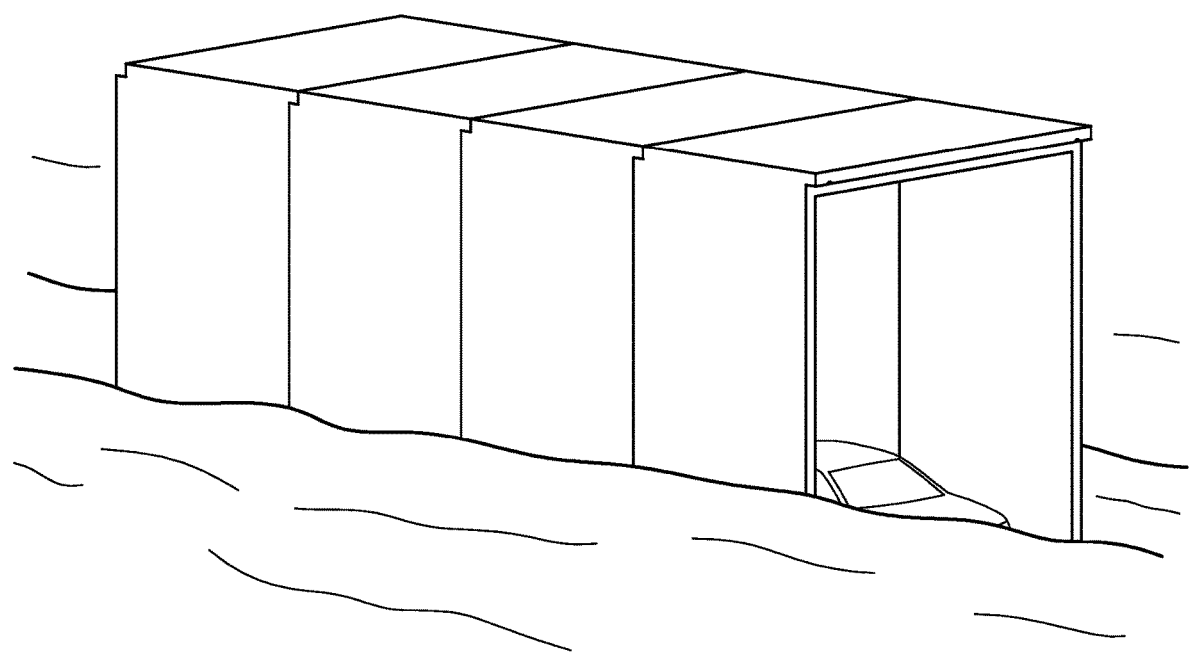
FIG. 3 shows the same short roadway conduit partially buried

FIG. 3 shows the same system partially buried. In this preferable but more expensive installation the structure gains stability both mechanically and thermally due to being partially buried. Further, by sealing the segments against water intrusion, and depending on exact materials and sub grade densities and segment geometry, the shown configuration is approximately the depth at which a segmented tunnel would float over marshy swamp land. This installation affords an additional advantage that it does not require a foundation, as would a viaduct. It is somewhat like a submerged tunnel road where it is only partially submerged. This construction method enables the roadway conduit to be installed across land that is incapable of supporting piers or other typical foundations required for surface roadways and/or viaducts. Once sealed and post tensioned, the entire segmented system becomes a semi rigid roadway conduit that provides energy conservation and also enables a roadway to be installed in heretofore impossible locations.

Figure 4:
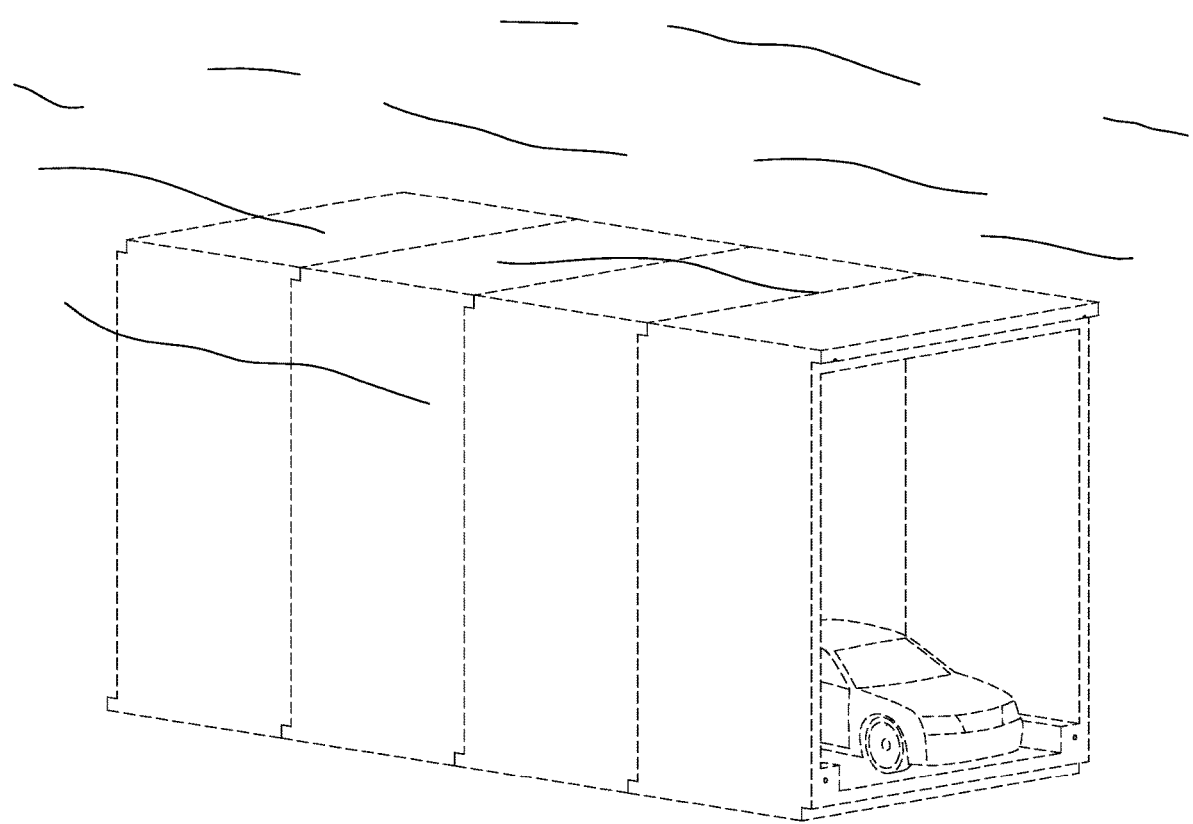
FIG. 4 shows the same short roadway conduit fully buried but close to the surface.

FIG. 4 shows the same system again, fully buried. While fully below ground, the top of the conduit segments is typically within three meters of the surface, and therefore the planetary atmosphere, so that provision of emergency exits is easy compared to a tunnel under a water way or through a mountain, where outdoor air would be a long distance away requiring expensive pedestrian corridors. While not shown, emergency exits can easily be provided at close spacings down the length of the roadway conduit system at a very low cost due to the short distance to the outside atmosphere. If required along a route, a roadway conduit can be coupled to or built as a tunnel to penetrate through a mountain, river, sea, city, freeway interchange, or other obstacle. While the tunnel section would not be considered a roadway conduit on its own, if it is couple to a roadway conduit to get past some obstacle, it then becomes a part of the overall roadway conduit system and is considered part of the roadway conduit system.

Figure 5:
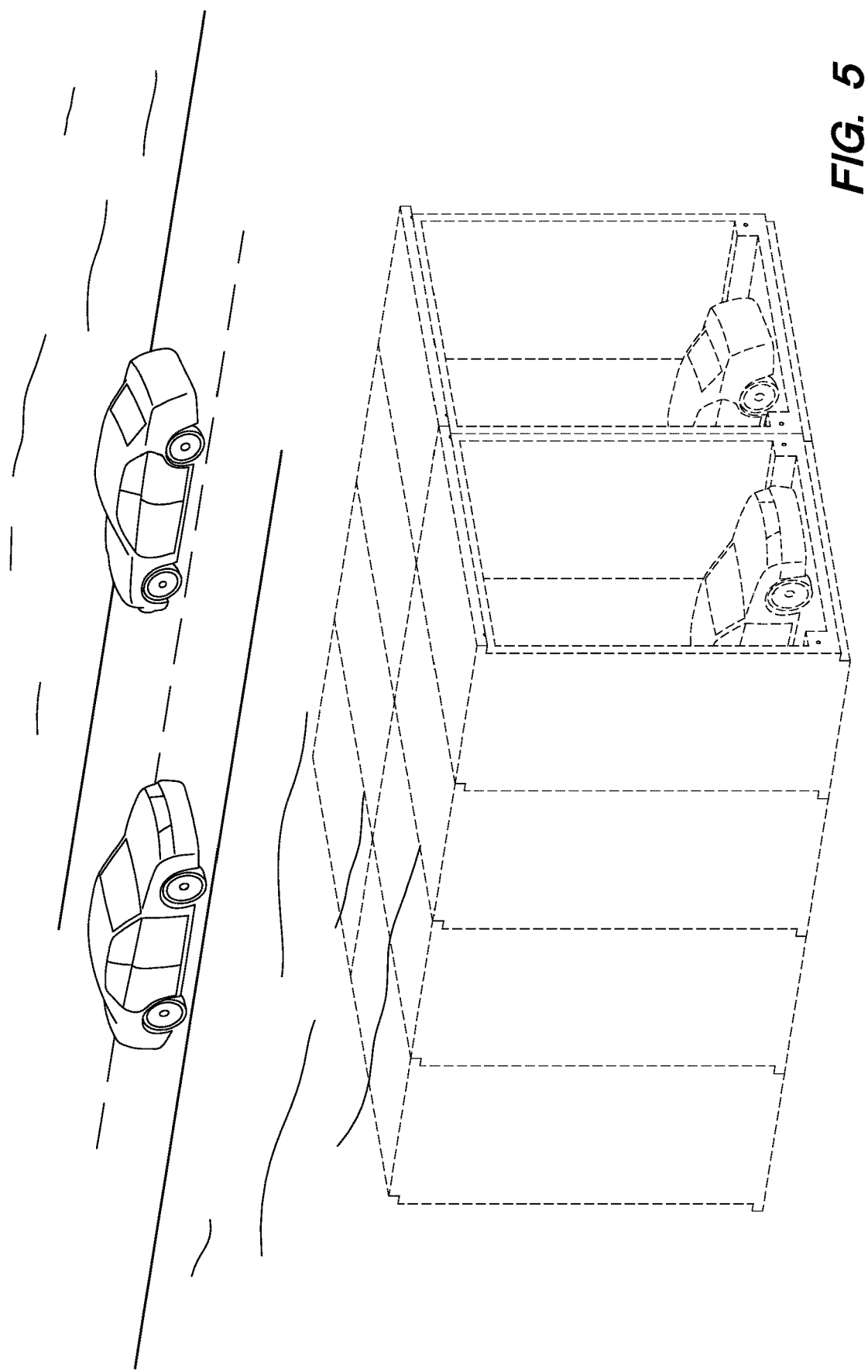
FIG. 5 shows two independent roadway conduits positioned adjacent to one another and including bi directional traffic, one direction in each roadway conduit, and also that the roadway conduit can be fully buried just beneath the surface to enable a surface roadway to be constructed on top of the conduit roadway.

FIG. 5 shows a pair of conduits as in FIG. 4, this time with a surface roadway installed on top of the just below grade roadway conduits. In this manner, a little like subways in a city, a high speed roadway conduit could be installed below a low speed city street, or, below an existing surface freeway so as to provide the new functionality while maintaining the surface roadway function. Again, the interior conduit is close to the outside atmosphere to enable fast and easy exit creation along the length of the conduit. Preferably the interior of the conduit is within 3 meters of the exterior atmospheric air and still more preferably it would be essentially adjacent to the outside atmosphere with a surface roadway installed directly on top of the conduit segment. It should be understood, however, that the minimum depth reduces construction cost, while a more deeply buried roadway conduit would perform just as well while costing more. In some aspects, the three meter metric distinguishes these roadway conduits from tunnels that are built below a waterway or through a mountain, where the distance from the interior of the conduit to the outside atmosphere can be hundreds or even a thousand or more meters. Another aspect of the shallow depth is that it is not practical to bore a tunnel at such a shallow depth due to cave ins of overlying dirt. Therefore, the conduit segments will typically be constructed using excavators, whereas tunnels are typically built using Tunnel Boring Machines (TBMs) and/or via blasting methods. Tunnels are in general not close to a surface and therefore tunnels are typically not constructed using excavators and instead are required to use more expensive digging equipment and methods.

In some example embodiments, the three meter depth and any other depth where the conduit system is built to substantially take advantage of the features described here are also considered equivalent to this depth figure as the interior tunnel performance is virtually the same regardless of the depth the conduit is at.

FIG. 6 shows a vehicle going airborne and flying over a typical barrier installed between opposing traffic on surface freeways. The collision energy is dramatically larger if a head on collision is possible. Within the roadway conduit system, head on collisions are impossible. Further, there are no protrusions within the roadway conduit system for any vehicle to collide with and suddenly come to a stop. The worst crash possibility within the roadway conduit is for a vehicle to bounce off of and scrape the interior walls until stopped, a very low collision energy scenario. A lower deceleration rate translates into less severe injuries for occupants involved in an accident within a roadway conduit as compared to a similar velocity accident on a surface roadway.

Figure 7:
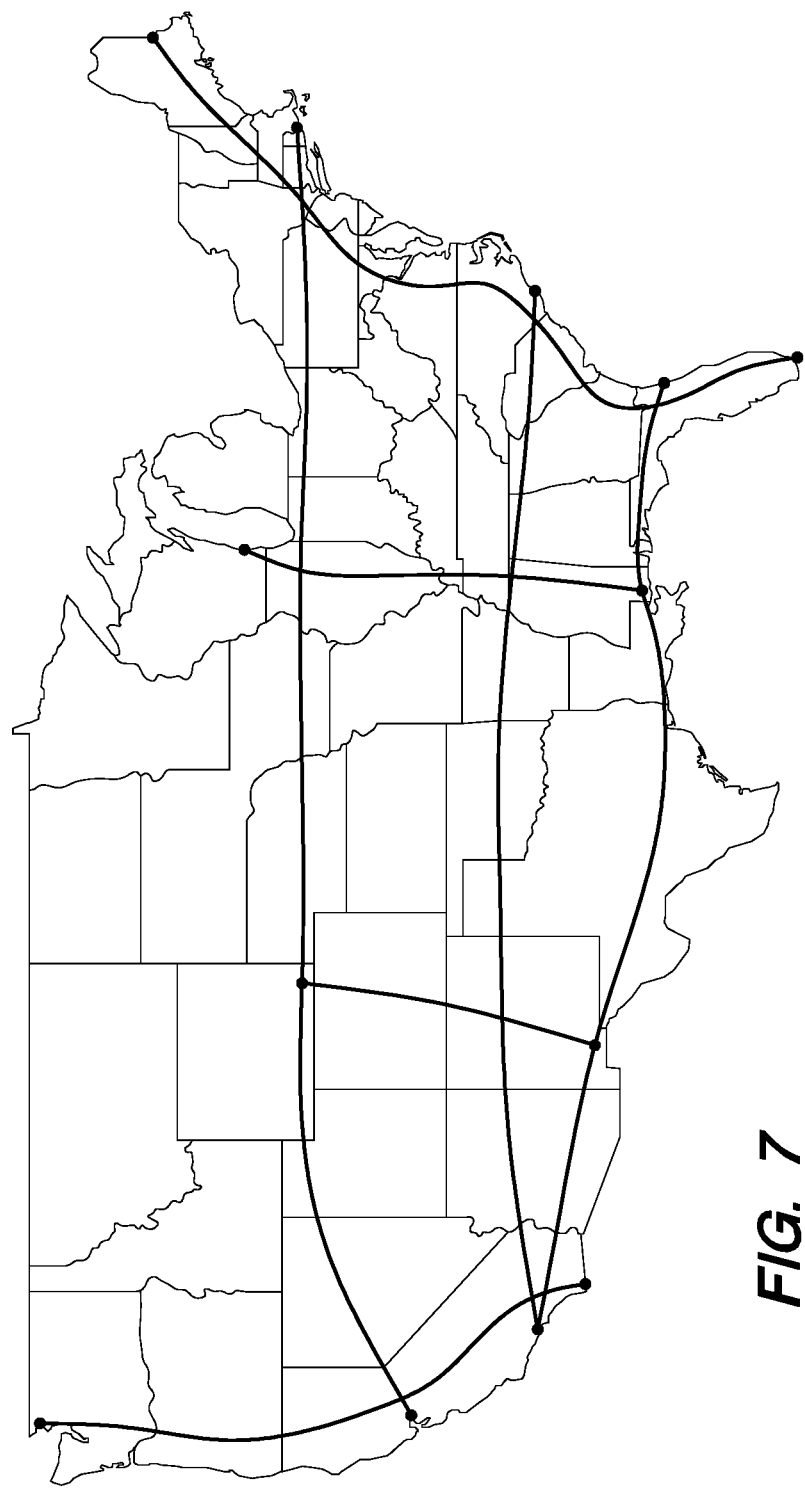
FIG. 7 shows a few potential long distance routes, cross country, that the roadway conduit may follow.

FIG. 7 shows diagrammatically, various roadway conduit paths around the US. The roadway conduits are intended for long distance transportation with cross country being ideal. They are of course also useful for short distance travel, especially in locations with problematic traffic congestion where the conduits provide an alternate transit method where vehicle motions are computer controlled leading to increased vehicle throughput. One conduit lane can flow 5 surface traffic lanes worth of typical stop and go traffic. So the conduits are useful as long distance routes due to decreased transportation costs and also as short distance routes due to increased traffic volume flow capability.

Long distance travel with higher velocity and simultaneously lower energy consumption have not been possible in the past so that these very long routes provide a dramatic time and energy savings while at the same time providing improved safety.

In example embodiments, a post tensioned, segmented, conduit way construction method is used to provide a conduit way that creates a surrounding rigid shell and an interior space within which a hyperloop tube can be installed. In this application, the segmented conduit way construction method is used to provide a rigid support structure upon which the hyperloop tube can be built. By constructing the hyperloop tube in a tunnel, the tube can be built using lower cost methods and thermal expansion of the tube problems are dramatically reduced. Compared to underground tunnel construction methods and to above ground in tube construction methods, this combination of ground surface proximate conduit way with interior hyperloop tube enables a lower cost overall construction and as well, post construction adjustment of the tube position to offset minor earth settlement that typically occurs over long periods of time. Within the conduit way, hyperloop tube supports can be adjusted to re align the tube along any section where earth settling has altered the tube course compared to the original installation.

FIGS. 8A-8B show one version of an eight-way air mover. These figures are an elevation view of a roadway conduit. It shows one embodiment where the air movers 801 located between a pair of air deflectors 803 and diverter bulkheads 802. The air movers are bi directional. Each deflector 802 is able to modify the air source or sink between 2 choices. A first choice is air within the tunnel and a second choice is atmospheric outside air. Two inlet choices combined with two outlet choices make 4 air flow options. Then, providing a bi directional air mover doubles the options from 4 to 8. With the system, air can be blown into the conduit in the forward or backward direction. The air going into the air movers can come from atmospheric air and/or from conduit interior air. As the deflector vanes 803 are adjusted between extremes, the air percentage is shifted from 100% one way to 100% the other way and includes 50/50 and every percentage ratio in between as optional control settings. Air direction can be determined and controlled based on a variety of needs such as vehicle energy conservation, runaway vehicle increased air drag via reversed airflow imposed on vehicles, and airflow directivity based on the location of smoke emission in case of emergency operations such as a vehicle fire within the conduit system.

Car and truck vehicles are shown, optional rail vehicles and rails are not shown. One method of constructing an 8 way air mover is to provide above the conduit way, three air mover sections. In the middle are bi directional air movers. On each side there is a movable vane that directs air flow to be communicated between the conduit interior and the outside atmospheric air. FIG. 8A shows air being communicated in the forward sense, from atmospheric air to conduit system interior. This will accelerate the air within the conduit and will also increase the pressure within the conduit. FIG. 8B shows air being brought into the air mover from behind and being pushed outward at higher velocity ahead. This will accelerate the air in the forward direction and will slightly reduce the air pressure in the conduit behind the air mover inlet and slightly increase it ahead of the air mover exit. Operated as shown, both of these configurations reduce vehicular energy demand.

Not shown, if the direction of air motion from the air mover is reversed, then FIG. 8B could be operated with air motion along the path shown but in the opposite direction. In this case, the air motion will work against the vehicular motion and act to increase vehicular energy demand. In the case of a runaway truck emergency, this configuration could be created in real time if for example, a truck sent a message to the conduit control system declaring an emergency and requesting the reverse air flow assistance if, for instance, the truck were heading down a steep incline and had lost regenerative braking and also frictional braking.

By blowing air backward up a downhill conduit, a truck could be slowed via a completely different method than either frictional brakes or regenerative braking. This provides the function of a "Runaway Truck Ramp" on conventional surface freeways.

At the same time, optionally, the conduit control system would send messages to all other vehicles instructing them to take specific actions, such as increasing safe separation distance from the runaway truck, and also for instance, vehicles behind the truck could be instructed to slow so as to further reduce the forward air flow to aid the air movers in helping the runaway truck slow down. One choice for the air flow pattern could be the same geometry as shown in FIG. 8B except that the arrows on the air motion would be reversed to impose a headwind impinging upon the truck. Vehicles ahead of the truck would be instructed to accelerate away and ahead of the truck as they too would need to increase power to just maintain velocity.

Figure 9:
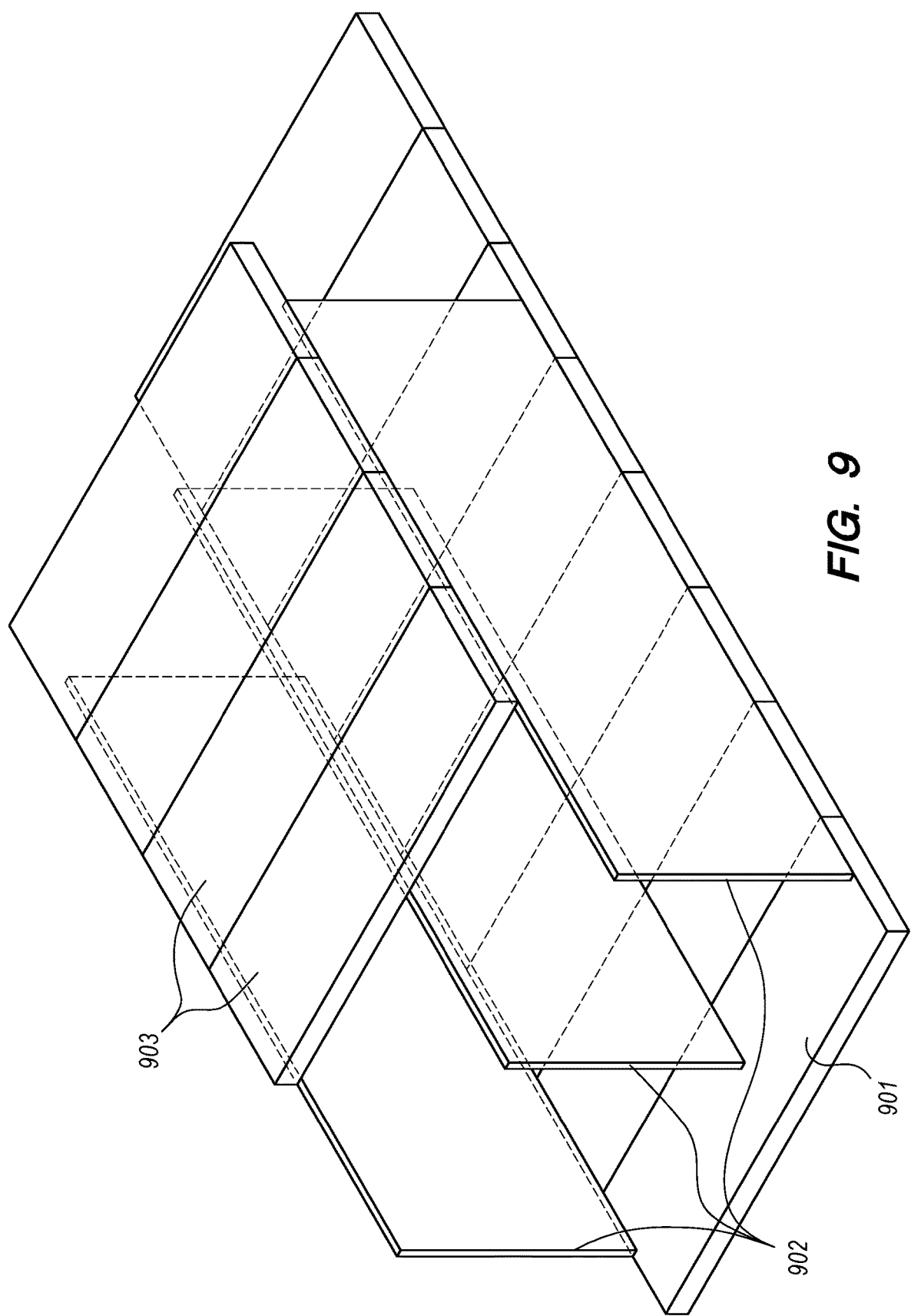
FIG. 9 shows one method for constructing a roadway conduit using precast concrete slabs that are joined together.

FIG. 9 shows another roadway conduit construction method where precast pre-stressed concrete flat slabs are assembled. This view shows one way to build a bi-directional conduit system where one conduit carries traffic in one direction and the adjacent conduit carries traffic in the opposite direction. The two conduits could alternately be used to carry two lanes of traffic in the same direction, and optionally in this case the center divider wall could be eliminated by means of using thicker and stronger roof slabs to span the larger conduit width. Rather than individual segments, this construction uses precast slabs that are fixedly connected. FIG. 9 shows a roadway with horizontal slabs 901 upon which are placed 3 walls 902 and roof slabs 903. FIG. 9 shows a construction that forms a pair of conduits for 2 adjacent roadways. These could be in the same, or in opposite, directions.

Figure 10:
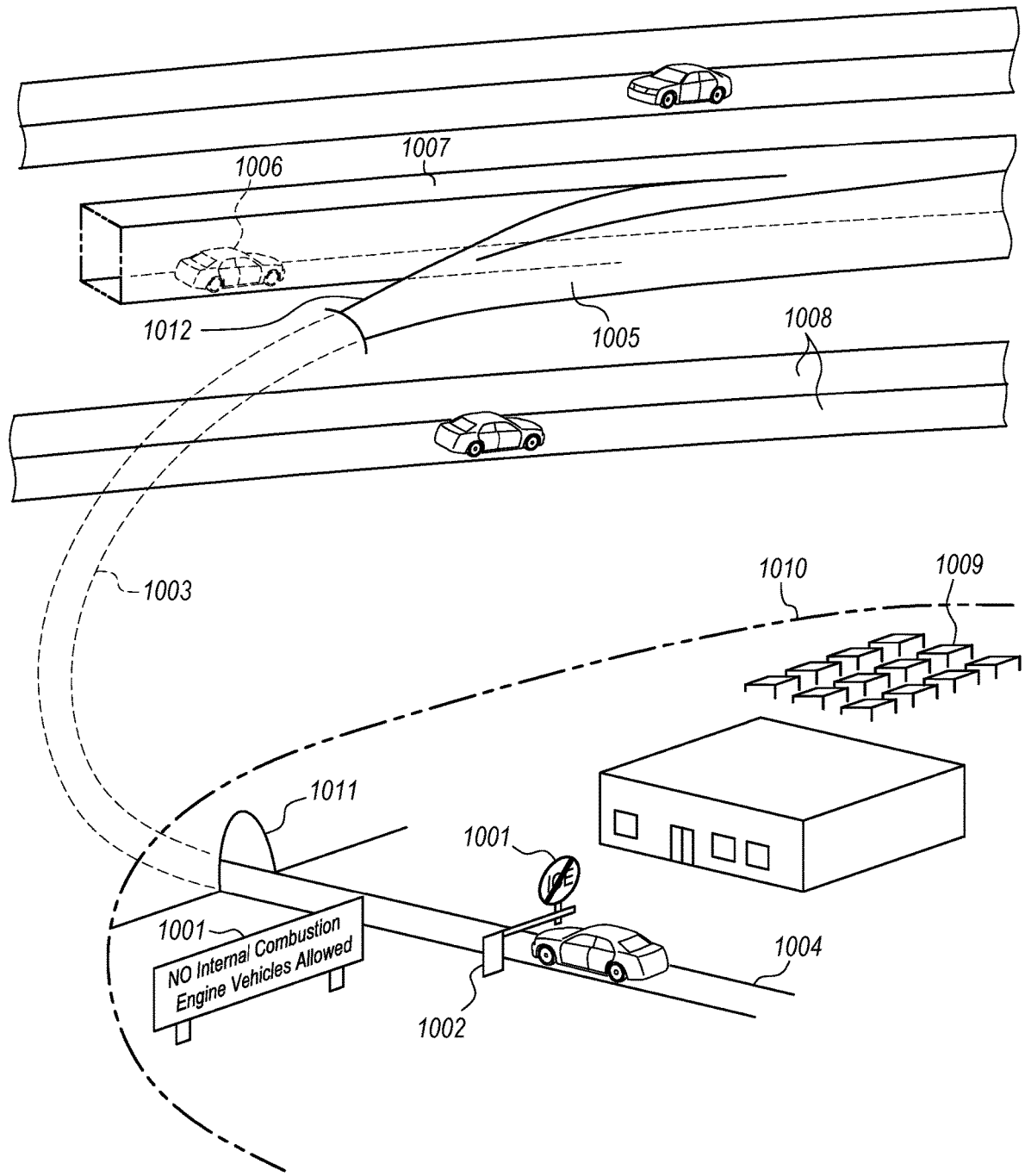
FIG. 10 shows one conduit lane of a typical roadway conduit system alongside a typical surface freeway bi directional pairs of lanes and including a roadway conduit system ingress roadway that passes beneath the existing surface freeway, comes up and connects traffic into the roadway conduit system and including various forms of internal combustion engine (ICE) barriers.

FIG. 10 shows the layout of a typical roadway conduit system including a property adjacent to an existing surface freeway 1008 where a solar 1009, wind or other renewable energy farm can be constructed. At an entrance into the roadway conduit system along an ingress roadway 1004 there exist one or more ICE vehicle barriers 1001 and/or 1002. These barriers can be in the form of signs including signage indicating fines for failing to observe the barriers or alternately in the form of an actual barricade 1002.

The ingress roadway 1004 to 1005 in this case is shown crossing the existing surface freeway by dropping below grade, passing beneath, and then rising back up to the level of the roadway conduit system and merging with any traffic 1006 within the roadway conduit system 1007. Alternately the ingress could be effected via an overpass or in the case where there does not exist a surface freeway, directly at grade. It is also possible to create the ingress roadway as a left exit from the existing surface freeway 1008 and direct entrance into the roadway conduit system. It is further possible to effect ingress and egress roadways to a property adjacent to the conduit way where the conduit way itself runs along the surface of a privately owned property so that the ingress and egress roadways do not need to drop below grade as is shown. These descriptions use U.S. roadway configurations where driving is to the right hand side of the road, but this convention is not intended to restrict the scope of the present disclosure where applied to driving conventions in other parts of the world.

Note that the ingress roadway 1004 drops below grade as it passes below ground at 1011 and continues beneath the existing surface freeway 1008 on its way to the merging section of the ingress roadway 1005 which rises back to the level of the local roadway conduit system 1007 at about location 1012.

A roadway conduit egress roadway (not shown) is essentially the same geometry as an ingress roadway in reverse, where traffic diverges from the roadway conduit onto an egress roadway and exits the roadway conduit system to arrive at a property adjacent to the surface freeway. The egress roadway could alternately enable vehicles to exit the roadway conduit and simply merge onto the existing surface freeway, or, it could enable vehicles to exit to an adjacent property via an overpass rather than as an underpass as shown. The Ingress roadway can also be constructed in different ways to enable access from different initial positions including and not limited to using an overpass from an adjacent private or public property, or access from a lane of the surface freeway, or other starting locations.

Of importance is that an ICE vehicle barrier does not need to be a physical barrier per se. It can be a sign or other signal that indicates simply that ICE vehicles are not allowed within the roadway conduit system. Whether a fine need be established or a physical barrier need be installed depends on the local public and how well they respect signage indicating that ICE vehicles are not allowed in the conduit system due to exhaust pollution. One passive ICE barrier is a sign stating "No Internal Combustion Engine Vehicles Allowed." A second barrier is the graphical version of same showing the world "ICE" with a diagonal line through it as the International symbol for what is not allowed, in this case, "Internal Combustion Engine" vehicles. The third barrier shown is a gate across the roadway.

Typically, the conduit control system will engage a vehicle desiring to enter the conduit system with a communication protocol that includes the creation of a vehicle ID for use within the conduit system that can be used later on in the case of additional communications while translating along the conduit system (for example, in case of an emergency the exact vehicle can be directed to take specific action so that all vehicles within the conduit system act in a coordinated fashion). The conduit control system will also identify what type of vehicle is at the gate and will only open the gate if the vehicle is a zero emissions vehicle such as an EV, compressed air vehicle, super capacitor vehicle and so on.

The ingress roadway beginning on property adjacent to but separate from the existing surface freeway so as to enable installation of a renewable energy farm on the property. Typically, an egress roadway will also connect to the property adjacent to the conduit way (not shown). Power cables to power equipment within the roadway conduit system can be brought into the roadway conduit system along with the ingress roadway conduit. Also shown is one rest building and as well, an array of solar modules.

The portion of the ingress roadway noted by 1003 is below grade but could be an overpass and be above the grade of the existing surface freeway.

Figure 11:
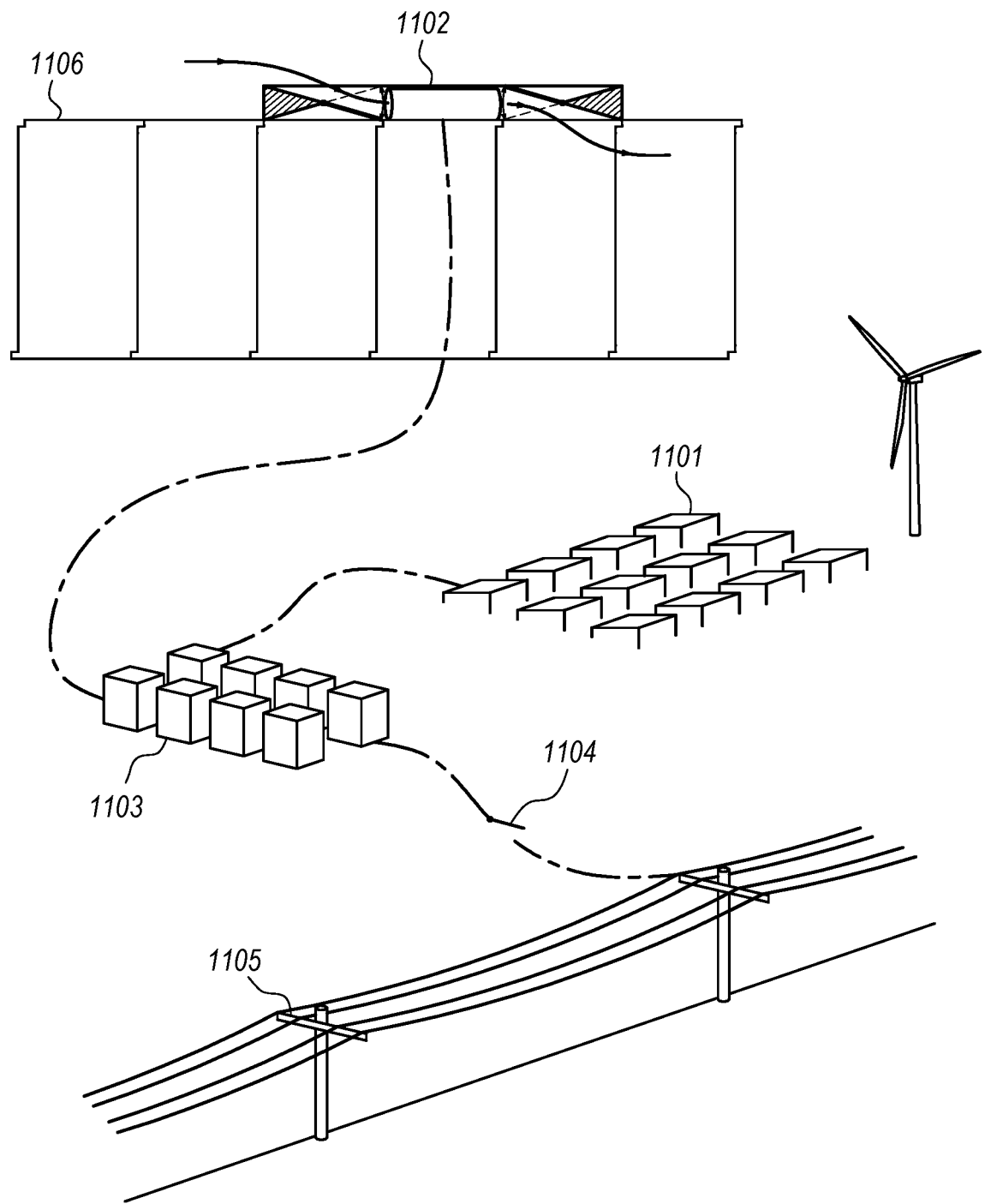
FIG. 11 shows an islanded roadway conduit system including conduit system components, renewable energy farm, system energy storage and an optional relay connection to utility energy.

FIG. 11 details the electrical system of the present disclosure including an air mover, optionally an 8 way air mover 1102 coupled to the roadway conduit system 1106 that is electrically connected to a renewable energy farm such as a solar farm 1101 and able to be operated as an islanded electrical circuit with only the renewable energy farm and the roadway conduit and it's electrical systems connected. Optionally a renewable energy storage system can be added to the islanded system such as for example, a group of battery power backup 1103. Optionally the entire system can be connected to a utility 1105 via a relay 1104. The roadway conduit system is shown with an air mover as a power load. While other sensors, lights, and systems will also require power, the air movers will in general be the largest power consuming devices within the conduit system. The power delivered to the air movers and conduit system will typically come from, an energy storage device such as a battery power storage 1103. The original energy for the conduit system will be generated by one or more of a solar farm 1101, wind farm, hydro-electric, or other on site power generator. The system will therefore be capable of operating 24/7 on its own, as is shown by the open relay 1104 that can optionally connect the system to a local utility 1105.

By connecting to a utility, the system is additionally able to push power out onto the utility and/or absorb power from the utility. This enables the renewable energy farm to be sized taking into account, local utility power availability and whether selling power or using the batteries to absorb excess utility power might provide additional revenue. The key being that the roadway conduit system with energy source and battery energy storage is capable of operating at night and when the wind isn't blowing, on its own. The connection to the utility is therefore an optional addition that enables use of somewhat smaller sized energy farm and/or battery bank. Further, the conduit system could be operated without onsite energy generation by simply using utility energy. Doing so, however, would be more expensive and so is less desirable.

FIGS. 12 and 12A-12B detail one optional method for damping acoustic energy within the roadway conduit system comprising at least one longitudinal groove to multiply reflect acoustic energy thereby increasing the degree to which that energy is damped. Grooves 1201 shown on one conduit segment design and in detail 12A, provide acoustic reflective surfaces to bounce acoustic energy. Detail 12B shows grooves filled with an additional and optional damping material 1203 to further reduce the acoustic amplitude within the conduit system. Preferably, acoustic material 1203 will more closely match the acoustic impedance of air than concrete 1202, so that acoustic energy will penetrate into the damping material and become attenuated prior to bouncing off of the concrete 1202 and heading back out and through the same material before exiting into the air of the tunnel. Preferably the material acoustic impedance will be between that of air and that of concrete so as to increase acoustic damping within the acoustic damping material. Optionally, the angles of the grooves can be tailored to be different at different places around the segment so that energy is preferentially reflected toward another part of the conduit segment walls or roof, rather than being reflected back toward the vehicle and occupants. In this way, acoustic energy is reflected more than once before returning to where another vehicle might detect it.

By lining the walls and/or ceiling with grooves, any sound pressure waves that strike those surfaces will be reflected more times than without. FIG. 12A shows grooves alone. FIG. 12B shows grooves with an acoustic absorbing filler material. Typically, the filler material will be of low acoustic impedance and high acoustic damping, while the concrete is of high acoustic impedance. In this way, acoustic energy must penetrate into the acoustic damping material, then reflect once or twice from the concrete surfaces, and then again pass outward through the acoustic damping material. This increases acoustic damping of noise and reduces the noise sound pressure within the conduit way system as perceived by occupants of vehicles within the conduit system.

Figure 13:
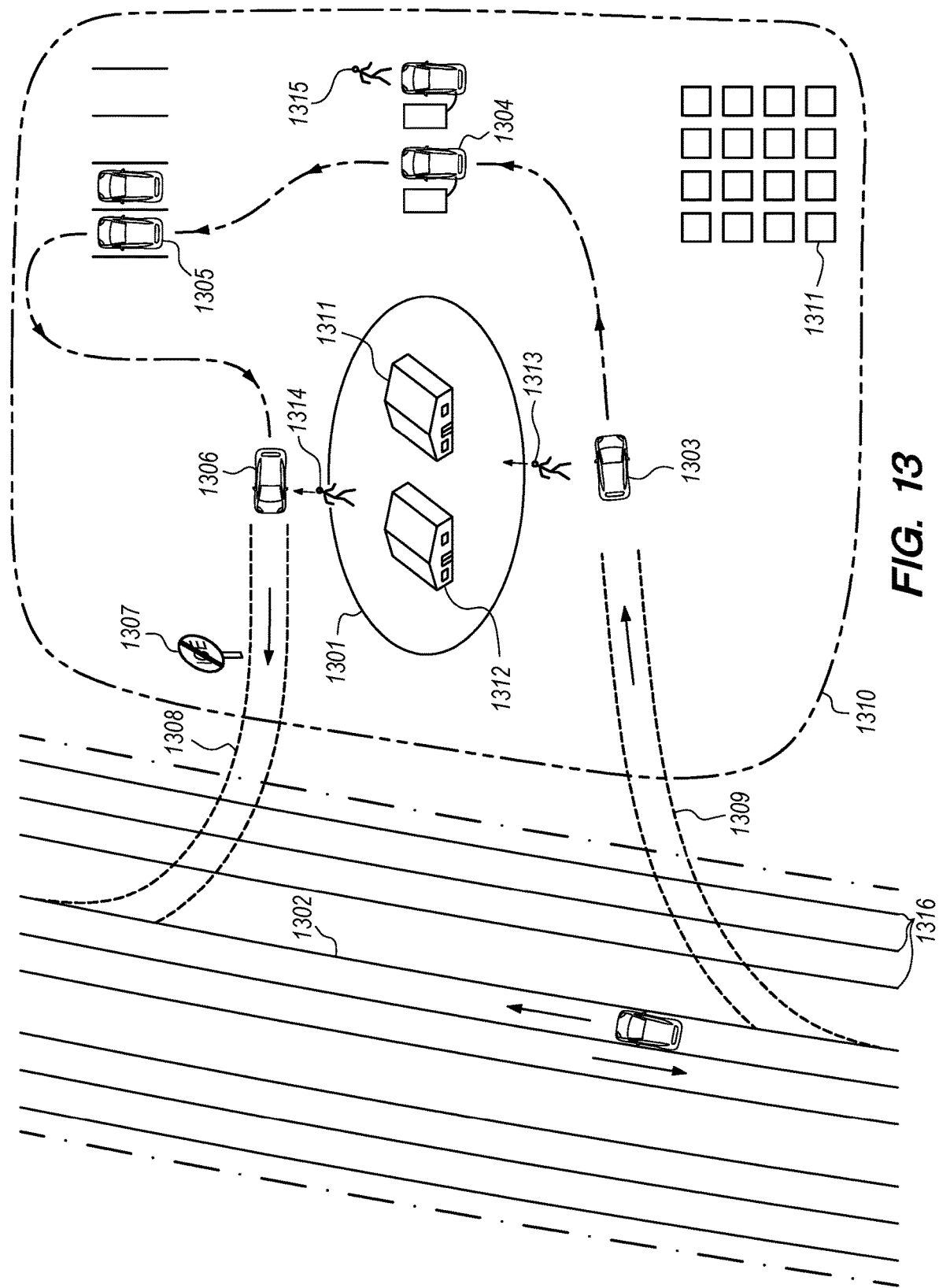
FIG. 13 shows a schematic layout for a conduit system operation including renewable energy farm and one method for a vehicle using the conduit way system to replenish an on board energy stores while also providing amenities for vehicle occupant(s) (if any).

FIG. 13 details the layout of a property adjacent to a roadway conduit system including a conduit roadway 1302, conduit egress 1309 and ingress 1308 roadways, a Charging Station Kiosk area 1301 including a vehicle occupant egress area 1303 and ingress area 1306, the Kiosk including optionally restaurants 1311 and entertainment 1312. A vehicle will exit a roadway conduit when it needs to be charged or when the occupants of a vehicle need a break. The occupants will arrive in the vehicle at the egress location 1303 and exit the vehicle. The vehicle will then autonomously drive to a vehicle charging location 1304 where it will be charged automatically or with charger worker assistance, assuming it needs to charge. After receiving the requested charge state, the vehicle will be disconnected from the charger (if it was connected), notify the owner that it is ready, and then if instructed, drive to the occupant ingress location 1306 where occupants can board the vehicle. Otherwise the vehicle will autonomously drive to a parking area 1305 and wait to be summoned by the occupants. A vehicle that doesn't need to charge will go directly to the parking area 1305. Following being summoned to the boarding area 1306, the vehicle will pass an optional ICE barrier 1307 and then enter the roadway conduit system, following instructions from the roadway conduit control system, via the roadway conduit system ingress roadway 1308 after which it will merge with existing traffic within the roadway conduit system 1302.

Figure 14A:
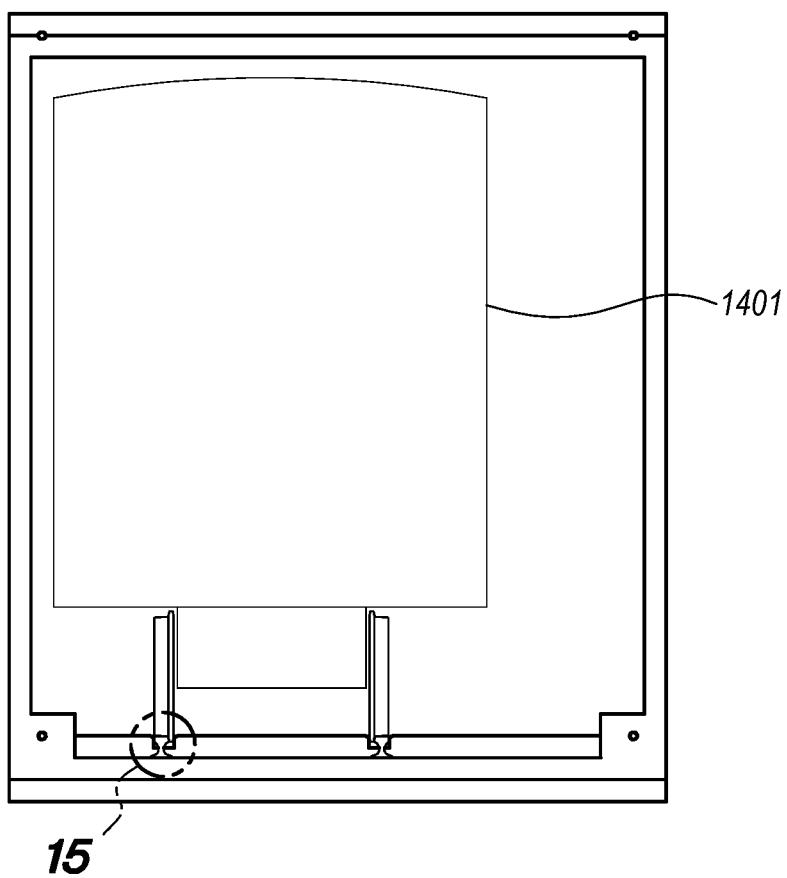
FIGS. 14A-14B and 15 show example implementations of conduit systems that can be used exclusively for rail vehicles or a combination of rail vehicles and vehicles with tires.

FIG. 14A shows a railway vehicle 1401. The vehicle has the same general geometry as a typical rail car on a modern railroad. The difference is that the railway conduit rail vehicle includes provision for fully autonomous control including at least one traction motor on at least one steel wheel. The vehicle is set to the side of the roadway conduit so that road vehicles with rubber tires can travel while straddling the steel rails as shown in 14B with roadway vehicle 1403.

Figure 15:
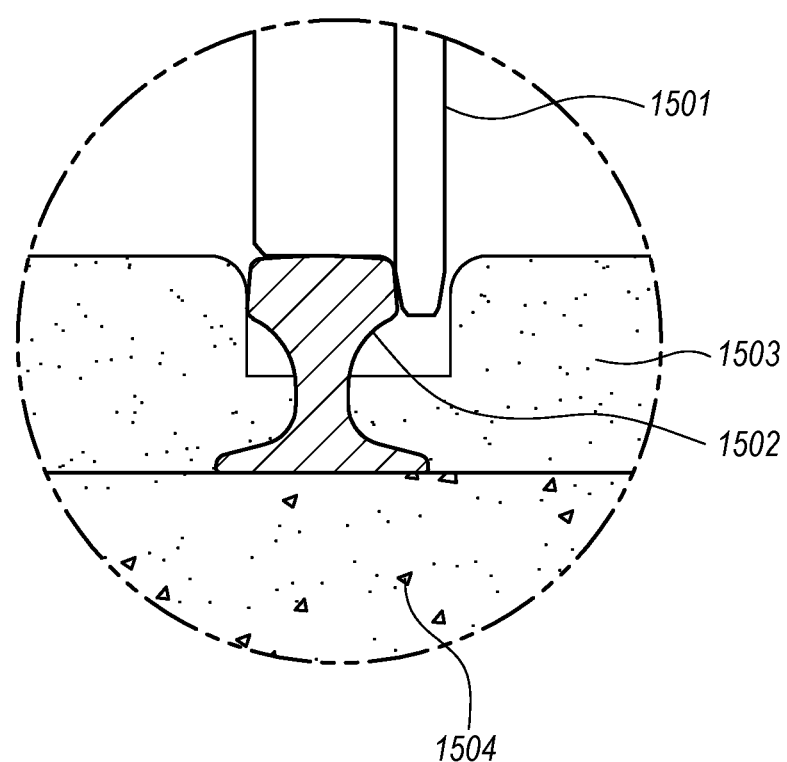

FIG. 15 shows how a steel rail 1502 can be set onto the cast roadway segment 1504 to provide a guide and support for steel railway vehicle wheel 1501. In FIG. 15, one embodiment of the railway conduit system is where there is added a sound dampening material 1503 upon which roadway vehicles can travel so that within a single way conduit, there can be roadway and also railway vehicles using the same way conduit at the same time. Because railway vehicles for use in the railway conduits are equipped with autonomous control controller, battery energy supply, and at least one traction motor they can travel in single car "trains" without the typical train engines that pull slave cars that do not have their own traction capability. In this way, rail vehicles can mix between road vehicles within the way conduit.

Figure 16A:
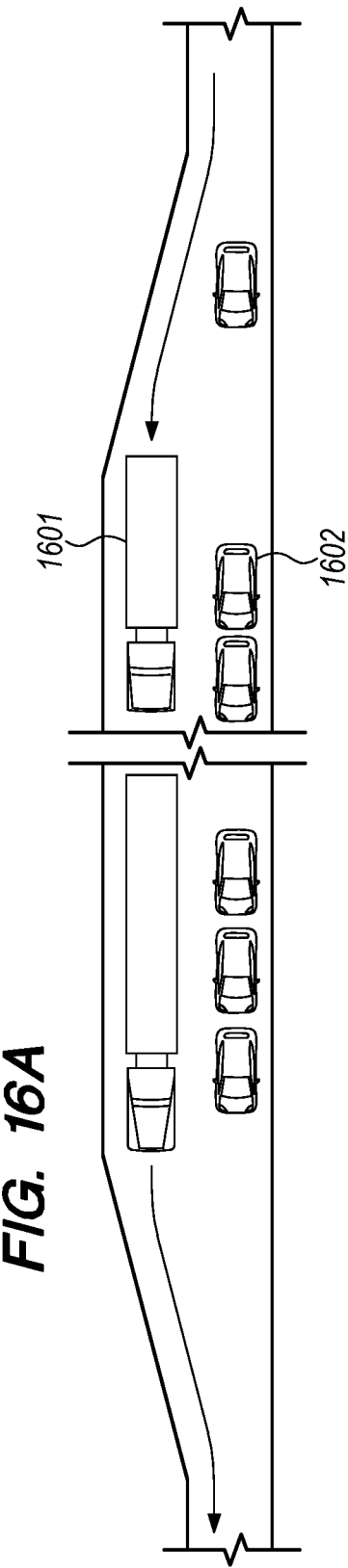
FIGS. 16A-16B show two optional conduit way additions.
Figure 16B:
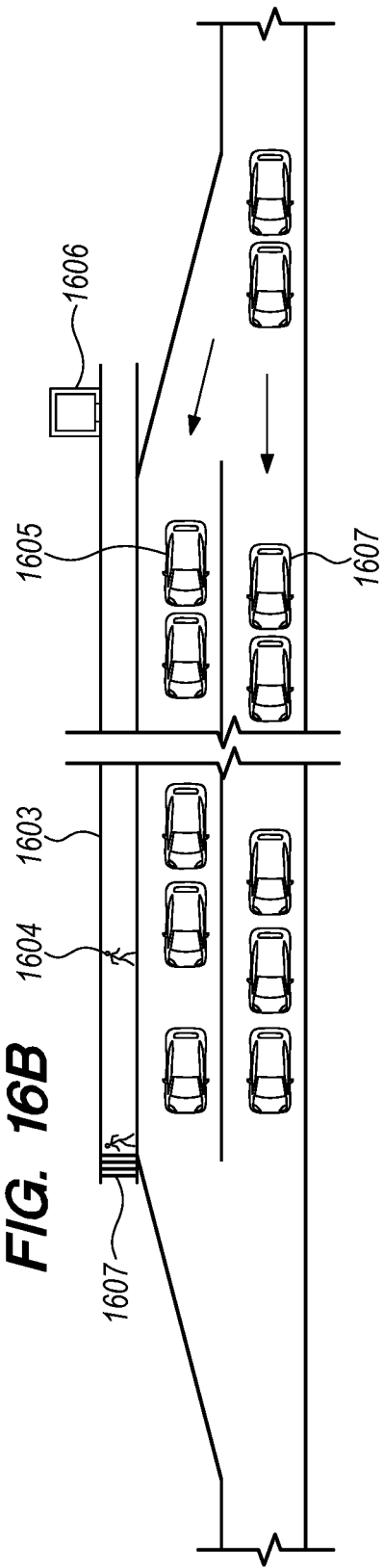

FIGS. 16A and 16B show two optional conduit way additions. FIG. 16A shows what can be thought of as a "siding." A siding is a place where slower vehicles such as the electric semi-truck 1601 that could for example be travelling through the roadway conduit at 60 mph might pull off onto a siding to allow faster 120 mph electric car traffic to pass. The siding could be short and the trucks could optionally come to a stop, or, preferably the siding will be long enough to enable the electric trucks to just continue at 60 mph and the electric cars to just continue at 120 mph while passing the trucks. In this way, the roadway conduit control system will, throughout the journey of the vehicles, monitor location and velocity of the cars and the trucks to arrange that the cars catch up to the trucks just as the trucks arrive at and pull off onto the sidings. In this way, a roadway conduit can enable two velocities of traffic flow within the same single lane conduit. Without the development of high speed commercial tires for 120 mph or faster freight movement, in other words, high speed rating truck tires, this sort of siding for the slower trucks is necessary. Once new commercially available high speed truck tires are developed, these sidings are no longer necessary as the freight moving vehicles can travel at the same 120 mph velocity of the passenger car vehicles. In a conduit fitted with rails, 120 mph rail vehicles could additionally be added into the mix of vehicles.

Figure 17:
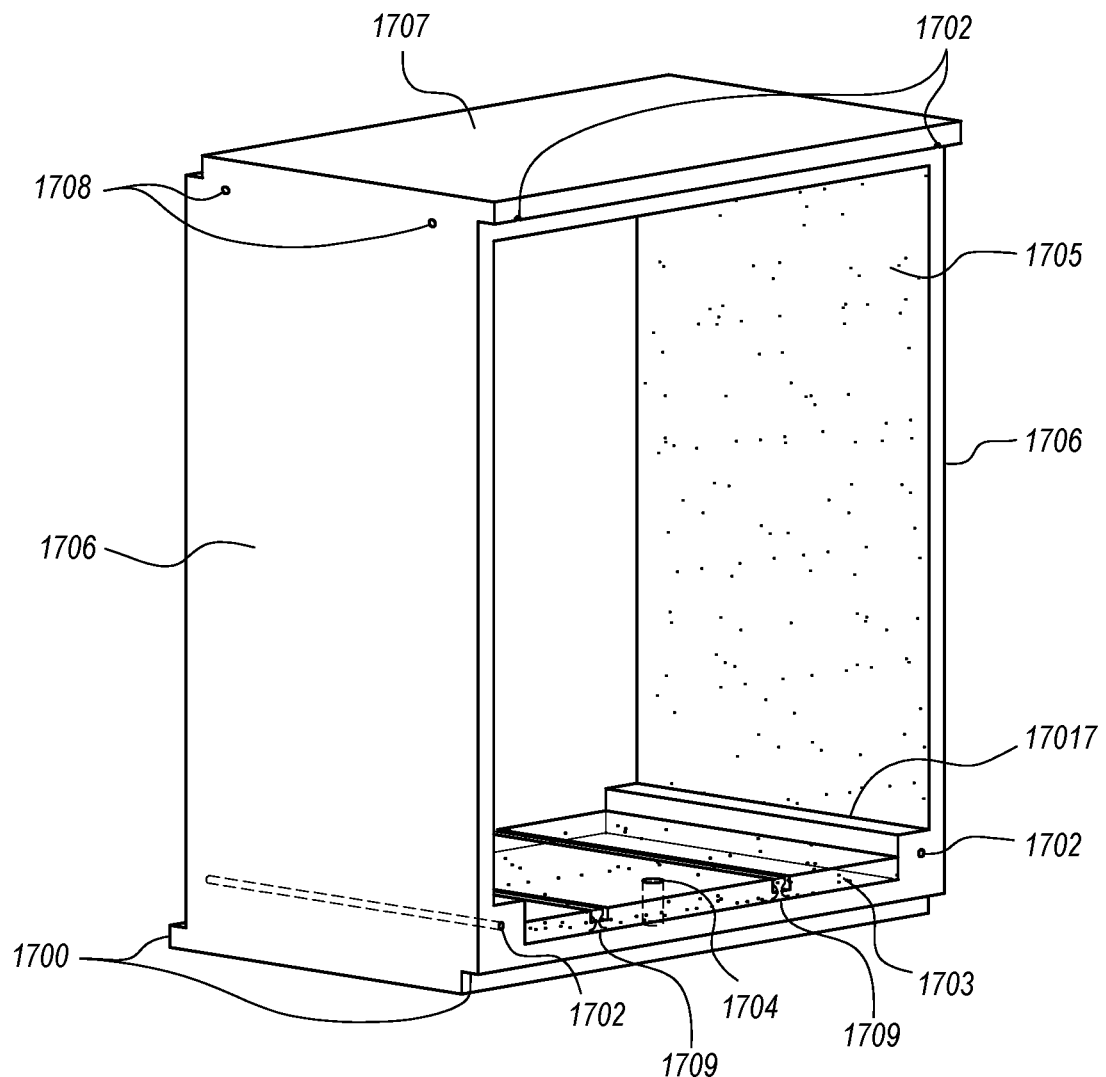
FIG. 17 shows an example implementation of a conduit segment including a road base and optional rails.

Turning attention to FIG. 17, an example set of features that can be incorporated into a way conduit segment 1706 is shown. Reference 1700 shows a tongue and groove geometry for the base. The lip on the side facing the reader may rest upon the support tongue close to the number 1700 on the page to the left. On freeways that use concrete slabs, precast or cast in place, it happens over time that vehicles, and especially trucks, that drive along the route transfer an impulse of energy upon transferring wheels from one slab to the adjacent slab. The roadway conduit had vehicles travelling from behind the page toward the reader, then the transfer of weight would progress from one segment with support above, to drop down onto the next segment with support below. In this configuration, the pounding would drive the segment toward the reader continuously down into the ground, thereby increasing the intensity of the pounding as time goes on and as the step between one segment and the next increases. By reversing the direction of travel so that vehicles progress from the reader side of the page, through the conduit segment and then onto a next segment behind the page, the load transfers from ground support onto the tongue. If there is a height difference it can only be in one direction, and the pounding will drive the upper tongue down onto the support flange, eliminating the height difference. The preferred direction for vehicular travel is therefore from the readers side of the page, through the segment and on toward the next segment behind the page of the figure.

Holes 1702 with four exemplary holes shown, though on a real segment it may be preferable to have a larger number of holes. They can be positioned around the segment through all faces of the segment, however, the most important locations are in the base and the roof of the segment. The holes are provided to enable the stretching of post tensioning cables to pull the segments together into a monolithic structure (e.g., like a "Chinese snake child's toy." In this way, each individual segment can be rotated or tilted slightly so as to follow the earthen terrain around curves in the roadway and where elevations changes need to be initiated and followed. Any slight gap between the mating surfaces of the conduit segments can be filled with hardenable grout. The post-tensionable cables are then tensioned, preferably after the grout has hardened to create a monolithic roadway conduit fabricated using a large number of individual precast and prestressed concrete segments as already described.

Reference 1703 shows an optional sound dampening and roadway surface smoothing material. In one embodiment the material will be a rubberized asphalt road base. Reference 1704 shows one possible configuration for a place where conduit assembly equipment can couple to the roadway segment to maneuver it around into position. A winch to pull segments into position can use the precast hole that preferably penetrates only partially through the segment so as to not enable intrusion of water from the surrounding earth into the segment interior. The winch can insert a pin into the hole and then another pin at the end of a pulling cable can be inserted into a similar hole of a different conduit segment. In this way, the winch can pull the two segments toward one another during assembly.

Reference 1705 shows a sound deadening material covering the side walls. The material can preferably also cover the ceiling inside the conduit. The sound deadening materials more rapidly attenuate sound generated by tires and vehicles as they move through the interior of the roadway conduits. This reduces the sound pressure of vehicle occupants and improves the conduit usage experience.

Reference 17017 shows an optional curb to the side of the interior of the roadway segment. The curb can help to block vehicles from scraping on the walls in case of loss of control. Optionally, a curb can be wide enough for workers to walk on in case of performing work while the roadway conduit is operational.

Reference 1708 shows optional holes for workers during assembly. Equipment cables can be inserted into the holes and pulled upon to tilt the segment such as can be required during a stretch where the roadway conduit is arriving at a turn and where the segments need to tilt sideways to transition from flat and level to tilted to provide a banked turn for the high speed vehicles. Reference 1709 shows a pair of rails for use by railway conduit vehicles and also shows that the roadway surface and tops of the rails have the same elevation.

In some aspects, roadway conduit sections (e.g., conduits 20) may be formed from pre-cast concrete structures. In some aspects, such pre-cast structures may be pre-stressed using pre-cast techniques. Roadway conduit sections, for example, may be built in 600 foot long runs by placing a number of steel twisted wire tendons, pre-tensioning (stretching) the tendons, pouring concrete into a mold with separators (e.g., to produce 40 foot long roadway slabs are formed within a 600 foot long mold where the tendons run the entire 600 feet), allowing the concrete to set (e.g., overnight), and then cutting the individual slabs by means of block outs that create short sections every 40 feet where the concrete does not flow and the tendons can be accessed.

In such a process, 40 foot long slabs are created where, after cutting the steel tendons, it tries to relax, or shrink in length. But the concrete is now bonded around and encapsulating the tendons so that they cannot reduce in length. The attempted strain reduction in the steel imposes compression stress on the concrete. Concrete is strong in compression and weak in tension. The compression stress maintains concrete in a desired structural condition, i.e., compression. By imposing a compression that is large enough, even a beam that is stressed by a load that would normally put the concrete into tension along the bottom fibers of the beam can remain in compression by means of imposing initially a compression stress that is larger than the expected working tensile stress.

In this manner, under expected operational conditions, concrete components can be fabricated that never (or very rarely) go into tension. Such concrete components are then able to last an unusually long period of time without suffering cracking and degradation.

In some aspects, constructing a roadway conduit segment (of a conduit 20) may include building conduit segments of, e.g., 8 feet in length. In some aspects, an example geometry of a precast roadway conduit segment is a hollow rectangular solid made of concrete with steel reinforcement within. A pre-stressed design may be used for the top and bottom of the segment, as well as, in some aspects, sidewall portions of the segment.

To provide pre-stressed steel within the conduit top and bottom portions of the segments, the segments can be cast with the four walls: Top, bottom, and two sidewalls, may be oriented such that the "length" (e.g., a direction parallel to traveling vehicles) is arranged to be along a vertical axis during casting.

In some aspects, a roadway conduit comprises segments that are 12 feet wide by 14 feet tall so that cars, trucks, trailers, railcars, and other vehicles, may traverse within the conduit. Each segment might be 8 feet long and coupled to form a long conduit that might be hundreds of miles long. For casting, the individual segments could be placed such that the 8 foot length is vertical, and the 12 and 14 foot sides and top and bottom are measured along horizontal directions.

In some aspects, the top and bottom portions of the segments are cast with pre-stressed techniques, as they will support the overburden loading from above, and vehicular traffic on the bottom. In some aspects, the sidewalls (14 feet tall in this example), will support vertical loading and typically be in compression so that rebar (rather than pre-stressed tendons) can be used.

By arranging a line of segments 600 feet long, where the bottoms and tops of the segments are parallel to the 600 foot long casting line, pre-stressed cables (e.g., steel tendons) may be used to form the pre-cast segments. To realize this geometry, the cables penetrate into and through the casting molds for each individual segment. Rather than running along a horizontal casting bed, the tendons may be grouped into a vertical arrangement down each side of the molds and extend through each of the molds to provide pre-stressed tendons along the top and bottom of the eventual roadway conduit segment.

To realize this, first, the outer shell of individual conduit segments may be installed on casting bases. Next, tendons are run down the length of a mold, e.g., a 600 feet length. There may be, e.g., 20 tendons in the top portion of a segment and another 20 tendons in the bottom portion of the segment. These two groups of tendons are each arranged such that the loading on the eventual structure is resisted so that the concrete does not experience tension. Of the 20 tendons, there may be more along a top or bottom region of an individual side of the segment. For example, there may be more tendons, e.g., 16 out of 20, running along the "bottom" of the top portion of a roadway conduit segment when placed for use so that those tendons are positioned along a location that experiences a maximum tensile stress (e.g., due to overburden loading of the top portion of the conduit segment).

The bottom of a roadway conduit segment may have more complicated loading with support from below (e.g., from a terranean surface or floor of a tunnel), thereby placing the top of the bottom portion of the roadway conduit segment into tension, while vehicular loading may place the bottom of the bottom portion of the roadway conduit segment into tension. In some aspects, 10 tendons may be placed to the top and ten tendons may be placed to the bottom of the bottom portion of the roadway conduit segment. In some aspects, loading can be pre-determined and the tendon number, size, and placement is a design criteria and a variable in the design of any roadway conduit segment.

In further aspects, rebar reinforcement can be installed in one or more sidewalls of a roadway conduit segment before or after the threading of the tendons through casting mold outer walls. These may be orthogonal to the 600 foot long casting mold and may also be in a vertical orientation so that concrete can be cast down into the segment after all of the steel is placed.

In implementations of the pre-casting of the roadway conduit segment that includes rebar, the rebar may be installed first and then the tendons can be threaded, which will be pre-stressed through the mold outer walls (top, bottom, sides) and also through the rebar cages for the two sidewalls. Doing this, preferably, before inserting the inner mold walls leaves easy access to placing all of the steel components. Alternatively, pre-stressed tendons may be used for the orthogonal direction reinforcement as well; then the longitudinal and orthogonal tendons can be placed simultaneously, being passed through holes in the mold walls.

As described, it can in some instances be an advantage to use pre-stressed methods for the sidewall portions of the roadway conduit segments. These may be oriented orthogonal to the 600 foot casting line. This can be an advantage to resist side loading of the walls from expected subterranean formation conditions, and it can alternately be an advantage because pre-stressed methods can be faster to fabricate than a rebar cage.

In some aspects, a bulkhead may be installed to hold orthogonal steel tendons that pass through the roadway conduit segment molds. This time, each tendon may only run through a single mold, as the direction is orthogonal to the 600 foot production line. Each set of tendons therefore may require a unique pair of opposing bulkheads. Each tendon may again be tensioned. In the example of a 600 foot line of 40 roadway conduit segments, with 20 tendons through the top portions and another 20 tendons trough the bottom portions of the conduit segment, there are, therefore, 40 tendons that may be resisted with only two bulkheads.

To the extent that pre-stressed tendons are installed in place of rebar for the segment sidewalls, then each of the 40 conduit segments may require a total of two pairs or four bulkheads to support the tendons. For a 600 foot long production line with 40 roadway conduit segments per production line, there may be 40 segments times 4 bulkheads per segment for a total of 160 bulkheads.

In some aspects, because many tendon restraining devices allow an undesirable excess of relaxation, active loading control of the individual tendons may be used. For example, one hydraulic ram tensioner per tendon may be used. With 20 tendons per sidewall, and 40 segments each with two walls, 1,600 hydraulic rams may be used to tension the run as each hydraulic ram would need to remain in place and pressurized until the concrete has set. Then, the hydraulics could be released.

Optionally, each tendon could be fitted with a tensioning bolt that is torqued to a pre-determined level so that the tendon has the desired pre tension prior to casting. An advantage of using pre-stressed tendons in the roadway conduit segment walls is that threading tendons through the molds is faster than building the rebar cages. However, as the walls are primarily in compression, the cost for the labor to build the cages should be balanced with the cost to build and install the orthogonal bulkheads and associated equipment.

After all of the steel in placed into the molds, the inner mold walls can be installed. These may clamp to the mold base and may not touch the steel reinforcement members. Though there may be, especially in the case of rebar cages for the sidewalls, plastic separators to keep the rebar centered within the casting forms. Pre-stressed tendons, when used for the sidewalls, will be under tension and may not need separators to maintain their positions within the casting molds.

Following placement of the inner walls, pre-stressed tendons may be tensioned to the appropriate stress. After tensioning pre-stressed cables, concrete is poured into the molds and allowed to cure until it is strong enough to withstand the compression stress that will be applied when the pre-stress on the tendons is released. When appropriate, all of the stress on tendons is released such that stresses applied to the roadway conduit segments are minimized. The outer and inner molds are now removed and the individual segments can be lifted and transported for final curing.

After curing, the roadway conduit segments may be transported to the location of the roadway conduit system to be installed. After setting the individual segments, optionally, post tensioning of tendons installed through cast-in-place tubes can be performed. Alternately, dowel pins can locate adjacent segments into one another. Either way, once the segments are coupled and placed, the series of segments becomes a roadway conduit system.

In some implementations, the segments may be post tensioned into one another. This may enable the segment to resist ground motions that take place after placement. Settling will not cause the individual segments to move as would be the case if they were independent. The overall structure, when post tensioned, has a length that is distributively supported by a terranean surface or tunnel floor. Gaps in that support may not cause an individual segment to subside or rise and instead, may apply a loading to the overall length of roadway conduit.

In some aspects, the roadway conduit can be made water tight and will thus act like a concrete boat and float on a swampy terrain. The density and displacement being able to be designed so that the roadway conduit floats at any desired submersion ratio. For soil applications, this design avoids the problem associated with a typical concrete freeway where individual slabs tilt as one end subsides and the other lefts due to repeated pounding from traffic above.

In some aspects, the use of below ground tunnels can cost $100 M to $1 B per mile and makes most traffic corridors too expensive to construct. The use of typical precast segments, such as are used for box culvert construction, could conceivably be used. But again, the cost may be prohibitive. A typical box culvert section costs $10,000 whereas there may be just $1,000 worth of concrete and materials in the section. This means fabrication charges are of order $9,000, or the majority of the cost of the culvert section.

In some aspects, roadway conduit systems according to the present disclosure may be fabricated more quickly with conduit segments that employ precast methods where an entire line of molds is cast together. For example, an approximately 600 foot long production line of 40 molds could be built. By placing 40 or some other number of molds in a line, it becomes possible to utilize pre-stressed tendons within one or both sides of the segments that are parallel to the length of the 40 mold line.

Within the structure of a conduit segment, whether buried or not, the walls of the segment are generally in compression whereas both the top and bottom sides place the concrete into tension. Concrete may not be adequately strong in tension. For the top slab, the bottom of the top surface may be in tension due to the weight of the top slab and the weight of any overburden or traffic that is added above. For the bottom slab, the side walls push down onto the bottom slab and the entire bottom slab then provides support. In a sense, a terranean surface provides a normal force that supports the bottom slab. This places the top of the bottom slab into tension.

Therefore, in some aspects, pre-stressed tendons may be cast into the conduit segments top and bottom slabs. These two slabs are opposite one another allowing a long line of molds to have those two faces parallel to the line of molds. That enables use of pre-stressing tendons if the molds are appropriately fabricated. For example, by inserting holes through the outer mold walls for tendons to pass through, it is possible to pull tendons down the entire length of the 600 foot mold line. Tendons pass through each of the 40 molds outer mold walls and run such that they become cast into the top and bottom slabs of the conduit segments in the mold line. At the appropriate location within the top and bottom slabs, the pre-stressing of the tendons applies a compression load to the concrete after the concrete has been poured and cured to a sufficient strength to withstand the compression stress, typically overnight.

The inner mold can then be inserted inside of the outer mold so as to form the conduit segment volume to be cast. Rebar can be used to reinforce the side walls as they will be in compression for the most part (side loading of earth can create some bending and thus tension, but this is small compared to the tensile loading on the top and bottom slabs).

The tendons can in this way, reach from a bulkhead at one end of a casting line, then pass through each of, e.g., 40 molds, and extend to another bulkhead at the other end of the casting line. With the outer mold in place and connected to a casting base, the tendons pulled through the line of molds from one bulkhead to another, and with the inner molds inserted and connected to the base and as well, rebar added for the reinforcement of the side walls, it then becomes safe to tension the pre-stressing tendons.

By tensioning 600 feet of tendon, the steel tendons can be stretched using typical pre-stressing methods. If a tendon breaks, it will be constrained by all of the holes through individual molds, reducing the danger of tendons explosively flying across the mold line. It can be an advantage to insert bushings into the holes the tendons pass through to facilitate their sliding during the tensioning process. The primary way tendons will break is if they bind on a sharp edge of a hole in an outer mold wall, or if the tendon becomes nicked by a sharp edge of a hole. It is therefore preferred to use soft bushings such as plastic or bronze to mitigate this potential problem.

After tensioning of the tendons, the concrete can be cast into the mold and the top surface finished to the desired geometry. The next day, typically, the concrete has set to a strength sufficient to cut the tendons. The molds can then be torn down and the cast segments removed to a location where curing can take place. In order to remove the outer molds after casting, the tendons can be cut close to the molds and then the outer molds can be provided with a split to allow the outer molds to be moved horizontally, beyond and off of the cut tendons, and then lifted away to be used to cast a next conduit segment. To facility removal, it is preferable to add pistons to the side walls to break the mold away from the concrete after casting. This may be true for the outer molds and also for the inner molds.

In some aspects, critical sides of a rectangular conduit segment to dispose with pre-stressed tendons may be the top and bottom of the segment as placed for use. However, depending on soil type, soil conditions, and upon conduit loading from within and without, it can be the case that it is preferable to install pre-stressed tendons in the vertical side walls (as placed for use). It is also possible to use pre-stressed reinforcement within all four sides of a typical rectangular conduit segment, albeit more complicated to realize as stretching the short lengths orthogonal to the primary long run may require special treatment of the tendon stressing. It is, however, possible to build segments with all four sides pre stressed, and in some situations, may be preferable.

In some aspects, inner molds may be fabricated in several pieces. By unbolting the several pieces and removing them one by one, it is possible to get the inner mold out of the inner space. Outer molds may be easier to remove because they can just be expanded outward, but inner molds cannot expand into themselves. In some aspects, an inner mold may be collapsed into a "star" geometry with the mid regions of each mold face collapsing in toward the center of the mold segment, slightly. It is sufficient to break the mold contact with the concrete via use of pistons. This can move the middle of the inner mold sides, toward the center of the mold by one or a few inches. This has the effect of also moving the corners of that inner mold slightly inward toward the center as well. Doing this frees the entire inner mold from the just-cast concrete. With the mold separated from the concrete, it can then be lifted up and out of the newly cast conduit segment.

For both the outer mold, which expands to get off of the cut tendons, and the inner mold that collapses inward, the entire structures can be lifted and moved laterally to a second mold base, and re assembled. By providing a casting facility with a pair of mold bases and a single outer mold and a single inner mold for each casting position, the outer and inner molds can be shuttled back and forth between two mold bases and an entire line of 40 conduit segments can be cast each day. As each mile of roadway conduit may use about 660 segments of 8 feet each, a single line of this design would be capable of producing about 2 miles worth of conduit segments per month per fabrication line. For a longer project, multiple casting lines can be built.

Figure 18:
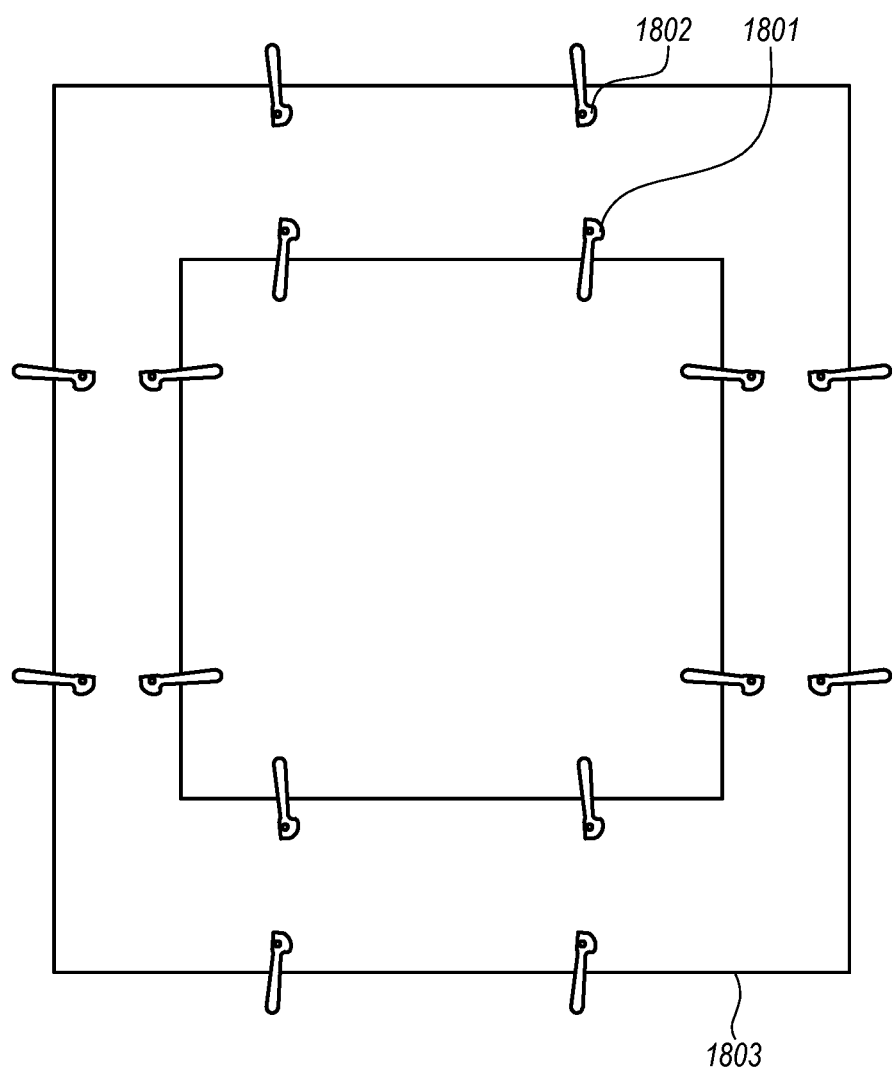
FIG. 18 shows an example implementation for a conduit segment mold base.
Figure 19:
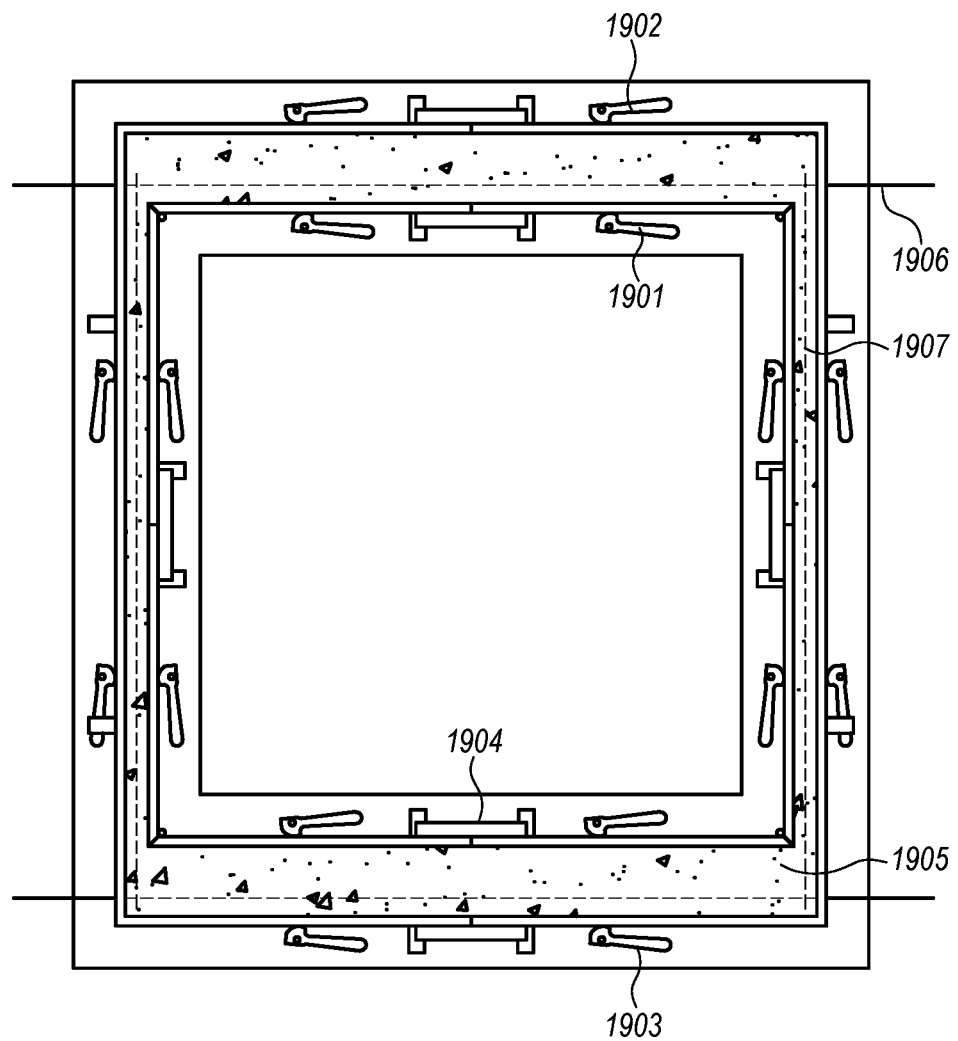
FIG. 19 shows an example implementation of a mold base including inside and outside molds and concrete cast therebetween.

FIG. 18 shows a casting base 1803, and clamps (1801 and 1802) to connect, position, and hold down the casting inner and outer molds (not shown). FIG. 19 shows a plan view of the complete mold including inner, outer, and mold base as well as the concrete cast inside the mold walls. Clamps (1901, 1902) lock the inner and outer molds to the mold base. Optional pre-stressed tendons 1906 and rebar (1907), as well as the concrete filling the mold (1905) are shown. To facilitate removal of the interior mold, the inside mold is preferably fitted with clamps (1904) to enable the inner side walls to collapse inward and break away from the concrete. Because the side walls have a split in the center, they may require braces and support for those braces is shown on this drawing as (1904).

Figure 20:
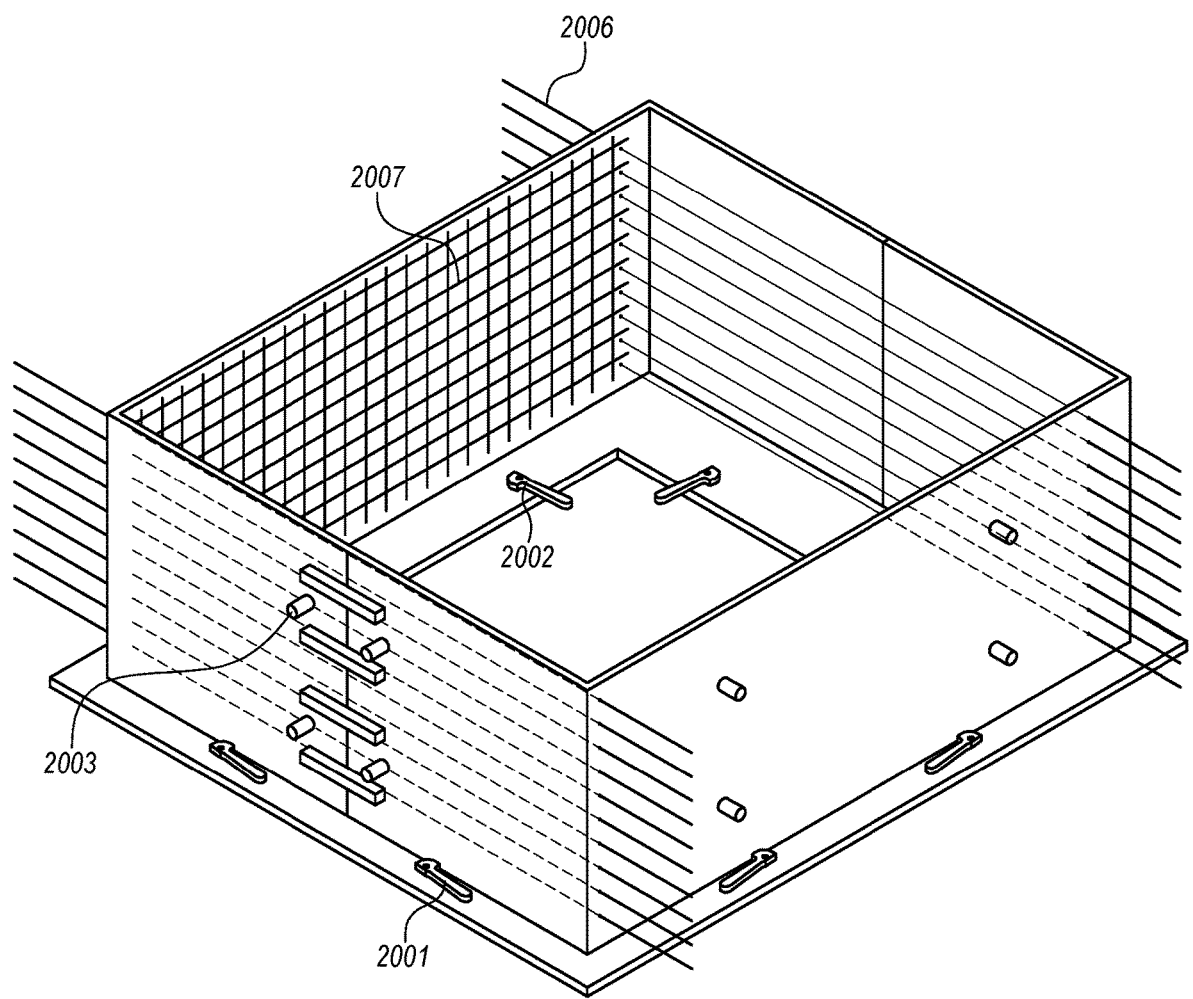
FIG. 20 shows the mold base of FIG. 19 with outside mold and rebar and pre-stressed tendons.

FIG. 20 shows how the tendons (2006), which are pre-stressed at some point prior to casting the concrete, are passed through the outer mold walls. The tendons pass through holes in the outer mold walls, but are otherwise free to displace longitudinally during tensioning. Again the split in the outer mold walls is clamped (2008) and to facilitate removal, pistons (2003) are optionally included to help break the steel walls free of the concrete after pouring. From this view it is clear how the rebar (2007) and tendons (2006) pass adjacent to and inside of, the outer mold. With the outer mold in place and clamped, rebar and optional tendons for pre stressing in place, the inner mold can be placed.

Figure 21:
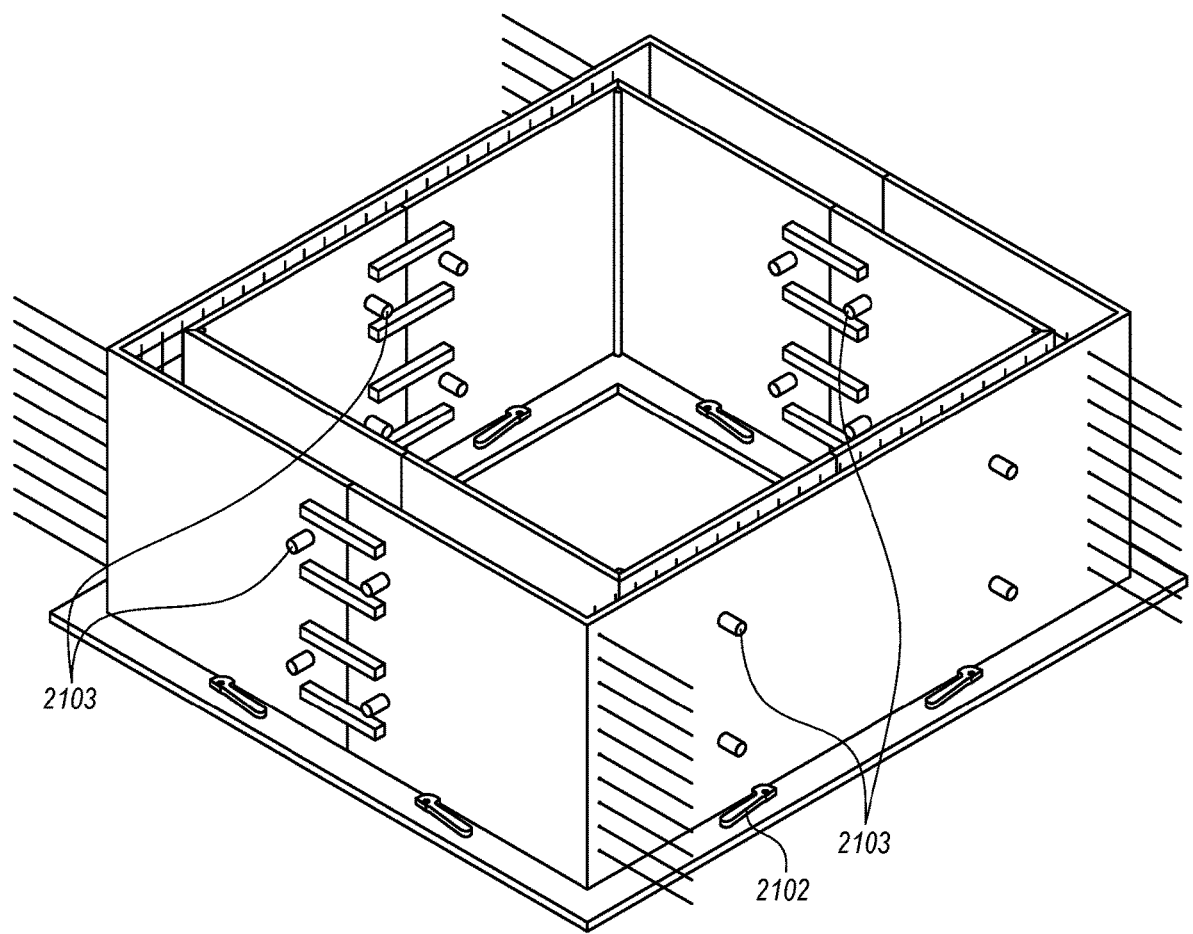
FIG. 21 shows the mold base of FIG. 19 with outside mold and rebar and pre-stressed tendons and also including an interior mold.
Figure 22:
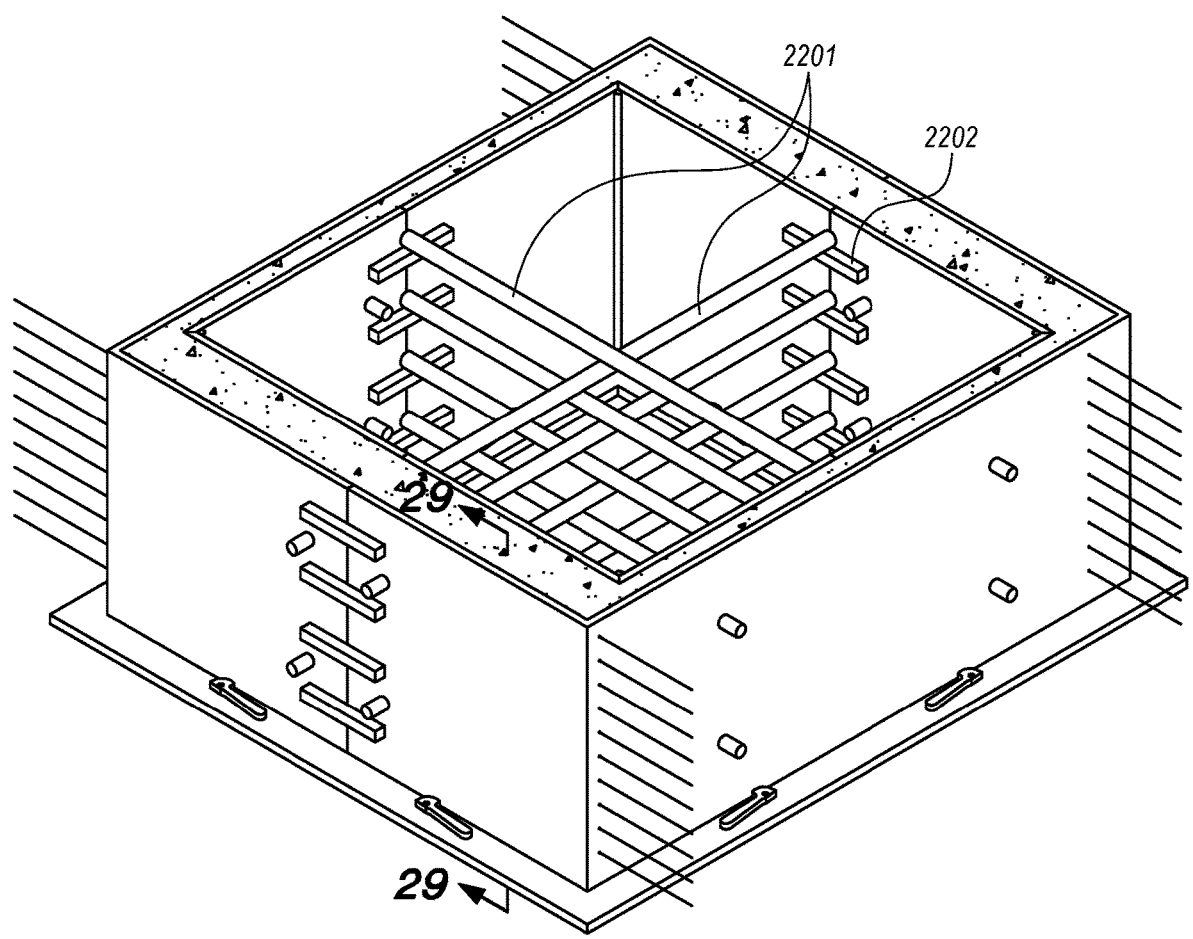
FIG. 22 shows the mold base of FIG. 19 with outside mold and rebar and pre-stressed tendons with the further addition of cross braces for casting.
Figure 29:
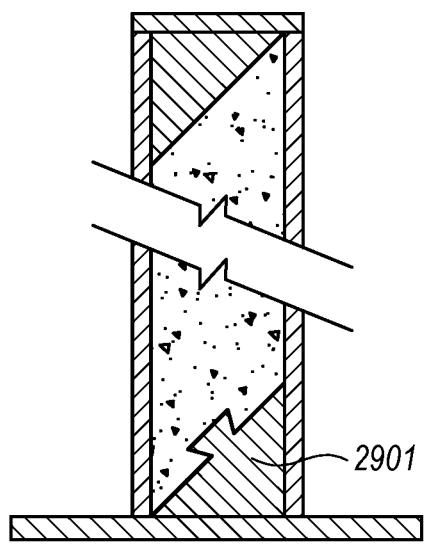
FIG. 29 shows an example geometry of mating segment surfaces.

FIG. 21 shows the inner mold having been placed including pistons (2103) to break the mold planes free of the concrete after casting. FIG. 22 shows the addition of cross braces installed to prevent the inner mold walls from caving inward due to the pressure. Optionally, not shown, one can provide clamps that reach across the top of the molds to prevent the inner and or outer molds from bowing under the concrete pressure. While the top of the concrete is here shown to be a perpendicular surface, FIG. 29 shows an optional angle, one of several geometries that can be used so that adjacent concrete segments plug into one another during assembly. Ideally, assembly will be accompanied by the compression of a water gasket so as to block water intrusion into the roadway conduit after installation.

Figure 23:
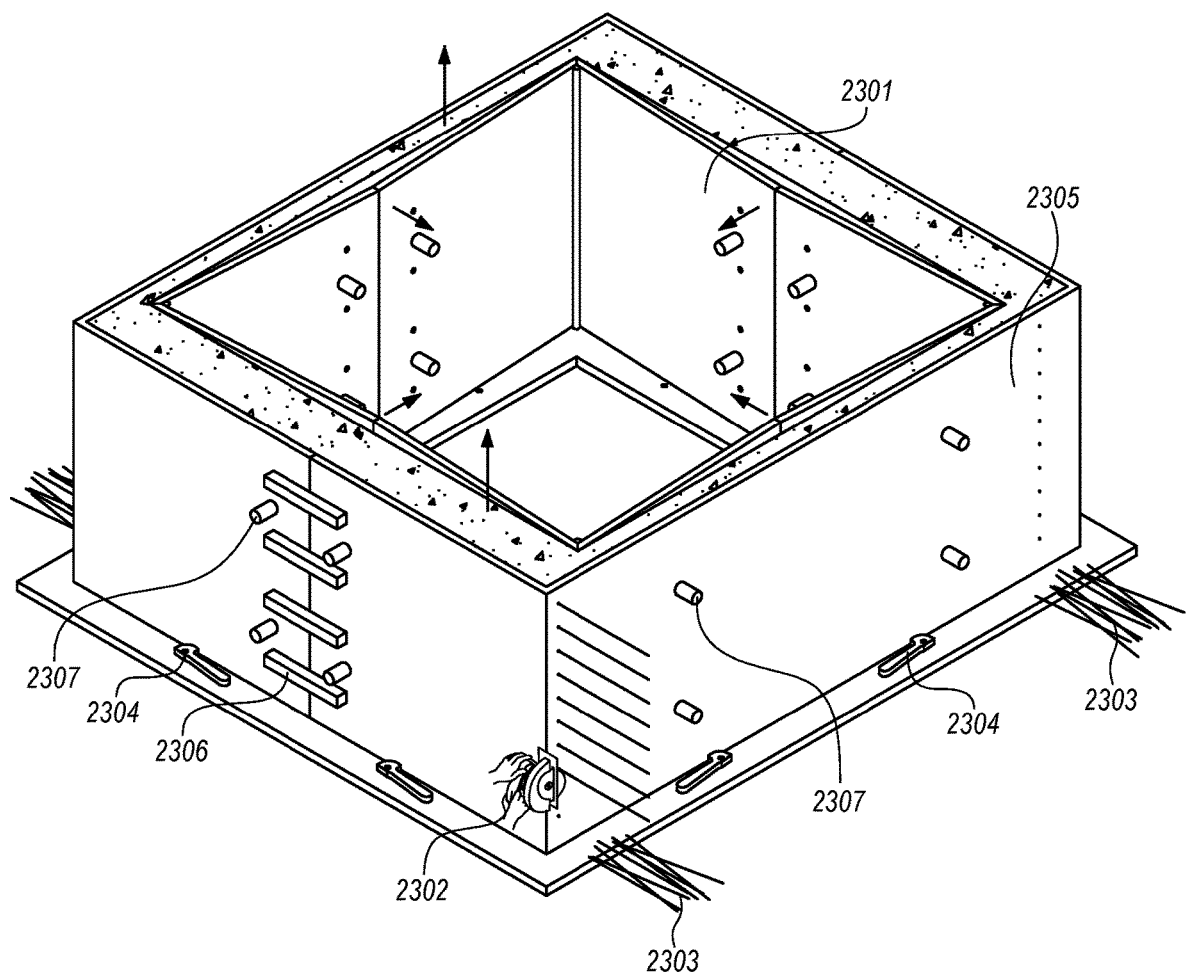
FIG. 23 shows the post casting process with inner mold broken free and tendons cut.

FIG. 23 shows the disassembly method including how the inner braces have been removed and the inner mold has been broken free of the concrete and is deflected inward slightly to separate the inner mold from the inside surface of the concrete. The corners, during this process, slightly move toward the interior of the mold allowing a crane to lift the entire inner mold as a single unit. It will slide up and out of the interior of the precast concrete segment. Also shown is a saw (2302) and cut pre-stressed tendons (2303). When the section clamps (2306) are loosened, the two clam shell halves of the outer mold walls can be split.

In this example and to clarify how the deflection inwardly breaks the inner mold free from the cast and typically overnight cured concrete, the pistons (2307) on the inside of the mold are extended. This pushes the mid region walls of the inner mold away from the concrete slightly. A vertical line is shown at the mid points of the inner mold but it should be understood that this does not need to actually be a break of the inner mold wall. Rather, the line could represent a thinner wall material or the same wall material but without continuous horizontal braces so that the center is enabled to deflect and slightly bend as shown.

In some aspects, the ends of the side walls at the corners of the rectangular inner mold as shown in the diagram also deflect slightly toward one another. With the four sides (in this geometric example) deflected inward, the four corners are also deflected toward one another such that a line that is measured straight from one corner to another will be shorter when the pistons are extended than it will be when the pistons are retracted and the concrete is cast. Thus, by extending the pistons in the middle of the inner molds, we also break the inner mold free from the concrete. This breaking of the mold free around the entire surface of the inside enables the inner mold to be lifted by a crane, vertically, out of the cast segment (as one example).

Figure 24:
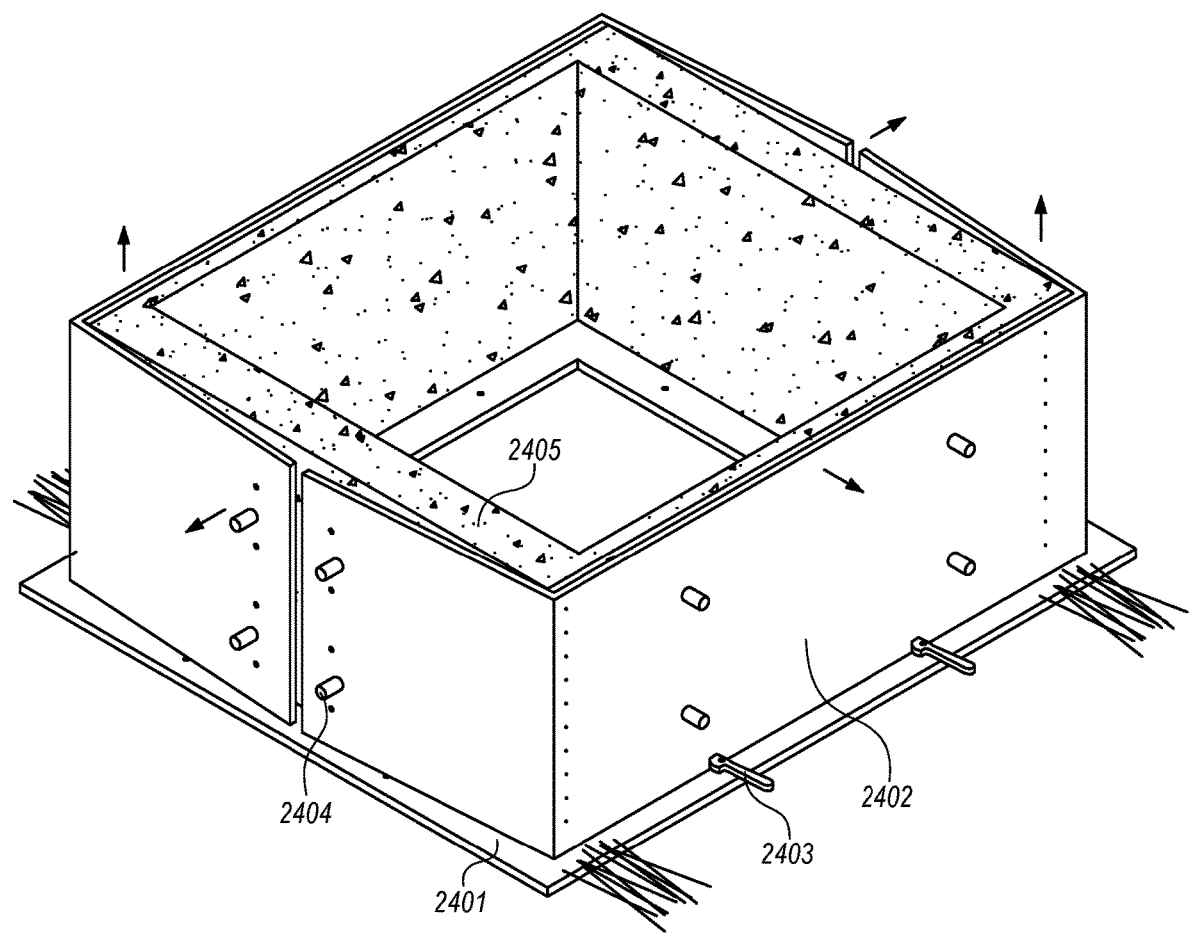
FIG. 24 shows the exterior mold being broken open for removal.

FIG. 24 shows the outer mold having been split as the pistons are actuated. By splitting the two mold halves, the mold wall will move off of the cut ends, or short remaining nubs, of the pre-stressed tendons. When this is effected, the entire outer mold can then be lifted off of the cast segment. The arrows show the directions the outer mold must move to be fully free of the cast segment. To break the outer mold free typically, the side pistons will extend first breaking the sides from the cast segment. Then, the pistons on the end of the "U" shape are extended to push the U away from the cast segment and to get the mold side further from the concrete face than is the remaining length of the pre-stressed tendon stubs after having been cut off. At that point, the entire U is free to lift so that the entire outer mold (e.g., both U's) can be lifted simultaneously and moved over to the adjacent casting base to repeat the casting process.

Figure 25:
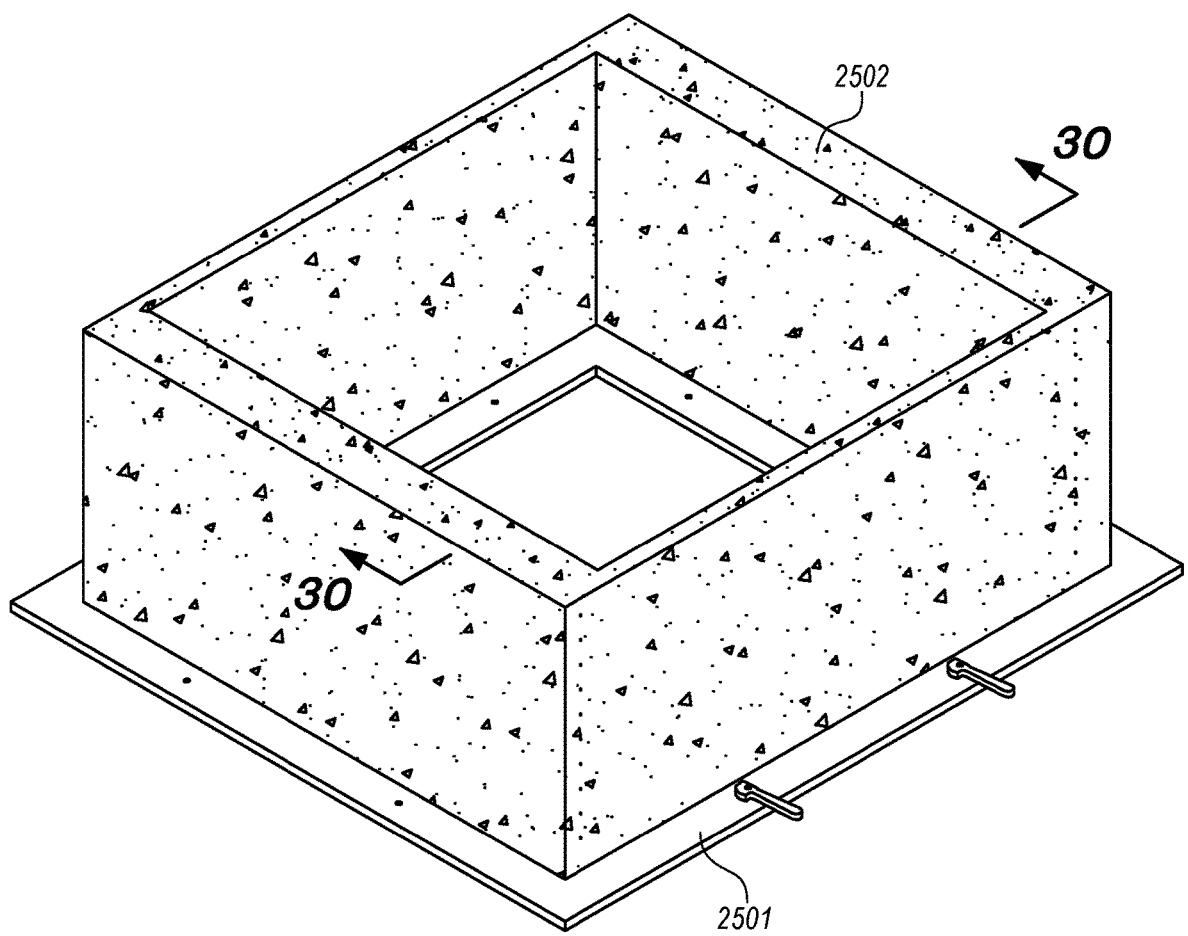
FIG. 25 shows the cast segment prior to removal from the mold base.
Figure 26:
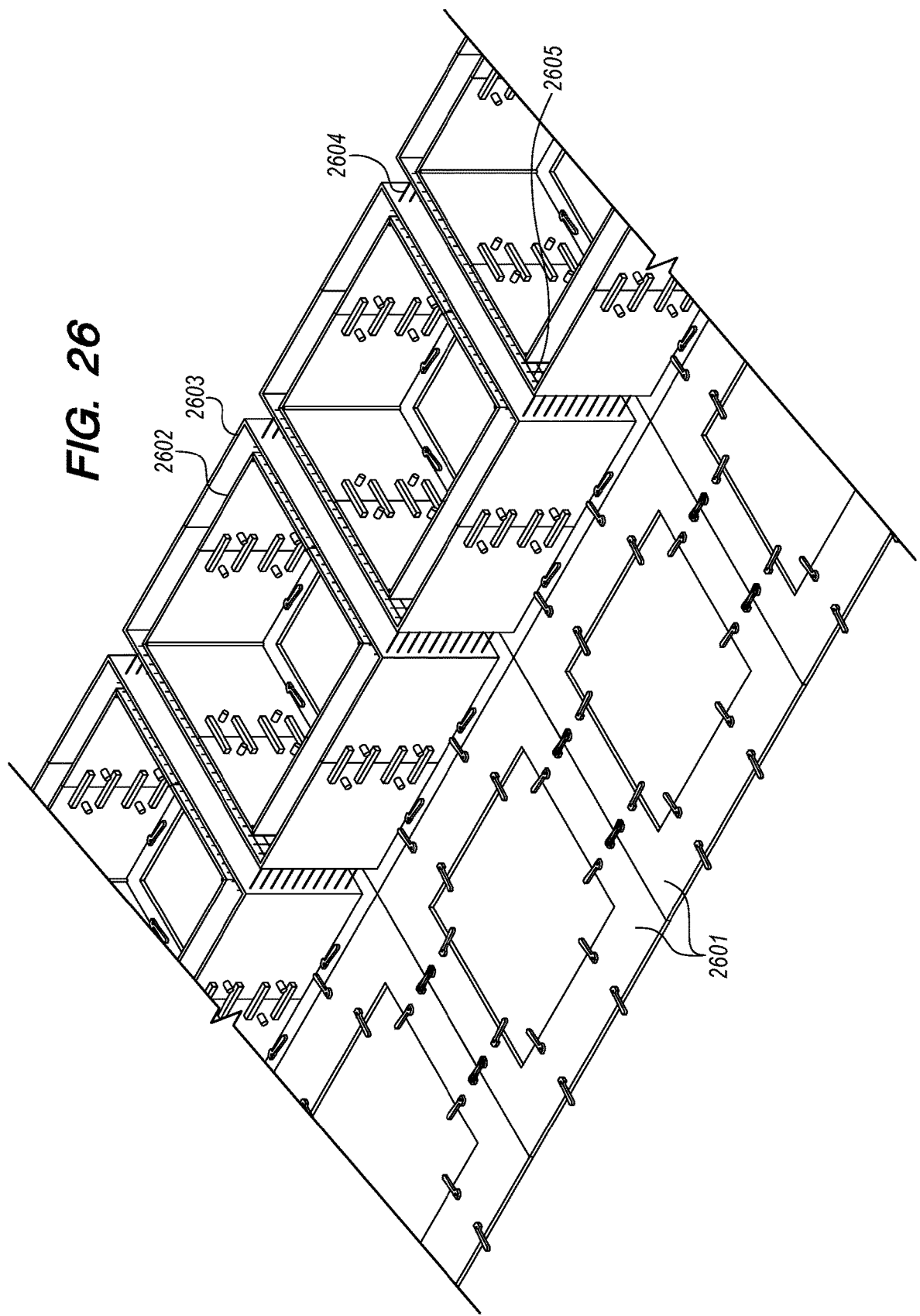
FIG. 26 shows a line of casting molds ready to pour adjacent to a second line of casting bases.

FIG. 25 shows the just-cast concrete segment (2502) still resting on the mold base (2501). Nub ends of the cut tendons (2503) can be cut flush after the outer mold is removed. FIG. 26 shows a typical casting line with a pair of bases (2601) and a single inner (2602) and a single outer (2603) molds. After removing the molds from the just cast base, they are moved over and placed onto the adjacent set of mold bases to prepare for the next casting process. The process is repeated with new tendons ((2604) and rebar (2605) installed as before. In some aspects, rebar can be used on all faces of the segments. And while stronger and much more expensive, pre-stressed tendons can also be used on all four faces of the segments. Which reinforcement to use will depend upon the loading calculations and costing parameters of the specific project.

Figure 27:
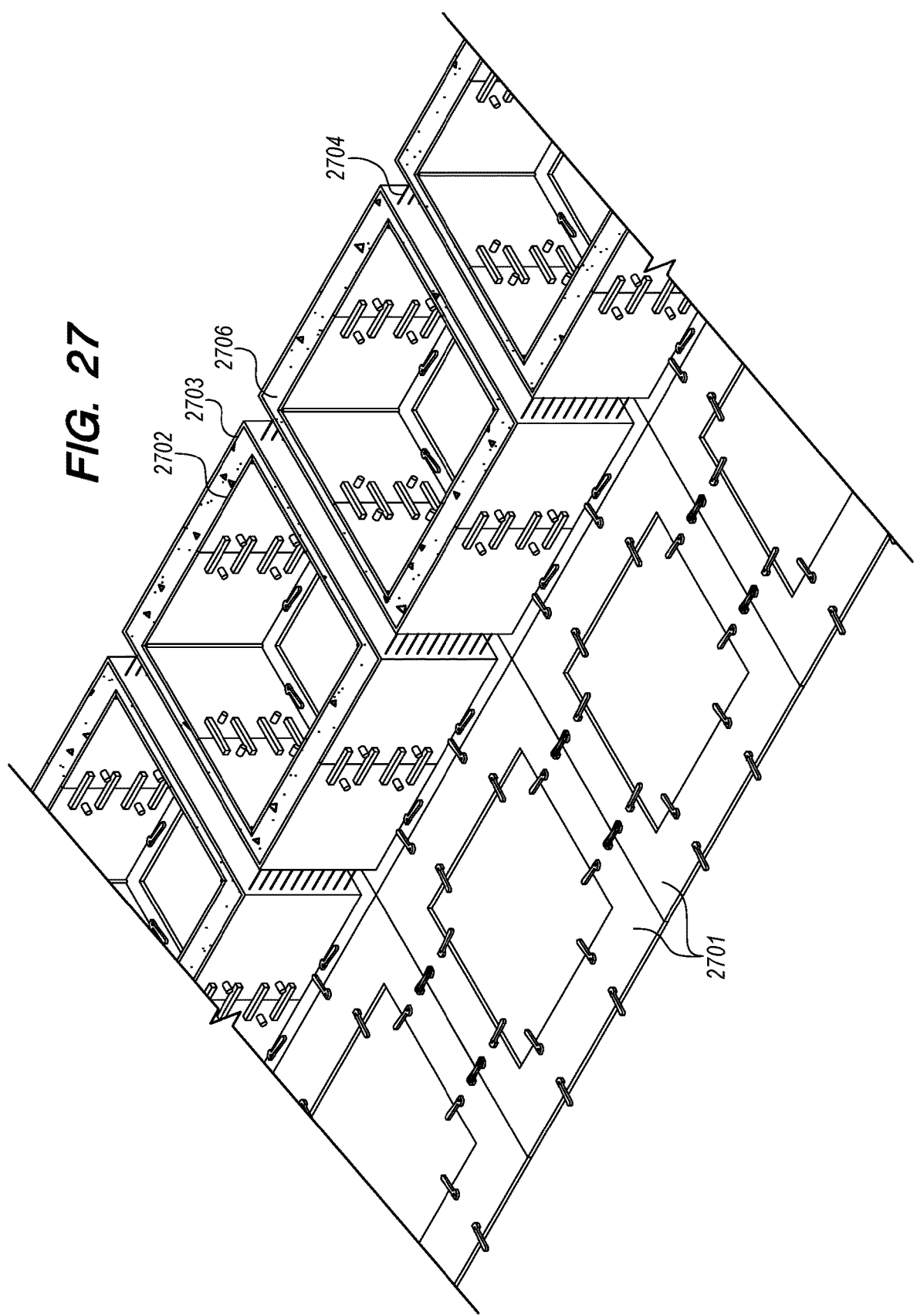
FIG. 27 shows the post-pour condition of the casting molds.
Figure 28:
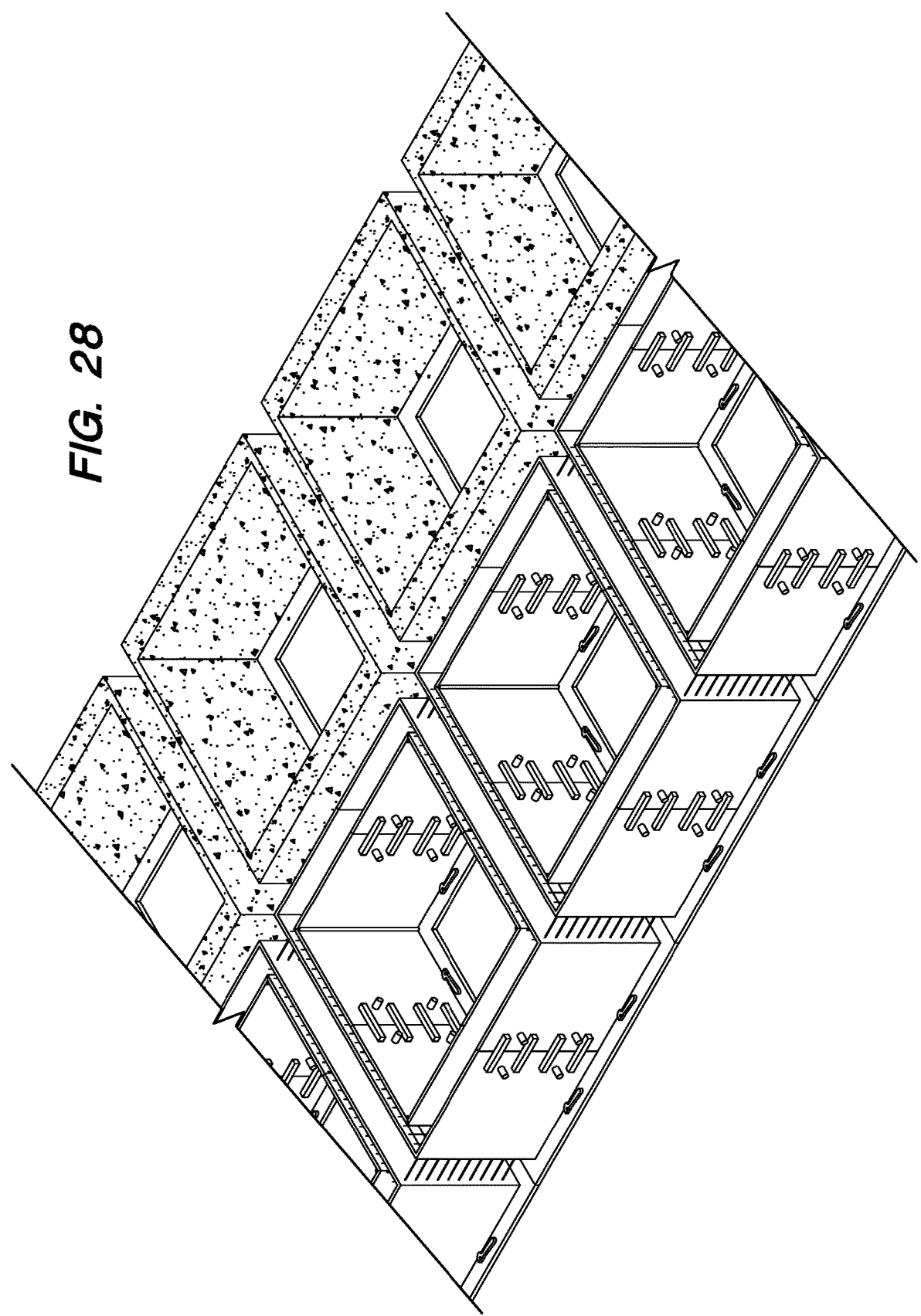
FIG. 28 shows the casting molds having been moved to the adjacent bases and cast segments ready to be removed.

FIG. 27 shows the line of molds after being cast on the second side. The tear down would then move the molds back to the original mold bases (2701), as is shown in FIG. 28. The line of molds is then ready for casting again. Using this method on an approximately 600 foot production line pair, about 40 segments of about 14 feet×12 feet×8 feet with about a 1 foot wall thickness can be cast per day. This method can reduce the cost to manufacture a segment, sometimes called a box culvert, by as much as ten-fold. This ten-fold cost reduction may result from the elimination of labor needed to cast the components as a result of using a mold system that enables casting large numbers of parts in rapid succession.

Figure 30:
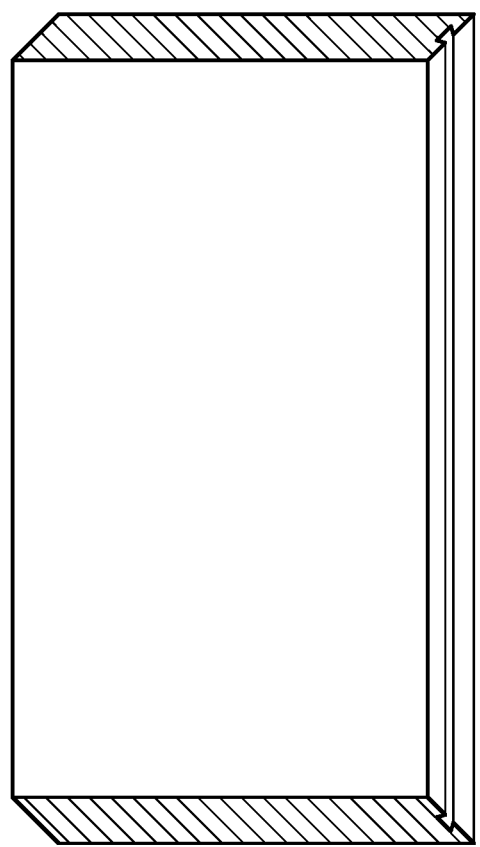
FIG. 30 shows one possible section of a conduit including a groove for a rubber or compliant and compressible gasket.

FIG. 30 shows one possible section of a conduit including a groove for a rubber or compliant and compressible gasket. The groove (3001) can be dovetailed to accept a rubber gasket that is mechanically locked in place. It can also be a simple channel and some glue or cement can be used to secure the gasket in place until it can be compressed between adjacent segments, preferably using post tensioning methods. In another embodiment, the gasket can be inserted into a groove provided in the mold base. In this way, the gasket can extend up into the space where concrete will be cast and be provided with geometry to enable the concrete to captivate the gasket once hardened. This can then capture a gasket into the concrete and also provide for the gasket to extend outwardly from the concrete face so as to facilitate a water barrier once the segment is compressed into an adjacent segment via post tensioning.

FIG. 29 shows one geometry for the mating segment surfaces. This view is a vertical elevation view of the concrete as cast in the mold showing one geometry for a top and a bottom of the cast segment. The top cross section will be on one side of a segment, and the bottom will be on the other side of a segment, so that when two adjacent segments plug into one another, the top of one plugs into the bottom of the next. By providing one side of a segment with a groove into which a compliant gasket can be fixed, the two adjacent segments, when compressed into one another, become water tight.

Typically, industry only needs to cast a few segments for any give road project where a creek passes beneath a road. But where a roadway conduit is to be constructed, there is a need for tens to thousands of miles worth of concrete segments. The number of segments is vastly larger and conventional methods normally used may be inadequate from a cost perspective.

In one configuration of a casting facility containing an approximately 600 foot casting line with approximately 40 molds in a line, the facility can be equipped with 40 pairs of casting bases and 40 inner and 40 outer molds as well as if desired, 40 top of the segment mold caps that create a desired segment end geometry. To facilitate production the facility can be equipped with a gantry crane. While a gantry crane is not shown in the drawings, FIGS. 26-28 show how the overhead gantry crane could be used to move the heavy inner and outer molds from a first mold base where a segment has been cast, over to a second segment mold base. The second segment mold base can then be cast and the movement reversed. The gantry crane runs at least over a pair of molds as shown and preferably also enables movement of cast segments to transportation vehicles as described below, the vehicles travelling a roadway (not shown) alongside the pair of molds.

In this way, a gantry crane can lift the inner mold 2702 from one position and move it and help set it at the adjacent mold base shown in FIG. 28. FIG. 27 shows the molds 2702 and 2703 as well as the cast segment 2706 including a few of the pre-stressed tendons 2704 exposed between the outer molds 2703. The same can be accomplished for the outer mold assembly and if used, a top cap. This enables rapid movement of the inner and outer molds from one casting base as shown in FIG. 27 to the adjacent base as shown in FIG. 28.

The gantry crane could optionally lift and carry the cast segment, after initial curing, to the end of the building where a suitable fork lift, truck, or other transport vehicle could move the cast segment away and place it for curing. However preferably, the building could be constructed so that it is wide enough to fit three molds side by side. By placing two mold bases side by side, and leaving the third adjacent space empty, a fork lift or suitable transport vehicle can drive into the facility adjacent to the segment pair and a segment that has cured overnight and is now ready to be moved out of the casting building to a location for curing can be lifted off of the mold base and set onto a transport vehicle to carry the segment out of the building. In this way, the gantry crane can lift and move the inner, outer, and if used top, molds to set them onto the adjacent mold base following casting of a first segment and in preparation to cast a second segment. The repositioned molds are then ready to receive concrete to cast another segment.

Figure 31:
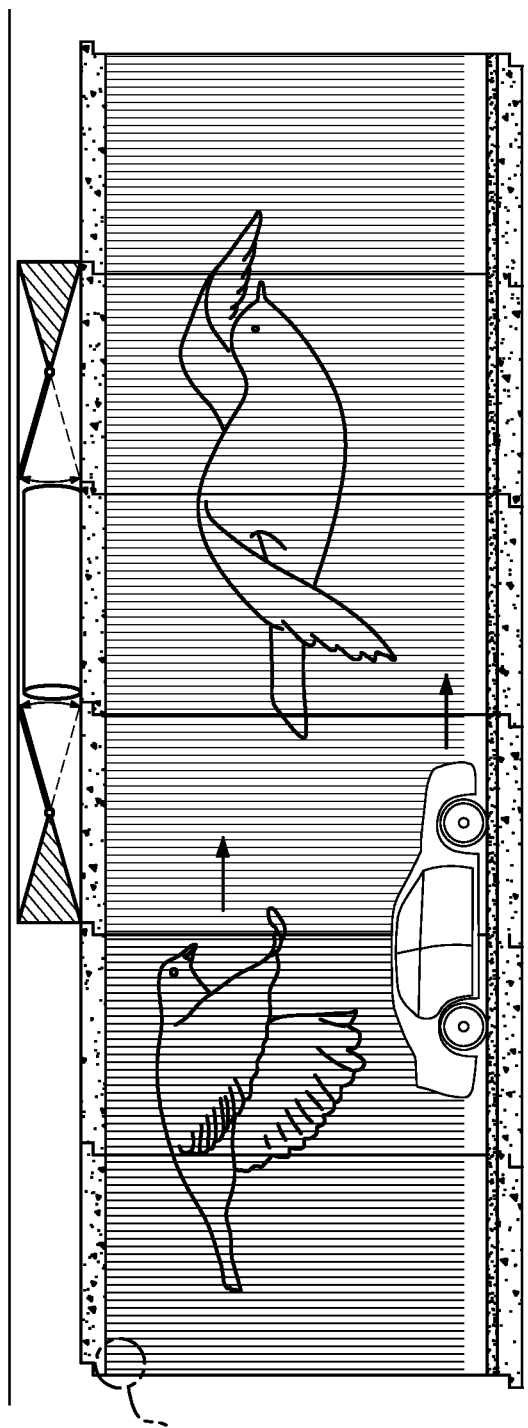
FIG. 31 shows a series of vertical LED arrays.
Figure 31A:
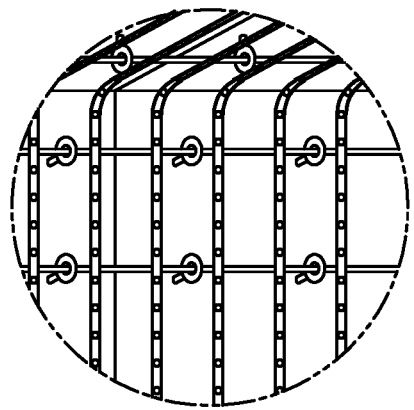
FIG. 31A shows a detail of the LED arrays including one method of supporting LED arrays.

FIG. 31 shows a series of vertical LED arrays. FIG. 31A shows a detail of the LED arrays including one method for supporting them. The LED arrays can be fixed to wire cables attached to the concrete segments using eye hooks, or glued, or any suitable fastening method. A single linear array will have a number of LEDs on a string that run up a wall, across the ceiling, and down the opposite side wall.

Figure 32:
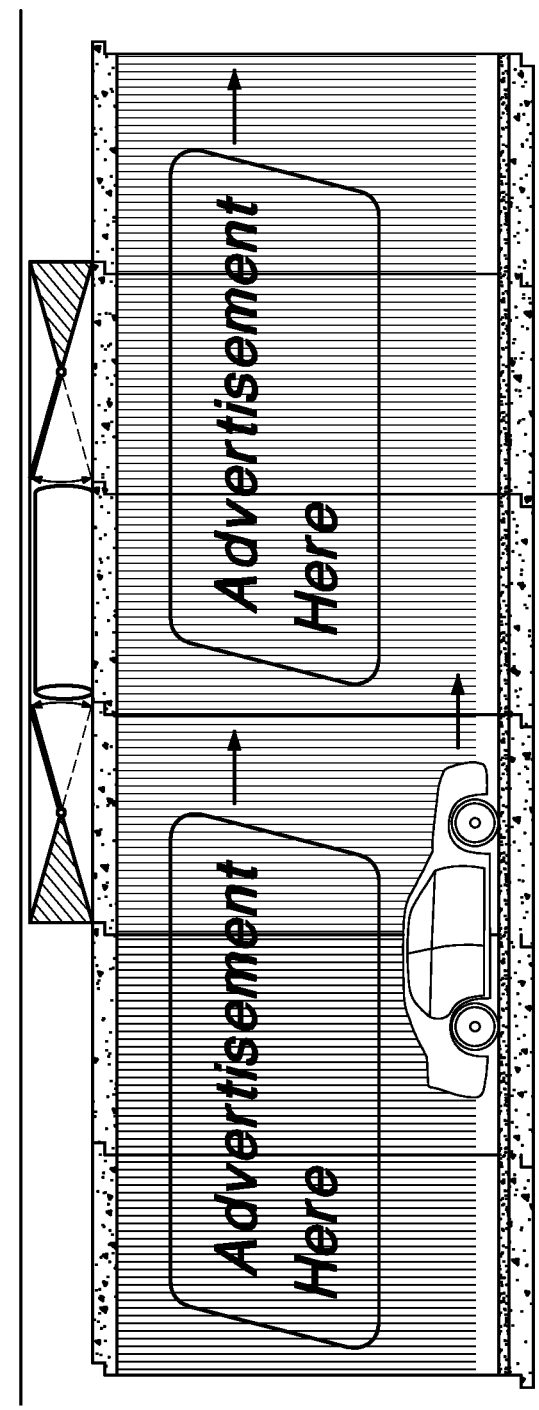
FIG. 32 shows another example LED array.

Alternately, LED panel arrays could be used for a system using a higher density of LED emitters. However the LEDs are configured, the purpose is to create an array of LED emitters that can be turned on and off according to a program in order to display whatever is desired. Similar to a modern television monitor but on a much larger scale, images can be created and observed for pleasure, education or advertising purposes (such as shown in FIG. 32).

On conventional televisions, the observer is always stationary. There do exist some walks where there is a large LED array above pedestrians, but again, the viewers are essentially stationary. The LED system shown in the figures is intended to play for viewers that are moving rapidly in a vehicle. For example, viewers might be moving at 120 mph in some cases.

Conventionally, creating a visual display for viewing by people in a car is today, dangerous and not done. For example, on the Bay Bridge connecting San Francisco and Oakland, Calif., USA, an LED array was created and large scale images of whales swimming down the length of the bridge were created. Viewed from land far from the bridge, the images were beautiful and mesmerizing to watch and pedestrians enjoyed them. Viewed from the bridge, drivers only saw lights turning on and off and could not discern the imagery being communicated to viewers far from the bridge. In this way the display did not pose a danger to drivers on the bridge. Within a roadway conduit, however, the "driver" may be the autonomous control computer pilot, and not the person in the "driver's seat" of the vehicle. For this reason, it is possible for the first time to create for moving vehicles imagery that is entertaining and discernable to the occupants of the vehicle.

Any type of image can be created. In FIG. 31, a bird is shown flying down the length of the tunnel in the same direction as the vehicle is moving. The arrows indicate that the bird is flying at about the same speed as the vehicle. Indeed, the bird could be made to fly faster or slower than the car to give the impression that the car is catching up to and passing a flock of birds, or, that a flock of birds if flying past the car. Because the LEDs of the tunnel array are under computer control, to get an image to move with the car simply means the LEDs actually turned on must be advanced down the array at a rate to create the illusion of motion relative to the vehicle, faster or slower as desired.

Another example of how this can be used would be for the vehicle occupants to be immersed in a virtual reality where the imagery shows starts and/or science fiction inspired craft through which the vehicle is flying. For public transport or private transport, the vehicles can be fitted with a controller like used for game controls or virtual reality controls, and the controls can communicate to the conduit tunnel imagery control system so that people in the vehicle can interact with the imagery. In this way, one can create a science fiction imagery appearing to emanate from the vehicle and shooting toward another craft in the display, down the length of the tunnel. False perspective can be used to make objects appear to be at any location in space provided the pixel density is sufficient. The purpose is entertainment during the transit and one place to apply such imagery would be on the proposed Loop tunnel being built by The Boring Company between O'Hare airport and downtown Chicago.

In another example the scenery might be of fish and whales under the ocean. Still another scenery could be a walk through a tropical forest. Yet another could be a fully psychedelic display of colorful lighted objects. Upon consideration it will be clear that there are as many different things that can be displayed as there are videos and games on computers. The key is that by knowing where a vehicle is via sensors in the tunnels as well as the speed vehicles move through the tunnels and also via sensors and communication between vehicles and the computer controlling the visual displays, the displays can be made to advance down the tunnels so that they take on a velocity relative to the vehicle, instead of a velocity relative to the stationary earth.

Figure 33:
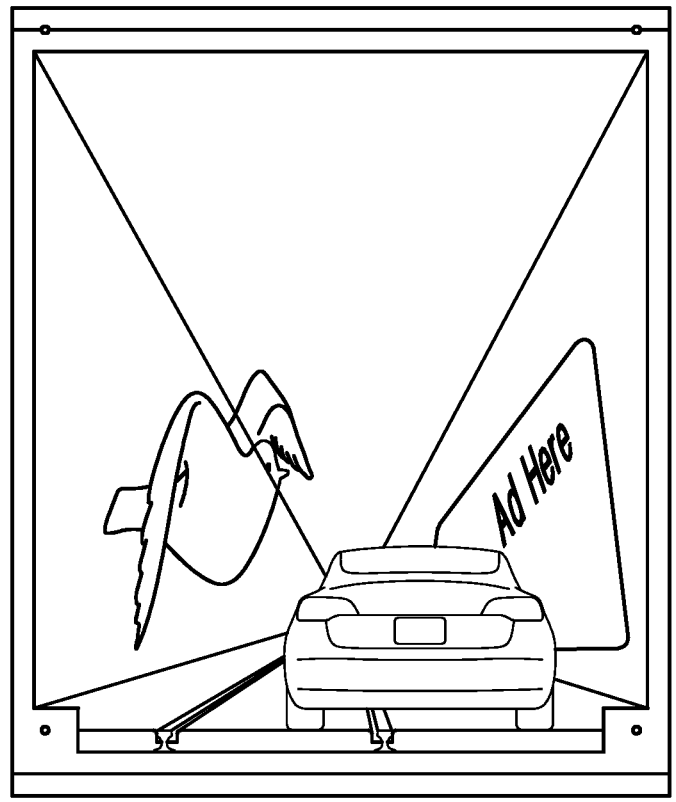
FIG. 33 shows LED displays that provide animated movement with the vehicle on one side wall.

Observers within vehicles moving at high speed down a tunnel require a completely new sort of display if they are to gain full entertainment value from the displays. And finally, as shown in FIG. 33, the displays can be made to fly with the vehicle on one side wall, or like the bird wing, they can move up and over the ceiling and then back down onto the opposing wall. In this way, a flock of birds could be shown to completely surround the vehicle. Likewise, a squadron of B-17s could be shown all around the vehicle in a WWII air battle including a fighter coming straight at the car that is shot before impact and goes zipping past the vehicle as a "near miss" collision.

In the event of an emergency, the LED display can immediately communicate messages and instructions to occupants of a vehicle even if that vehicle is miles away from the emergency situation. Vehicles twenty miles from reaching an accident can be instructed to exit the roadway conduit immediately, removing them from being in the way of emergency crews. Occupants in close proximity to an emergency can be given instructions and in case of an evacuation, the LED arrays can point arrows to the nearest emergency exit routes.

Typically, however, if one vehicle crashes for any reason within the roadway conduit, all vehicles ahead of the disabled vehicle will just continue on as normal. All vehicles behind the accident with an exit ahead will immediately be instructed to take the exit and vacate the conduit. And vehicles immediately behind the accident will be instructed to reverse and back out of the roadway conduit and then take the nearest exit. All the while, the LED display can communicate information regarding what the emergency is, how long the delay is expected to take, and what emergency instructions their vehicles should be carrying out. In this way, occupants of vehicles performing unusual behaviors will be comforted knowing why their vehicle is say, stopping and backing out of the conduit.

LED arrays within tunnels will enable emergency messages, the communication of information, fantasy displays for entertainment, advertising that is readable by occupants moving at 120 mph through the conduit, and games among other sorts of graphical displays.

Figure 14B:
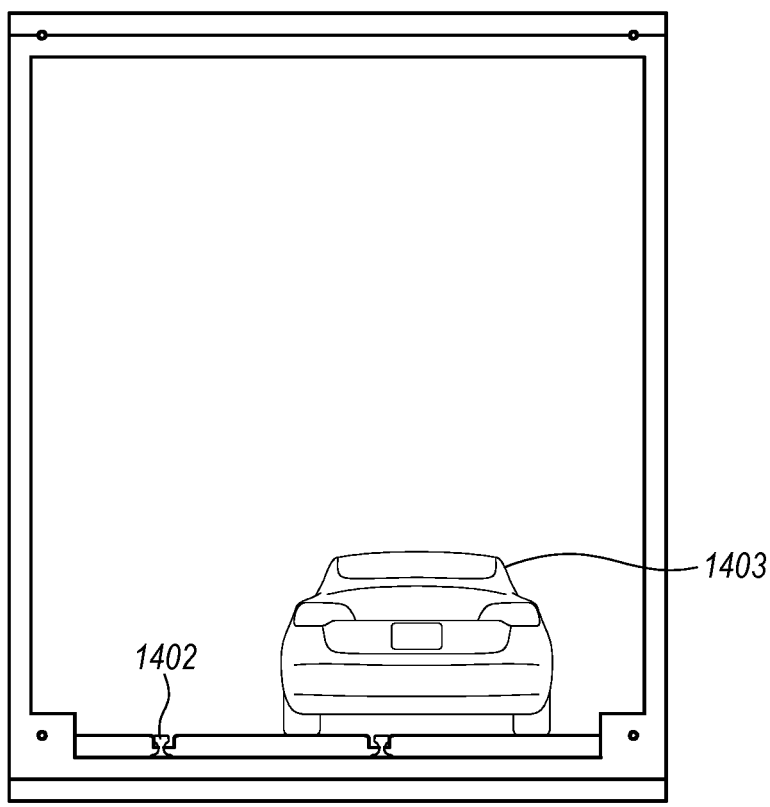

The conduits are intended to be used by any sort of vehicle that uses freeways today. It can also be used by rail vehicles as is shown in FIGS. 14A and 15 and also with a combination of normal road vehicles and also rail vehicles as shown in FIG. 14B that shows how cars and trucks could straddle the rails so that road vehicles and rail vehicles could be interspersed within the conduits at spacings typical of modern freeways and closer. Every vehicle regardless of wheel type can be autonomously controlled by computer.

However, to travel at speeds of 120 mph (as an example of "high speed") may require new tires to be added to the vehicles. A number of tires for passenger cars, especially racing tires, have speed ratings for travel at 120 mph. But typical passenger car tires and all large truck tires have far slower speed ratings. For trucks (e.g., freight carrying trucks that are multi-axle) to actually enable high speed freight movement, the truck must be equipped with tires that have a speed rating faster than that speed (e.g., 120 mph). Today, trucks typically travel at 65 mph and not at 120 mph.

There are several reasons for this, and to enable high speed trucking, these limitations must be overcome. First, the power to propel a vehicle is proportional to the cube of the velocity of the headwind the vehicle must push out of the way to advance. For a typical semi-truck, the power required on an open freeway at 60 mph is around 300 horsepower (HP). Of that, 100 HP overcomes rolling friction and 200 HP overcomes aerodynamic drag. If the velocity is doubled to 120 mph the rolling friction might increase to 200 HP and the aerodynamic drag might increase to around 1,600 HP. The total engine power requirement would be around 1,800 HP instead of 300 HP. To propel the truck at 120 mph could in principle require an engine that is six times larger. This cost would be prohibitive to trucking companies. Second, the energy consumed per mile would also increase, albeit by about four times for aerodynamic drag. The power increases eight-fold but the time to destination is cut in half and the product of these numbers is four. Four times the energy (fuel) consumption is typically deemed prohibitive to trucking companies that must compete on price. Third, aircraft can take off at 120 mph and so too can semi-trucks. If a truck gets into an accident at 120 mph there is a good chance it will go airborne and fly across lanes and worst case, into oncoming traffic on the opposite side of a freeway barrier. With increased velocity come increasingly dangerous crashes. The risk associated with travel at 120 mph is prohibitive to the trucking industry and also to the public. Travel at 120 mph for trucks and cars in the US and most countries is prohibited. Fourth, to travel at 120 mph on rubber tires requires that the tires have a speed rating of at least 120 mph.

Roadway conduits address the first three of these shortcomings of existing technology and new tires can solve the fourth. The first and second issues are eliminated by flowing air down the conduit at close to the speed of the moving truck vehicles. This reduces the headwind experienced by the vehicles to below 40 mph. The power required and the energy consumed are primarily (the aerodynamic portion) a function of the headwind velocity and not the ground speed. By flowing air down the conduit with the vehicles, both the power and energy required of the vehicle are reduced to lower than they would be on a normal freeway, in spite of the fact that the trucks are moving faster than on a normal roadway.

The reduction in headwind velocity further eliminates the possibility of the truck going airborne. And the concrete walls of the conduit confine every vehicle to remain within the roadway conduit and preclude any vehicle from crashing into any other adjacent vehicle because there are no adjacent vehicles to run into. The worst crash any vehicle might experience would be to skid and scrap until the vehicle came to a gradual and gentle stop. Bad crashes happen when a fast moving object runs into a stationary or oppositely moving object. Within the conduits no such objects exist.

The final criteria that must be solved is the development of a new class of tire designed specifically for carrying freight (heavy loads) and travelling at high speeds. When the roadway conduits are built and operational, and properly rated tires are used, then it becomes possible to develop and release trucks designed specifically for transport of freight at high speeds within roadway conduits. The following describes the first of these designs.

Figure 35:
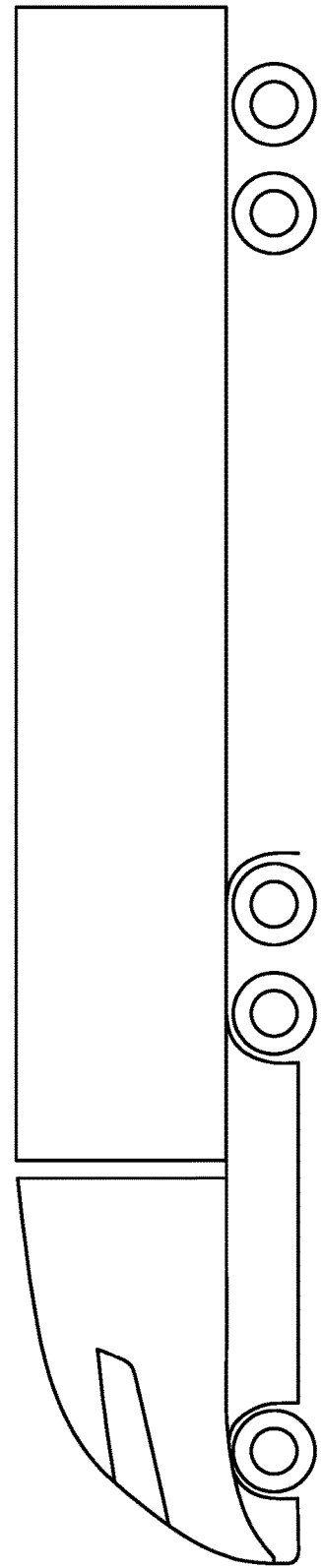
FIG. 35 shows a modern EV semi-truck.

A couple important design criteria include the fact that freight will preferably move through the conduits, where all vehicles are under fully autonomous control, without a driver. FIG. 35 shows an image of a modern electric semi-truck (e.g., in some aspects, a multi-axle vehicle). Such a vehicle, equipped with roadway conduit approved autonomous controls and operation system would be capable of using the roadway conduits. While in the conduits, a driver would become an occupant and could watch a movie, take a nap, or read a book, the same as occupants of cars.

However, because within the conduits there is no longer a requirement for a driver to be inside the vehicle, it makes little sense to have a driver in the vehicle. And if there will not be a driver, then there is no need to have a cab for a driver to enter. And if there is not going to be a significant headwind to deal with, then there is also no need for the vehicle to be designed aerodynamically as has been the case to date for vehicles travelling on the open roadways. Within the conduits with air moving with the vehicles, a completely new shape can emerge, the shape optimizing the cargo volume and ignoring aerodynamic shapes.

Figure 34:
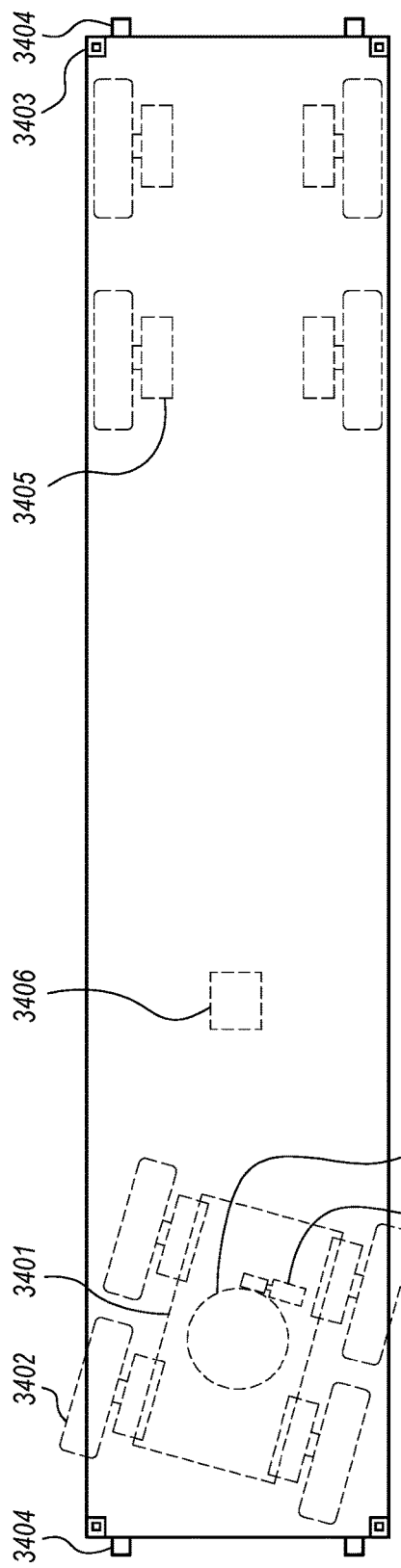
FIG. 34 shows a plan-view of an example embodiment of a high-speed vehicle.

FIG. 34 shows one possible configuration in plan-view where the driver part of the vehicle is eliminated and instead, a rotatable truck of four single high speed tires (shown) or eight high speed tires (not shown) can support the front of the load just as has been the case for modern trailer transport. Notice that to get to the design in FIG. 34 from the design in FIG. 35 requires "cutting off" the front of the semi-tractor that would normally house the engine and steer wheels. To do this, in one embodiment a mechanism such as a ring gear 3406 and motor 3407 must be added to the steerable truck 3401 to rotate it. This enables the vehicle to be steered without there being a semi-tractor to rotate the truck of wheels. The vehicle may also be equipped with high speed tires 3402. The vehicle controller 3406 may coordinate all vehicle behaviors.

Indeed, to travel at 80 mph or higher high speed tires may be used for the trucking industry. The fastest commercially available trucking tires today have a speed rating of 80 mph while the vast majority of trucking tires for semi-truck and trailer transportation utilize commercial tires with a speed rating of 70 mph. The deficiency of 70 mph truck tires relates to the strength of the cords within the tires. As the speed of the vehicle increases, the centripetal acceleration imposed upon the tire tread increases non linearly as velocity squared. By doubling the velocity of a vehicle from 60 mph to 120 mph the strength of the tire must be made to be four times stronger. To double again to 240 mph requires that the strength of the tire cords be built sixteen times stronger than is required for travel at 60 mph.

If the load to be carried by the trucks are the same at high speed as they are at 60 mph, fabrication of high speed tires will be many times higher than the cost to construct tires that are commercially available today. In order to enable faster than 80 mph ratings on tires intended for 120 mph or 240 mph passenger, freight and other heavy load carrying transportation vehicles for use within roadway conduits, high-speed tires have increased strength to resist the much higher centripetal accelerations that will be imposed upon high speed passenger, freight and other vehicles within the high speed roadway conduits. For rail vehicles with steel wheels this new wheel development for freight movement vehicles is not required as steel wheels for 120 mph freight movement exist for trains that move at those velocities. Such trains do not, however, benefit from the aerodynamic advantages of a railway conduit system.

Thus, high-speed tires may utilize stronger steels and Kevlar belts as well as lighter tread materials to reduce the stress imposed upon the belts upon travel at higher velocities enabled energetically, in other words enabled via reducing the energy consumed per mile of travel, by the way conduits. So, the way conduits solve the energy problem, while the increased strength of the belts in tires developed for and made commercially available to roadway conduit vehicle construction companies are two key requirements to fully enable a roadway conduit system to function.

To control the vehicle there may be, in addition to the controller 3406, a vision system such as the embodiment shown, four cameras 3404 with preferably at least a pair in front and a pair in the rear. It should be noted that having more cameras will provide increased safety but a single camera could be calibrated to guide a vehicle through a conduit roadway system.

While such a vehicle can be configured like a box or refrigerated trailer, until autonomously controlled truck vehicles are allowed on public freeways these may be inconvenient as they would require transferring the cargo from one trailer to another at a port to the roadway conduits.

Much easier is to use intermodal shipping containers which can be quickly lifted from a local semi-truck driven as is conventional, onto the new conduit vehicle at a roadway conduit port. This can be accomplished with a gantry crane without opening the cargo container. To accommodate shipping containers, the flat bed of the vehicle can optionally be fitted with shipping container twist locks 3403. Any other normal attachments to normal trailers can of course also be added, such as hitches for towing a second trailer (not shown).

Figure 36:
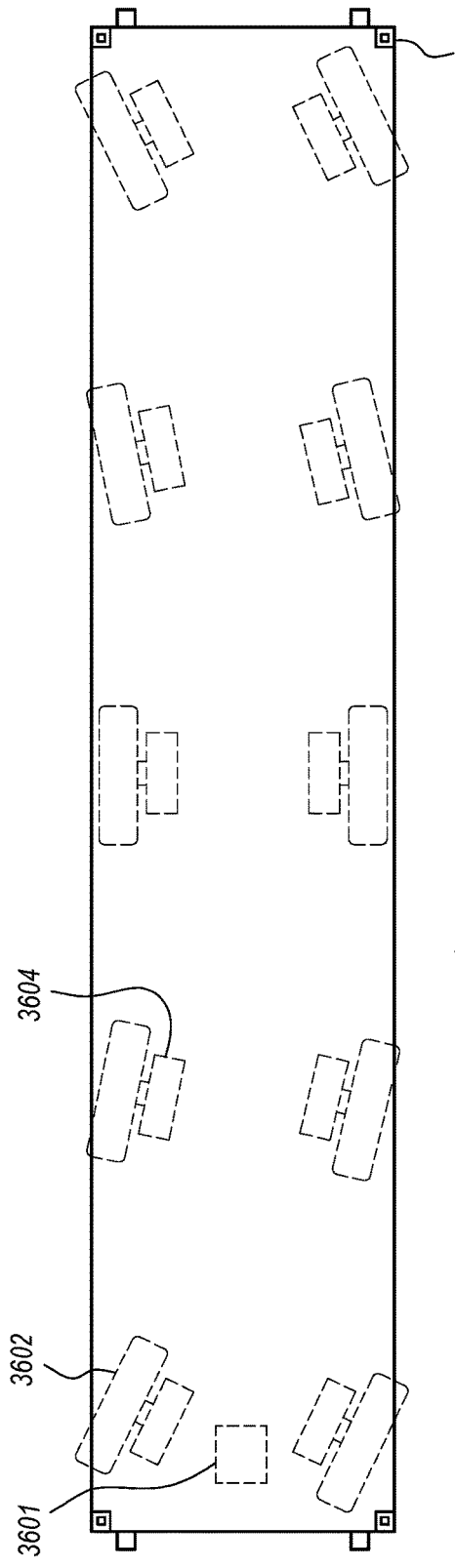
FIG. 36 shows a plan-view of another example embodiment of a high-speed vehicle.

To propel the vehicle, at least one traction electric motor 3405 is required per vehicle. FIG. 34 shows eight traction motors and FIG. 36 shows ten traction motors. While the figures show traction motors on every wheel, this is not a requirement. The vehicle can be propelled if at least one wheel has a traction motor so that multiple traction motors provide redundancy as well as superior control capability in slipping conditions such as snow, black ice, and or wet roads. Preferably, therefore, the traction motors operate independently so that if one becomes disabled, the vehicle can continue to destination using the remaining operational motors. Other traction schemes are also possible including drive shafts and coupling multiple wheels to a single motor. The showing in these drawings of a single motor per tire should not be construed as a limit to the scope of this embodiment.

Turning attention to FIG. 36, a plan view of one possible roadway conduit vehicle design, we see a computer controller 3601. The controller is able to communicate to the roadway conduit control system to send and receive information regarding what the vehicle should be doing. In case of an emergency, instructions on what every vehicle within the conduit needs to do will be communicate in real time. The controller monitors aspects of the vehicle and preferably every motor will have encoders that deliver real time information on the orientation of every wheel. This enables the controller to determine when a wheel begins slipping such as can happen during travel over black ice or in snow or on wet pavement.

The controller directs each motor on the vehicle to deliver a determined amount of power to each wheels so that the motion of the vehicle is controlled. The controller also directs the steering of the vehicle. In FIG. 36, all ten wheels are equipped with steerable wheels so that each wheel can be turned individually. If the vehicle shown is moving to the left, then it would be making a right hand turn if the wheels were oriented as shown in the figure.

Figure 37:
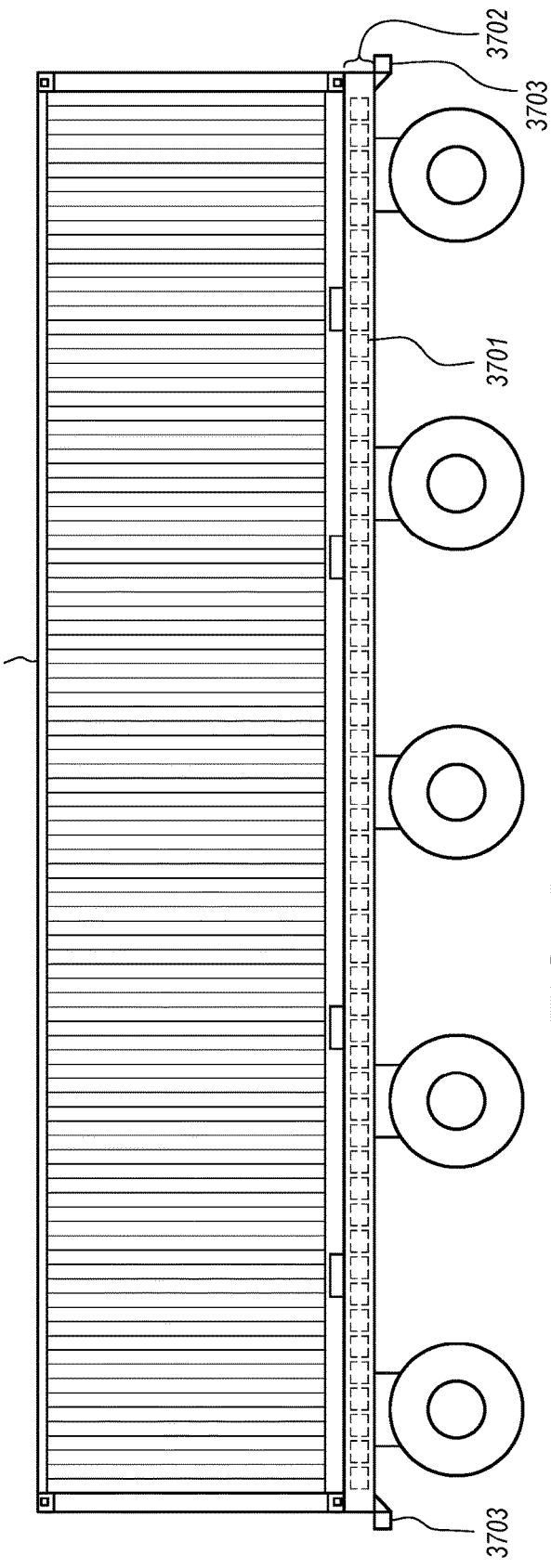
FIG. 37 shows an elevation view of the high-speed vehicle in FIG. 36.

FIG. 37 shows an elevation view of the vehicle in FIG. 36 with the wheels oriented straight ahead, and with an Intermodal Shipping Container (ISC) on top of the flat bed. Rather than an ISC, the top of the vehicle could be alternately fitted with a typical box as in semi box trailers, a refrigerated box as in refrigerated box trailers, seating with windows as in buses, or be kept as an open flat bed for the shipment of unusual sized or shaped freight. The vehicle is shown with an intermodal shipping container on top of the flat bed, battery-filled, vehicle. The top of the vehicle could alternately (not shown), be fitted with a box, an insulated refrigerated box, passenger seating and windows to become a bus, or other vehicle types that could benefit from high speed travel within roadway conduits. In this view, front cameras 3703 are shown and a container 3704 sits on top of the vehicle flat-bed 3702. Unlike the frame of a typical container trailer where the frame only performs the function of holding the container, for this particular vehicle design, there is a flat-bed upon which the container is sitting and to which it is connected via twist clamps 3603 as are used for connecting containers to trailers.

Inside of the flat-bed 3702 of the vehicle are battery modules 3701 which are electrically coupled to the electric traction motors 3604. Preferably the total battery capacity will be divided between various traction motors to provide redundancy of drive power capacity. Again, to travel at 120 mph the tires shown must be high speed tires capable of high load carrying ratings.

Figure 38:
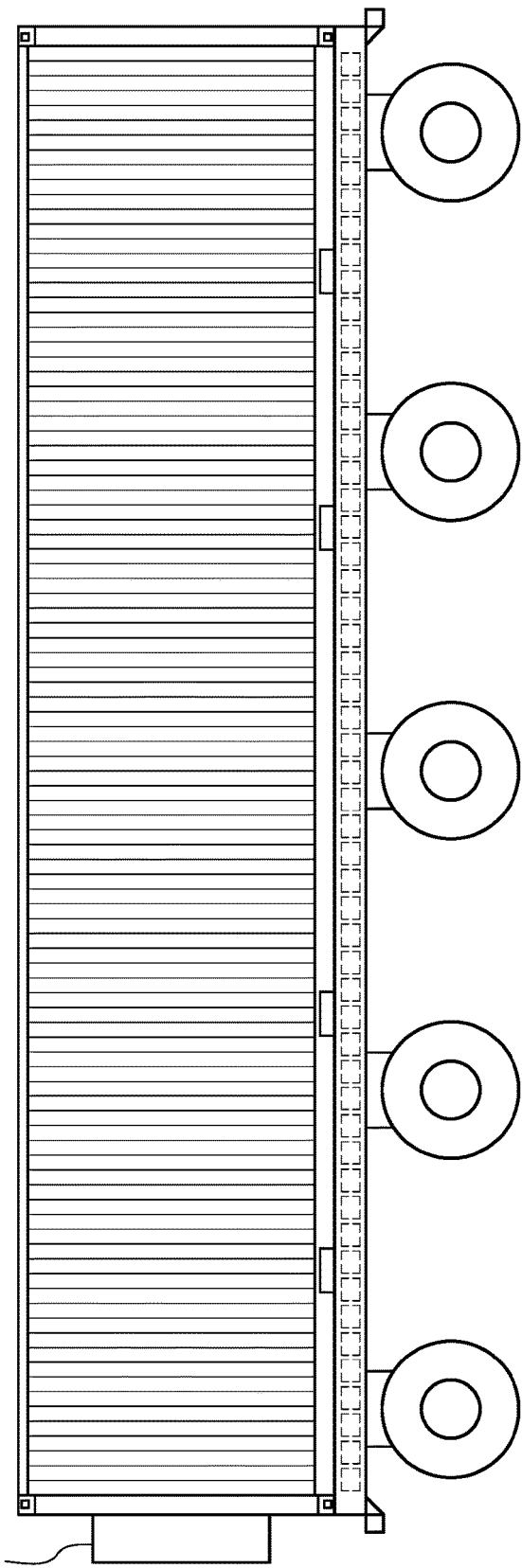
FIG. 38 shows an embodiment of a high-speed vehicle that includes a refrigeration section.

FIG. 38 shows that the container could be a refrigerated 3801 container.

Figure 39:
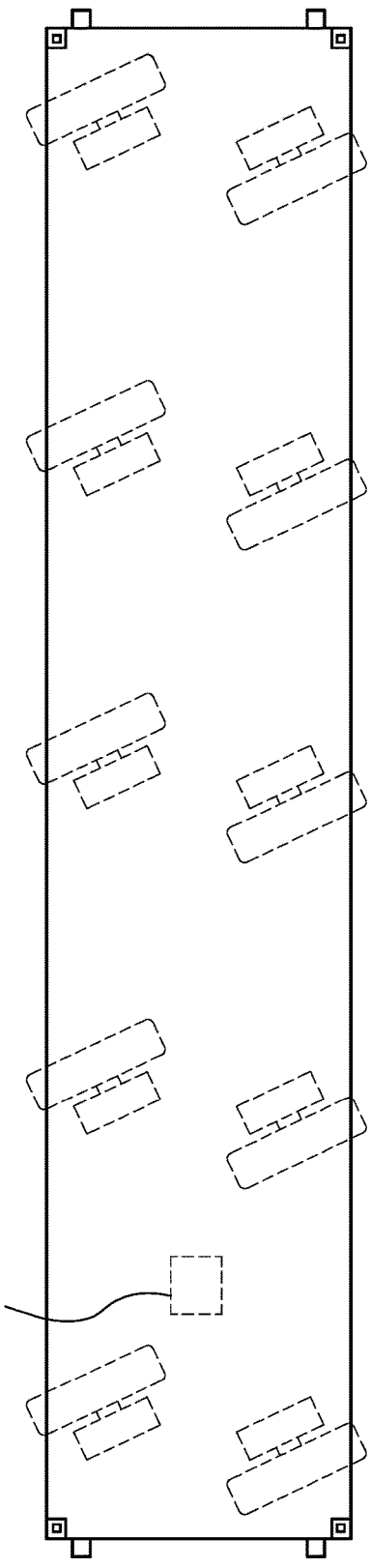
FIG. 39 shows an example embodiment of a high speed-vehicle that has independently steerable wheels.

FIG. 39 shows one use of a vehicle where every wheel is independently steerable. The computer controller 3901 is capable of directing all of the steerable wheels to rotate to the same angle. By rotating all of the wheels the same way, the vehicle can "crab" sideways. This can be accomplished at high speeds (e.g., to 120 mph) if desired to adjust lane position. But this will more often be useful when parking the vehicle as this behavior enables the front and back of the vehicle to move laterally at the same time.

With the vehicle of FIG. 35, or any modern semi-tractor trailer combination rig, only the steerable end of the vehicle can turn and this results in a requirement that parking and docking maneuvers, as are conventional, be undertaken when operating the vehicle in close proximity to other objects. Without this capacity it is more difficult to maneuver around tight objects in vehicle parking and staging areas.

The preferable configuration where all wheels are steerable enables the entire vehicle length to crab sideways in order to more easily and accurately align the vehicle or to enter parking locations. The vehicle could for example, move sideways into a curb on a street without needing to undergo the typical backing up "parallel parking" maneuver.

Figure 40:
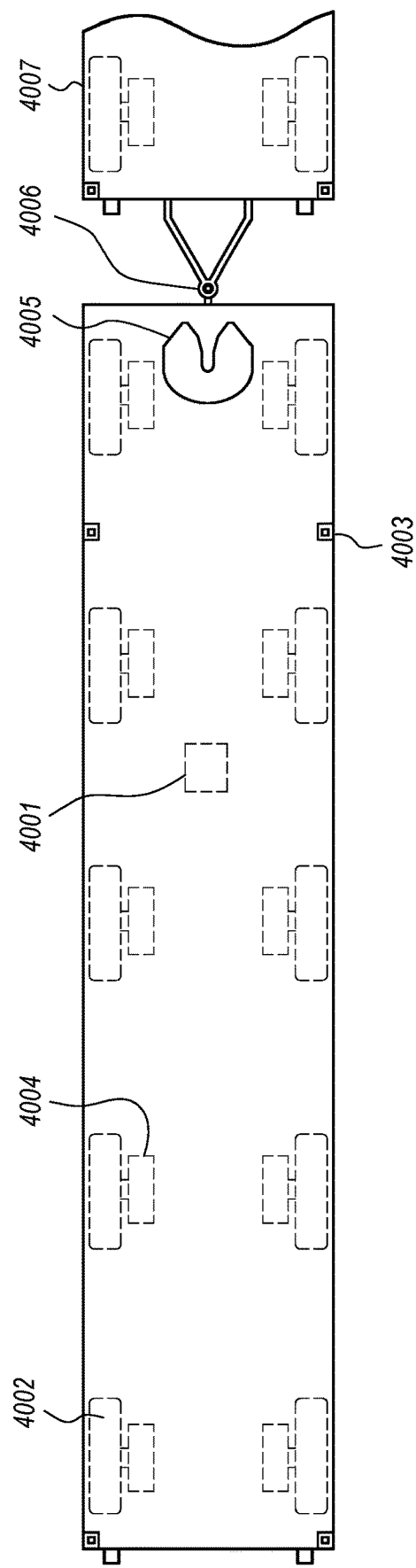
FIG. 40 shows an example embodiment of a computer controller of a high-speed vehicle.

Turning attention to FIG. 40, 4001 is the computer controller to communicate to the conduit control system and to control the vehicle as normal. 4002 shows one of the steerable wheels as having a single tire, but this could optionally be a double tire. The traction motor 4004 is also shown for comparison to the previous figures. On this optional configuration, 4003 shows the shipping container twist locks moved forward on the flat bed to expose the tail of the vehicle.

On the tail of the vehicle is installed a typical platen 4005 to support and couple a trailer (a trailer is not shown coupled to the platen while a trailer is shown connected to the alternate hitch, see the description of 4006 below) in the same way as a normal semi-tractor would do to couple to and tow a trailer. In this way the new vehicle could convey a shipping container on top of the flat bed deck, and then also tow a second trailer behind.

Also shown is a different hitch for coupling to a trailer, 4006, where a trailer is shown, 4007. A vehicle could be provided with either or both trailer connection methods, but of course only one trailer could be coupled at a time. The trailer is shown coupled to the hitch 4006 to make it easier to see the two different potential trailer connection methods that can alternatively, or together, be employed.

Also shown with hidden lines beneath the trailer are the same wheels with motors. The conduit vehicle could tow a normal trailer without propulsion, or, it could tow an active trailer that has its own battery energy storage and motors to increase the range of the tandem combination. In this event the trailer with active energy and motors would be slaved to the front drive vehicle and preferably would include cameras on the rear, the imagery being provided to the vehicle control system for use, especially during backing operations.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A vehicle roadway conduit system, comprising:
    at least one roadway conduit section that comprises:
        a floor portion that comprises a roadway surface configured to receive one or more traveling vehicles,
        a ceiling portion, and
        at least one sidewall portion coupled to the floor portion and the ceiling portion such that the floor, ceiling, and at least one sidewall portions define a roadway conduit volume through which the one or more autonomous, traveling vehicles traverse the at least one roadway conduit section;
    at least one roadway conduit ingress that merges with the at least one roadway conduit section and is coupled to a first location of the at least one roadway conduit section;
    at least one roadway conduit egress coupled to a second location of the at least one roadway conduit section; and
    a visual display coupled to at least a portion of the at least one roadway conduit section and configured to generate an image viewable by at least one passenger of the one or more autonomous, traveling vehicles that traverse the at least one roadway conduit section within the roadway conduit volume.

2. The roadway conduit system of claim 1, wherein the one or more autonomous, traveling vehicles comprises one or more zero emissions, autonomous vehicles.

3. The roadway conduit system of claim 1, wherein the visual display comprises a plurality of visual display sections arranged in an array.

4. The roadway conduit system of claim 3, wherein the plurality of visual display sections comprise a plurality of LED display screens arranged in the array to form the visual display.

5. The roadway conduit system of claim 3, wherein the plurality of visual display sections are coupled to the at least one sidewall portion.

6. The roadway conduit system of claim 3, wherein the plurality of visual display sections are coupled to the at least one sidewall portion and to the ceiling portion.

7. The roadway conduit system of claim 1, wherein the image comprises a moving image that traverses the visual display.

8. The roadway conduit system of claim 7, wherein the moving image is programmed to traverse the visual display at a speed relative to a traveling velocity of at least one of the one or more autonomous, traveling vehicles that traverse the at least one roadway conduit section.

9. The roadway conduit system of claim 1, wherein the image comprises an interactive image at least partially controllable by the at least one passenger of the one or more autonomous, traveling vehicles that traverse the at least one roadway conduit section.

10. The roadway conduit system of claim 1, wherein the image comprises a text image that describes an emergency related to the vehicle roadway conduit system.

11. The roadway conduit system of claim 1, wherein the visual display is continuous from the at least one sidewall, across the ceiling portion, and to a second sidewall opposite the at least one sidewall of the roadway conduit section, the visual display configured to translate an image from the at least one sidewall, across the ceiling portion, and to the second sidewall of the roadway conduit section.

12. A method for managing traveling vehicles, comprising:
    receiving one or more autonomous, traveling vehicles at a roadway conduit ingress that merges with, and is coupled to, a first location of roadway conduit section;
    receiving the one or more autonomous, traveling vehicles from the roadway conduit ingress into a roadway conduit volume of the at least one roadway conduit section, the roadway conduit section comprising:
        a floor portion that comprises a roadway surface configured to support the one or more traveling vehicles,
        a ceiling portion, and
        at least one sidewall portion coupled to the floor portion and the ceiling portion such that the floor, ceiling, and at least one sidewall portions define the roadway conduit volume through which the one or more autonomous, traveling vehicles traverse the at least one roadway conduit section; and
    displaying an image to at least one passenger of the one or more autonomous, traveling vehicles that traverse the at least one roadway conduit section in the roadway conduit volume on a visual display that is coupled to at least a portion of the at least one roadway conduit section.

13. The method of claim 12, wherein the one or more autonomous, traveling vehicles comprises one or more zero emissions, autonomous vehicles.

14. The method of claim 12, wherein the visual display comprises a plurality of visual display sections arranged in an array.

15. The method of claim 14, wherein the plurality of visual display sections comprise a plurality of LED display screens arranged in the array to form the visual display.

16. The method of claim 14, wherein displaying the image comprises displaying the image across the plurality of visual display sections that are coupled to the at least one sidewall portion.

17. The method of claim 14, wherein displaying the image comprises displaying the image across the plurality of visual display sections that are coupled to the at least one sidewall portion and to the ceiling portion.

18. The method of claim 12, wherein displaying the image comprises displaying a moving image that traverses the visual display.

19. The method of claim 18, further comprising controlling the moving image to traverse the visual display at a speed relative to a traveling velocity of at least one of the one or more autonomous, traveling vehicles that traverse the at least one roadway conduit section.

20. The method of claim 12, further comprising interactively controlling the image at least partially based on a communication from the at least one passenger of the one or more autonomous, traveling vehicles that traverse the at least one roadway conduit section.

21. The method of claim 12, wherein displaying the image comprises displaying a scrolling text image that describes an emergency related to the vehicle roadway conduit system.

22. The method of claim 12, wherein displaying the image comprises displaying the image that moves separately from a movement of the at least one of the one or more autonomous, traveling vehicles.

23. The method of claim 22, wherein displaying the image comprises displaying the image adjacent to the vehicle, the image moving at a speed approximately equal to a speed of the at least one of the one or more autonomous, traveling vehicles.

24. The method of claim 12, wherein displaying the image to the at least one passenger comprises translating the image along the visual display that extends from the at least one sidewall, across the ceiling portion, and to a second sidewall that is opposite the at least one side wall of the at least one roadway conduit section.

25. A vehicle roadway conduit system, comprising:
at least one roadway conduit section that comprises:
a floor portion that comprises a roadway surface configured to receive one or more traveling vehicles,
a ceiling portion, and
at least one sidewall portion coupled to the floor portion and the ceiling portion such that the floor, ceiling, and at least one sidewall portions define a roadway conduit volume through which the one or more autonomous, traveling vehicles traverse the at least one roadway conduit section;
at least one roadway conduit ingress coupled to a first location of the at least one roadway conduit section;
at least one roadway conduit egress coupled to a second location of the at least one roadway conduit section; and
a visual display coupled to at least a portion of the at least one roadway conduit section and configured to generate an image viewable by at least one passenger of the one or more autonomous, traveling vehicles that traverse the at least one roadway conduit section within the roadway conduit volume;
wherein the visual display comprises a plurality of visual display sections arranged in an array, the plurality of visual display sections being coupled to the at least one sidewall portion and to the ceiling portion.

26. The roadway conduit system of claim 25, wherein the image comprises an interactive image at least partially controllable by the at least one passenger of the one or more autonomous, traveling vehicles that traverse the at least one roadway conduit section.

27. The roadway conduit system of claim 25, wherein the plurality of visual display sections comprise a plurality of LED display screens arranged in the array to form the visual display.

28. The roadway conduit system of claim 25, wherein the plurality of visual display sections are coupled to the at least one sidewall portion.

29. The roadway conduit system of claim 25, wherein the image comprises a moving image that traverses the visual display.

30. The roadway conduit system of claim 29, wherein the moving image is programmed to traverse the visual display at a speed relative to a traveling velocity of at least one of the one or more autonomous, traveling vehicles that traverse the at least one roadway conduit section.

31. A vehicle roadway conduit system, comprising:
at least one roadway conduit section that comprises:
a floor portion that comprises a roadway surface configured to receive one or more traveling vehicles,
a ceiling portion, and
at least one sidewall portion coupled to the floor portion and the ceiling portion such that the floor, ceiling, and at least one sidewall portions define a roadway conduit volume through which the one or more autonomous, traveling vehicles traverse the at least one roadway conduit section;
at least one roadway conduit ingress coupled to a first location of the at least one roadway conduit section;
at least one roadway conduit egress coupled to a second location of the at least one roadway conduit section; and
a visual display coupled to at least a portion of the at least one roadway conduit section and configured to generate an image viewable by at least one passenger of the one or more autonomous, traveling vehicles that traverse the at least one roadway conduit section within the roadway conduit volume;
wherein the image comprises an interactive image at least partially controllable by the at least one passenger of the one or more autonomous, traveling vehicles that traverse the at least one roadway conduit section.

32. The roadway conduit system of claim 31, wherein the one or more autonomous, traveling vehicles comprises one or more zero emissions, autonomous vehicles.

33. The roadway conduit system of claim 31, wherein the image comprises a text image that describes an emergency related to the vehicle roadway conduit system.

34. The roadway conduit system of claim 31, wherein the image comprises a moving image that traverses the visual display.

35. The roadway conduit system of claim 34, wherein the moving image is programmed to traverse the visual display at a speed relative to a traveling velocity of at least one of the one or more autonomous, traveling vehicles that traverse the at least one roadway conduit section.

36. The roadway conduit system of claim 31, wherein the visual display is continuous from the at least one sidewall, across the ceiling portion, and to a second sidewall opposite the at least one sidewall of the roadway conduit section, the visual display configured to translate an image from the at least one sidewall, across the ceiling portion, and to the second sidewall of the roadway conduit section.

* * * * *

UNITED STATES PATENT AND TRADEMARK OFFICE
CERTIFICATE OF CORRECTION

PATENT NO. : 11,767,757 B2
APPLICATION NO. : 17/169646
DATED : September 26, 2023
INVENTOR(S) : Ross Tessien Page 1 of 1

It is certified that error appears in the above-identified patent and that said Letters Patent is hereby corrected as shown below:

In the Claims

Claim 12, Column 62, Line 23, delete "roadway" and insert -- at least one roadway --

Signed and Sealed this
Fifth Day of December, 2023

Katherine Kelly Vidal
*Director of the United States Patent and Trademark Office*